(12) United States Patent
Rothera

(10) Patent No.: US 10,981,236 B2
(45) Date of Patent: Apr. 20, 2021

(54) DEVICE FOR ENSURING PROPER LOCATION OF A CUTOUT IN A SHEET OF CONSTRUCTION MATERIAL

(71) Applicant: Paul Bruce Rothera, Nottingham, PA (US)

(72) Inventor: Paul Bruce Rothera, Nottingham, PA (US)

(*) Notice: Subject to any disclaimer, the term of this patent is extended or adjusted under 35 U.S.C. 154(b) by 0 days.

(21) Appl. No.: 15/340,724

(22) Filed: Nov. 1, 2016

(65) Prior Publication Data
US 2018/0117683 A1 May 3, 2018

(51) Int. Cl.
*B23B 51/04* (2006.01)

(52) U.S. Cl.
CPC ...... *B23B 51/0426* (2013.01); *B23B 2226/57* (2013.01); *Y10T 408/5621* (2015.01); *Y10T 408/895* (2015.01)

(58) Field of Classification Search
CPC ... B23B 47/287; B23B 49/04; B23B 51/0426; Y10T 408/553; Y10T 408/558; Y10T 408/5584; Y10T 408/56; Y10T 408/5605; Y10T 408/5621; Y10T 408/895; Y10T 408/8953; Y10T 408/8957
See application file for complete search history.

(56) References Cited

U.S. PATENT DOCUMENTS

| | | | | |
|---|---|---|---|---|
| 1,590,994 A * | 6/1926 | Misener | ............... | B23B 51/0426 408/204 |
| 1,669,273 A * | 5/1928 | Wojnowski | ......... | B23B 51/0426 408/204 |
| 1,823,218 A * | 9/1931 | Swanson | ................ | B23D 29/02 30/300 |
| 2,665,597 A * | 1/1954 | Hill | ......................... | B23B 49/00 408/82 |
| 3,810,514 A * | 5/1974 | Viscovich | ........... | B23B 51/0426 175/403 |
| 4,579,486 A * | 4/1986 | Damico | .............. | B23B 51/0426 408/115 R |
| 4,940,370 A * | 7/1990 | Gipson | ................... | B25B 27/18 29/802 |
| 4,969,269 A | 11/1990 | Dominguez | | |
| 5,143,489 A * | 9/1992 | Bogner | ................... | B23B 49/02 408/1 R |
| 5,733,077 A * | 3/1998 | MacIntosh, Jr. | ........ | B23B 47/28 408/103 |

(Continued)

FOREIGN PATENT DOCUMENTS

| DE | 353029 6 A * | 3/1987 |
|---|---|---|
| SE | 45280 B * | 9/1988 |

*Primary Examiner* — Eric A. Gates
(74) *Attorney, Agent, or Firm* — Paul & Paul

(57) ABSTRACT

An apparatus for ensuring proper location for a cutout in a sheet of construction material, to provide for access to an electrical box, includes an electrical box locator device with a body and at least one spike. The body mounts to the front opening of the electrical box and the spike projects perpendicularly relative to the plane of the electrical box opening such that it pierces the sheet of construction material and is visible on the side of the sheet of construction material opposite the side facing the electrical box once the sheet of construction material is positioned over the opening of the electrical box so as to help in locating a cutout in the sheet of construction material for the electrical box.

9 Claims, 59 Drawing Sheets

(56) References Cited

U.S. PATENT DOCUMENTS

| | | | | |
|---|---|---|---|---|
| 5,860,219 | A | 1/1999 | Wilkinson | |
| 5,979,042 | A * | 11/1999 | Duke | H05K 3/225 29/739 |
| 6,330,738 | B1 * | 12/2001 | Yoshikawa | B21J 15/50 29/426.4 |
| 7,008,149 | B1 * | 3/2006 | Rhoades | B23B 51/0426 408/1 R |
| 7,237,984 | B1 * | 7/2007 | Guzda | B23B 51/0426 408/1 R |
| 7,406,758 | B2 * | 8/2008 | Jones | B23Q 9/0014 248/205.5 |
| 7,484,578 | B2 * | 2/2009 | Duncan | E21B 10/02 175/402 |
| 7,658,242 | B2 * | 2/2010 | Duncan | B23B 51/0426 175/162 |
| 7,845,089 | B1 * | 12/2010 | Lavalle | H02G 1/00 33/528 |
| 8,696,268 | B2 * | 4/2014 | Bell | B23B 51/0426 408/115 R |
| 8,827,604 | B1 * | 9/2014 | Corey | B23B 51/0426 408/204 |
| 10,046,401 | B2 * | 8/2018 | Gamboa Arias | B23B 51/0426 |
| 2016/0273235 | A1 * | 9/2016 | Davidian | E04G 23/0207 |

* cited by examiner

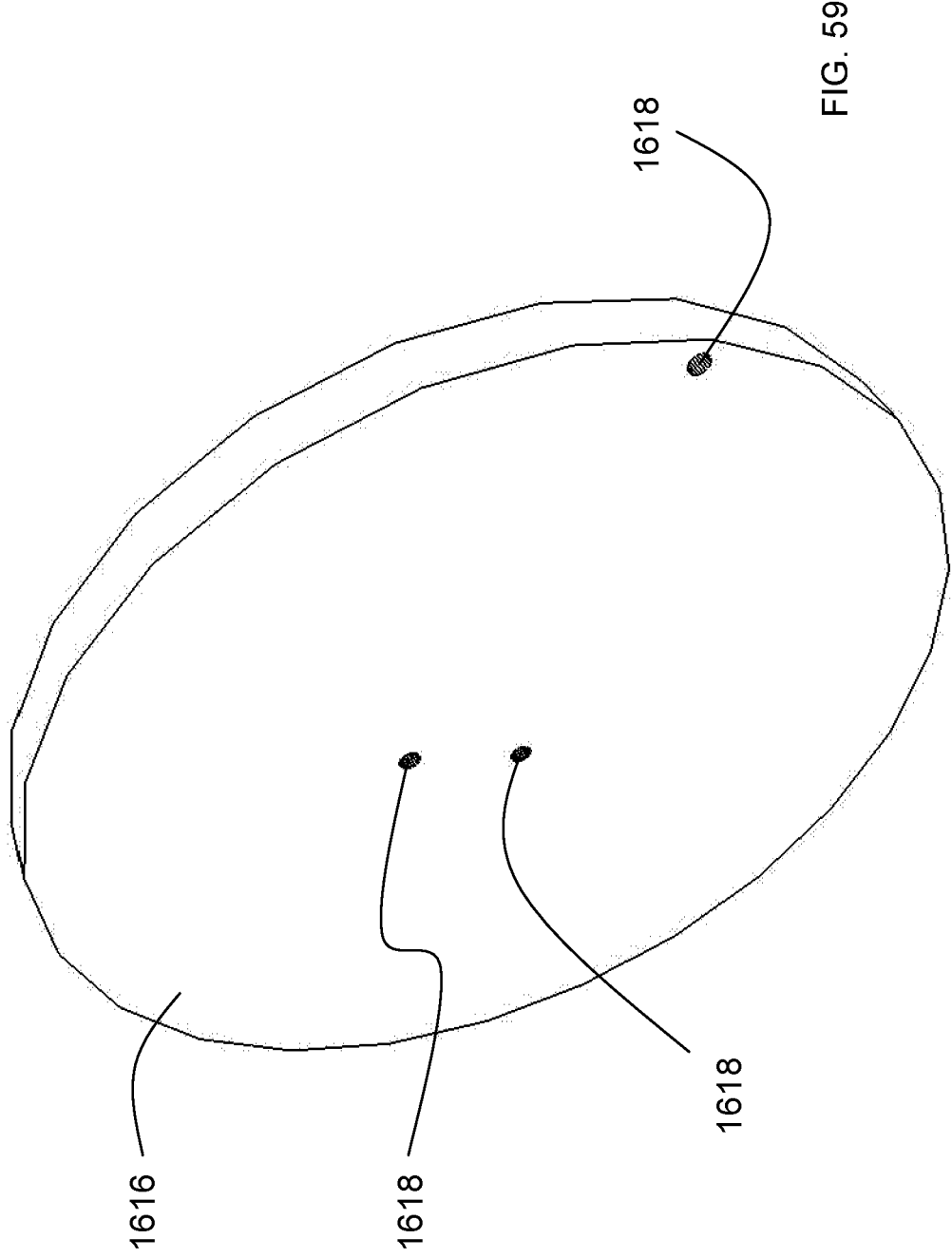

DEVICE FOR ENSURING PROPER LOCATION OF A CUTOUT IN A SHEET OF CONSTRUCTION MATERIAL

BACKGROUND OF THE INVENTION

1. Field of the Invention

The present invention relates to an apparatus for ensuring proper location for a cutout in a sheet of construction material for providing access to the opening of an electrical box.

2. Discussion of Prior Art

In modern construction, interior walls, ceilings, and floors are often formed by framing that is covered with a sheet of construction material, also referred to herein as construction sheet material. Examples of construction sheet material include, but are not limited to, dry wall, also known as wall board, plasterboard, sheet rock, or gypsum board, wood paneling or plywood panels. Electrical boxes, such as switch boxes, outlet boxes, and light fixture boxes, are usually attached to the framing behind the construction sheet material. For access to these electrical boxes, or more precisely the front openings of these electrical boxes, cutouts of the appropriate size, shape, and location must be made in the construction sheet material. A Special cutting implement has been proposed in the prior art for this purpose. U.S. Pat. No. 4,969,269, issued to Armando Dominguez on Nov. 13, 1990, shows a device for punching cutouts in sheets of drywall. The device of Dominguez requires so much force to punch a cutout in the drywall that a special levering device is required for pressing the drywall against the structure of a building. Moving the heavy levering device of Dominguez with the heavy sheet of drywall mounted on it and precisely positioning the assemblage before finally levering the drywall into place against the building framing or structure is evidently so cumbersome that the device of Dominguez does not seem to have been adopted to any appreciable extent in the construction industry.

The common practice today is to install the drywall and using previously measured coordinates locate a reference point for the cutout. Then a template can be used to draw the outline of the cutout relative to the reference point. U.S. Pat. No. 5,860,219, issued to Carl E. Wilkinson on Jan. 19, 1999, shows a similar process. This process is still very time consuming and prone to error because of the possibility of forgetting the coordinates or making errors in the coordinates when measuring them or writing them down. The need persists in the art for a method and device for forming cutouts in sheet material that is less time consuming or cumbersome to employ and is less prone to error.

SUMMARY OF THE INVENTION

The present invention is directed to an apparatus for ensuring proper location for a cutout in a sheet of construction material for providing access to the opening of an electrical box. The apparatus includes an electrical box locator device with a body and at least one spike. The body mounts to the front opening of the electrical box and the spike projects perpendicularly relative to the plane of the electrical box opening such that it pierces the sheet of construction material and is visible on the side of the sheet of construction material opposite the side facing the electrical box once the sheet of construction material is positioned over the opening of the electrical box so as to help in locating a cutout in the sheet of construction material for the electrical box.

For some applications, the electrical box locator device has one spike and the apparatus also includes a cutter guide having a telescoping sleeve that engages the spike. The cutter guide can be centrally attached to a cutter in order to ensure that the cutout is centered about the spike.

For some other applications, the electrical box locator device may be provided with a plurality of spikes. The spikes are provided at the vertices of a polygonal cutout to be formed in the sheet of construction material. The locations of the spikes are connected with a straight edge and pencil to define the outline of the cutout to be formed in the sheet of construction material.

For yet some other applications, the electrical box locator device may be provided with a plurality of spikes, and the apparatus may also include a template. The spikes are provided in a predetermined pattern, and the template is provided with a plurality of holes distributed in a pattern matching the pattern of the spikes. With the electrical box locator device placed on one side of a sheet of construction material and with the spikes piercing the sheet of construction material, the template can be placed on the other side of the sheet of construction material with the holes in the template engaging the spikes. The outline of the template can then be traced in order to form the outline of the cutout to be formed in the sheet of construction material.

For still some other applications, the apparatus includes an electrical box locator device with one spike. A pencil and a piece of string can then be used to form the outline of a circular cutout of a desired size on the sheet of construction material.

The electrical box locator device of the present invention does not include a continuous cutting edge that is coextensive with the perimeter of the cutout that is to be formed on the sheet of construction material, and therefore cannot form a cutout in sheets of construction material without the use of a separate cutting implement by a user or installer from the outward facing side, i.e. the side facing away from the electrical box, of the sheets of construction material.

It is an aspect of the present invention to provide an electrical box locator device for making cutouts in sheets of construction material, for access to openings of electrical boxes mounted to a structure, the electrical box locator device comprising:

a locator device body adapted for engagement to an electrical box such that the locator device body is located at or near an opening of the electrical box and in registry with the opening of the electrical box when the locator device body is mounted to the electrical box; and at least one spike attached to the frame such that the at least one spike projects outward perpendicularly relative to a plane coincident with the opening of the electrical box when the locator device body is mounted to the electrical box, wherein when the electrical box is mounted to the structure and the locator device body is mounted to the electrical box, a sheet of construction material can be positioned relative to the structure with the spike piercing through the sheet of construction material to at least help in locating a cutout in the sheet of construction material for the electrical box.

It is another aspect of the present invention to provide an apparatus for making cutouts in sheets of construction material, for access to openings of electrical boxes mounted to a structure, the apparatus comprising:

an electrical box locator device as previously described, and further comprising means for making a cutout in the sheet of construction material after the sheet of construction material is positioned relative to the structure with the spike piercing through the sheet of construction material, wherein the means for making a cutout is separate and distinct from the spike, the locator device body, and the electrical box locator device.

It is yet another aspect of the present invention to provide an electrical box locator device for making cutouts in sheets of construction material as previously described, wherein the electrical box locator device further comprises means for keeping the electrical box locator device in place relative to the electrical box when the electrical box locator device is mounted to the electrical box.

It is still another aspect of the present invention to provide an electrical box locator device for making cutouts in sheets of construction material as previously described, wherein the means for keeping the electrical box locator device in place comprises at least one resilient member for frictionally engaging the electrical box.

It is still another aspect of the present invention to provide an electrical box locator device for making cutouts in sheets of construction material as previously described, wherein a portion of the locator device overlaps an edge of the opening of the electrical box so as to prevent the locator device from being pushed too far in the inward direction relative to the opening of the electrical box.

It is still another aspect of the present invention to provide an apparatus for making cutouts in sheets of construction material as previously described, wherein the means for making a cutout includes a cylindrical cutter, the apparatus for making cutouts in sheets of construction material further comprising a cutter guide comprising:

a cutter guide body adapted to be centrally located relative to the cylindrical cutter and to rotate with the cylindrical cutter as the cylindrical cutter is rotated by a driver; and a cutter guide sleeve supported by the cutter guide body such that the cutter guide sleeve can move telescopically relative to the cutter guide body, the cutter guide sleeve being adapted to receive at least a portion of the spike, wherein the cutter guide sleeve can engage the spike to locate the spike centrally relative to the cylindrical cutter and help with ensuring that the cylindrical cutter remains centered around the spike while the cylindrical cutter cuts through the sheet of construction material.

It is still another aspect of the present invention to provide an apparatus for making cutouts in sheets of construction material as previously described, wherein the electrical box locator device further comprises means for keeping the electrical box locator device in place relative to the electrical box when the electrical box locator device is mounted to the electrical box.

It is still another aspect of the present invention to provide an apparatus for making cutouts in sheets of construction material as previously described, wherein means for keeping the electrical box locator device in place comprises at least one resilient member for frictionally engaging the electrical box.

It is still another aspect of the present invention to provide an apparatus for making cutouts in sheets of construction material as previously described, wherein a portion of the locator device overlaps an edge of the opening of the electrical box so as to prevent the locator device from being pushed too far in the inward direction relative to the opening of the electrical box.

It is still another aspect of the present invention to provide an apparatus for making cutouts in sheets of construction material as previously described, wherein the means for making a cutout includes a cylindrical cutter, the apparatus for making cutouts in sheets of construction material further comprising a cutter guide comprising:

a cutter guide body adapted to be centrally located relative to the cylindrical cutter and to rotate with the cylindrical cutter as the cylindrical cutter is rotated by a driver; and a cutter guide sleeve supported by the cutter guide body such that the cutter guide sleeve can move telescopically relative to the cutter guide body, the cutter guide sleeve being adapted to receive at least a portion of the spike, wherein the cutter guide sleeve can engage the spike to locate the spike centrally relative to the cylindrical cutter and help with ensuring that the cylindrical cutter remains centered around the spike while the cylindrical cutter cuts through the sheet of construction material.

It is still another aspect of the present invention to provide an electrical box locator device for use when making cutouts in sheets of construction material for access to openings of electrical boxes mounted to a structure, the electrical box locator device comprising:

a locator device body adapted for engagement to an electrical box such that the locator device body is located at or near an opening of the electrical box and in registry with the opening of the electrical box when the locator device body is mounted to the electrical box;

at least one resilient member for frictionally engaging the electrical box to thereby keep the electrical box locator device in place relative to the electrical box when the electrical box locator device is mounted to the electrical box; and at least one spike attached to the frame such that the at least one spike projects outward perpendicularly relative to a plane coincident with the opening of the electrical box when the locator device body is mounted to the electrical box, wherein when the electrical box is mounted to the structure and the locator device body is mounted to the electrical box, a sheet of construction material can be positioned relative to the structure with the spike piercing through the sheet of construction material to at least help in locating a cutout in the sheet of construction material for the electrical box, and wherein a portion of the locator device overlaps an edge of the opening of the electrical box so as to prevent the locator device from being pushed too far in the inward direction relative to the opening of the electrical box.

It is still another aspect of the present invention to provide an electrical box locator device as previously described, wherein the cutout to be formed in the sheet of construction material has a size and shape, and wherein the at least one spike is color coded to provide an indication to the user of the size or shape or both of the cutout to be made in the sheet of construction material.

It is still another aspect of the present invention to provide an electrical box locator device as previously described, wherein the at least one resilient member is one of a plurality of resilient members for frictionally engaging the electrical box to thereby keep the electrical box locator device in place relative to the electrical box when the electrical box locator device is mounted to the electrical box.

It is still another aspect of the present invention to provide an electrical box locator device as previously described, wherein the at least one spike is color coded to provide an indication to the user of the size or shape or both of the cutout to be made in the sheet of construction material.

It is still another aspect of the present invention to provide an electrical box locator device as previously described, wherein the at least one spike is one of a plurality of spikes.

It is still another aspect of the present invention to provide an electrical box locator device as previously described, wherein the cutout to be formed in the sheet of construction material has a size and shape, and wherein the plurality of spikes are provided in a number or a pattern of locations or a shape or shapes or a color or colors such that the number of the spikes or the pattern of locations of the spikes or the shape of shapes of the spikes or the color or colors of the spikes or any combination thereof functions to code for the size or shape or both of the cutout to be made in the sheet of construction material in order to provide an indication to the user of the size or shape or both of the cutout to be made in the sheet of construction material.

It is still another aspect of the present invention to provide an electrical box locator device as previously described, wherein the cutout to be made in the sheet of construction material is polygonal in shape and has vertices, and wherein the plurality of spikes correspond in number to the vertices of the cutout that is to be formed, and each of the plurality of spikes is located proximate a respective one of the vertices of the cutout.

It is still another aspect of the present invention to provide an electrical box locator device as previously described, wherein the at least one resilient member is one of a plurality of resilient members for frictionally engaging the electrical box to thereby keep the electrical box locator device in place relative to the electrical box when the electrical box locator device is mounted to the electrical box.

It is still another aspect of the present invention to provide an electrical box locator device as previously described, wherein the cutout to be formed in the sheet of construction material has a size and shape, and wherein the plurality of spikes are provided in a number or a pattern of locations or a shape or shapes or a color or colors such that the number of the spikes or the pattern of locations of the spikes or the shape of shapes of the spikes or the color or colors of the spikes or any combination thereof functions to code for the size or shape or both of the cutout to be made in the sheet of construction material in order to provide an indication to the user of the size or shape or both of the cutout to be made in the sheet of construction material.

It is still another aspect of the present invention to provide an apparatus for making cutouts in sheets of construction material, for access to openings of electrical boxes mounted to a structure, the apparatus comprising:

an electrical box locator device as previously described; and a template having a perimeter corresponding in size and shape to the cutout that is to be formed in the sheet of construction material, the template having a plurality of holes corresponding in number and locations to the plurality of spikes, wherein when the electrical box is mounted to the structure and the locator device body is mounted to the electrical box and the sheet of construction material is positioned relative to the structure with the plurality of spikes piercing through the sheet of construction material, the template can be placed against the sheet of construction material with each of the plurality of spikes being received at least in part in a corresponding one of the plurality of holes in the template so as to define a location for the cutout in the sheet of construction material for registry with the electrical box, while correspondence between the plurality of spikes and the plurality of holes ensures that the cutout is suitable for the electrical box in terms of size, shape, and orientation, to provide for proper registry of the cutout to be formed with the electrical box.

These and other aspects of the present invention will be made clearer upon study of the detailed description of the invention provided below and the appended drawings.

BRIEF DESCRIPTION OF THE DRAWINGS

FIGS. 54-59 are views of a tenth embodiment of an apparatus for making cutouts in sheets of construction material in accordance with the present invention.

The same reference characters denote the corresponding features consistently throughout the attached drawings.

DESCRIPTION OF THE PREFERRED EMBODIMENTS

Figure 1:
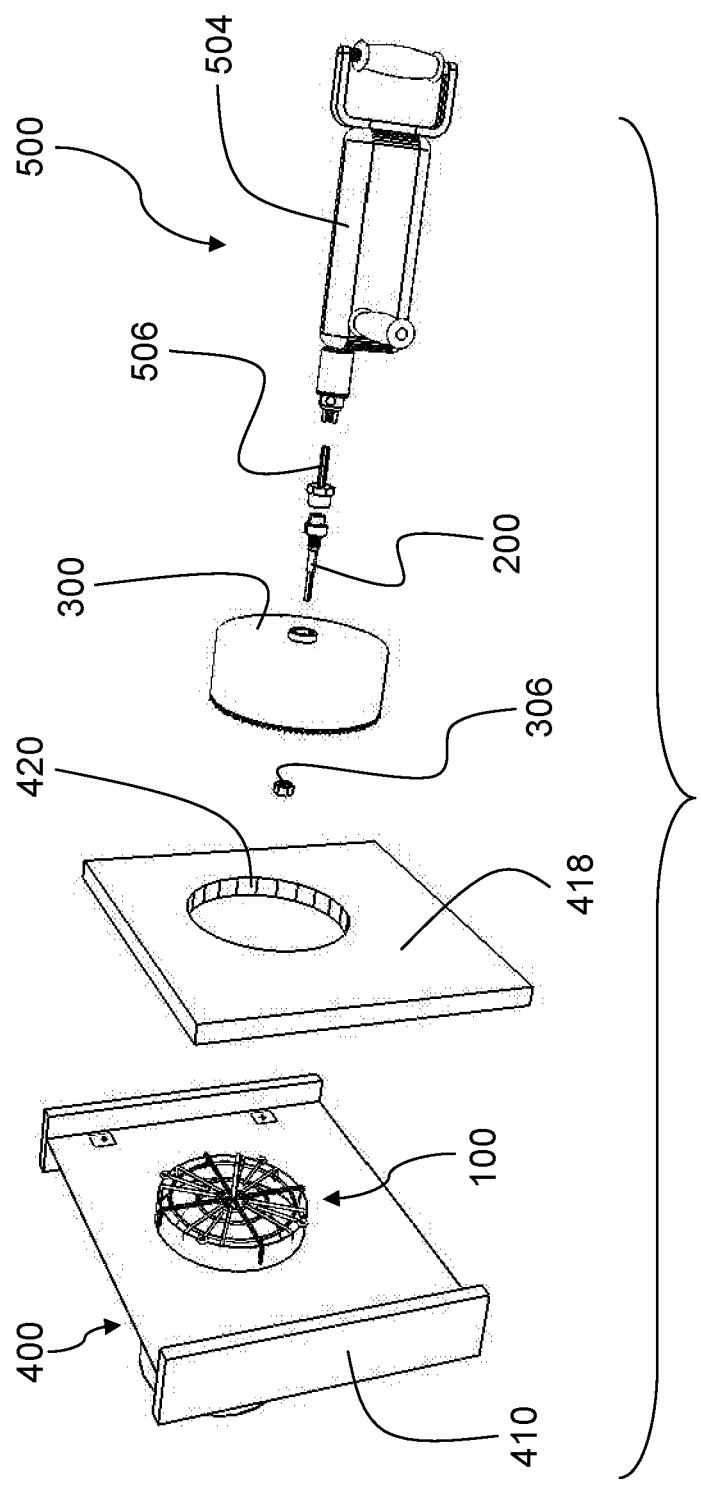
FIGS. 1-17 are views of a first embodiment of an apparatus for making cutouts in sheets of construction material in accordance with the present invention.
Figure 2:
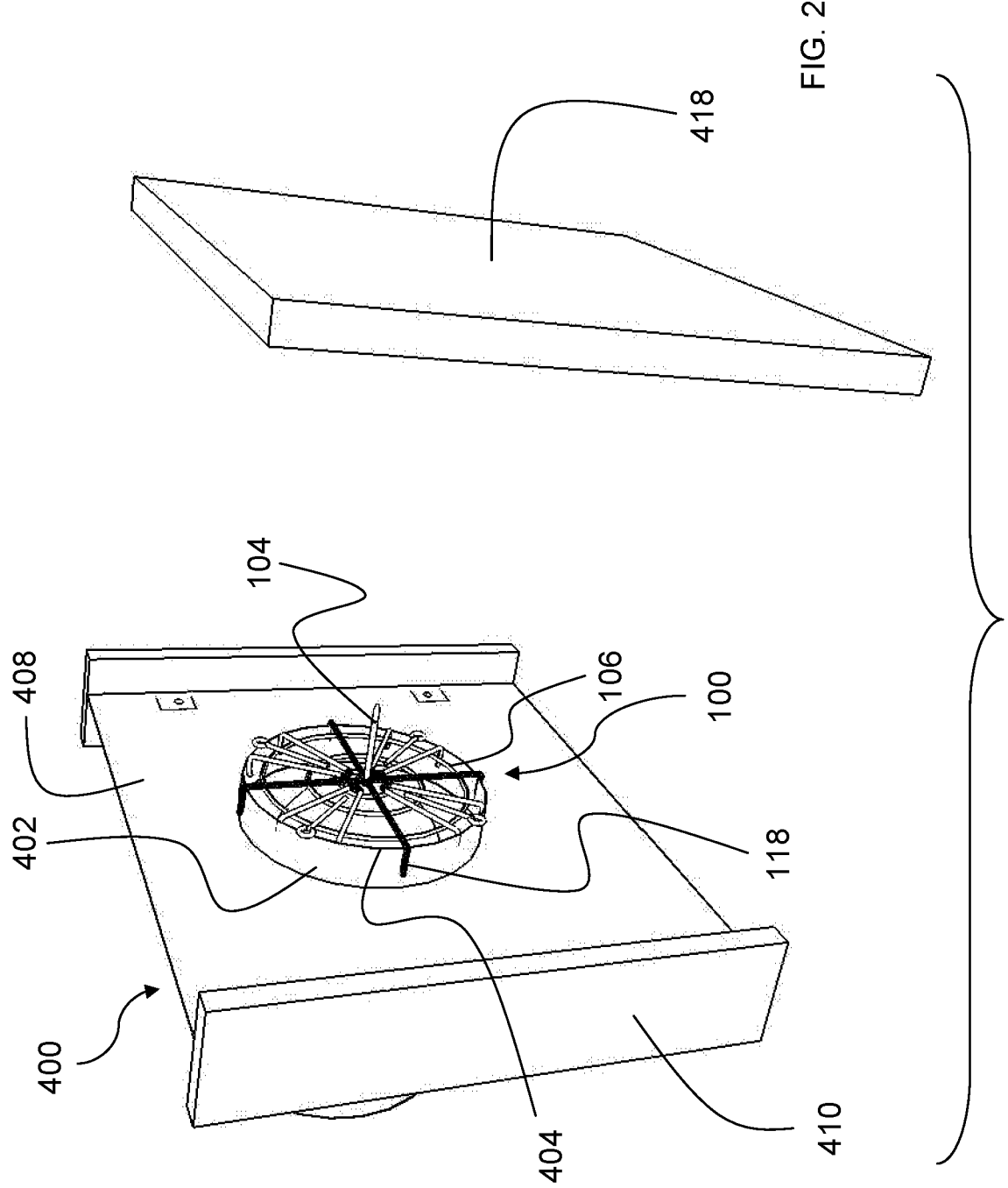
Figure 3:
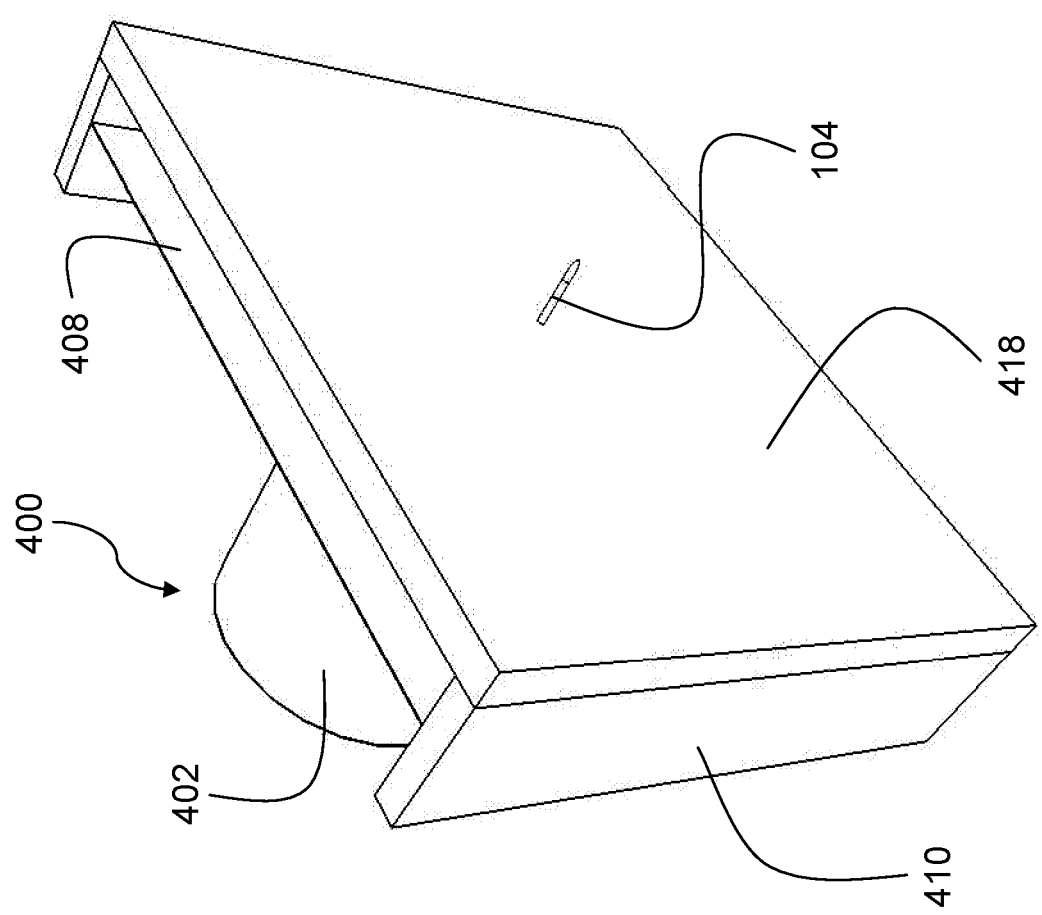
Figure 4:
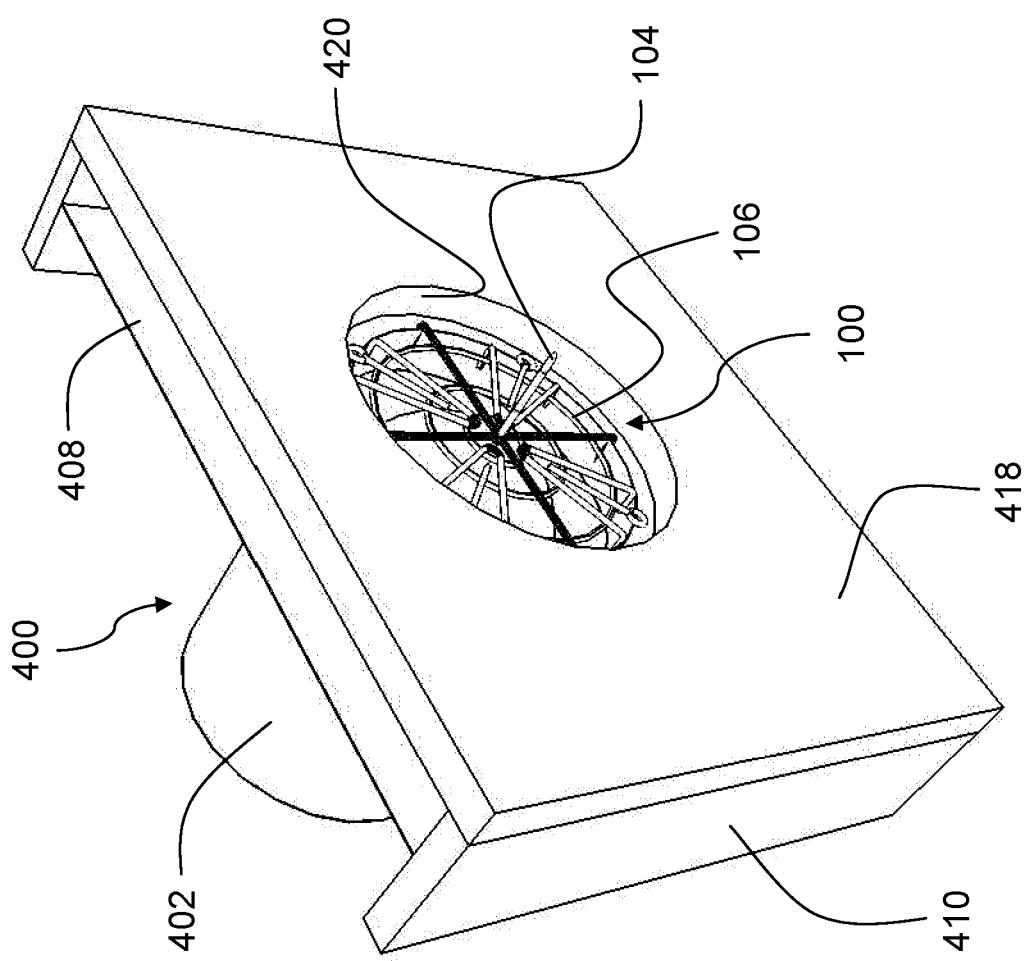
Figure 5:
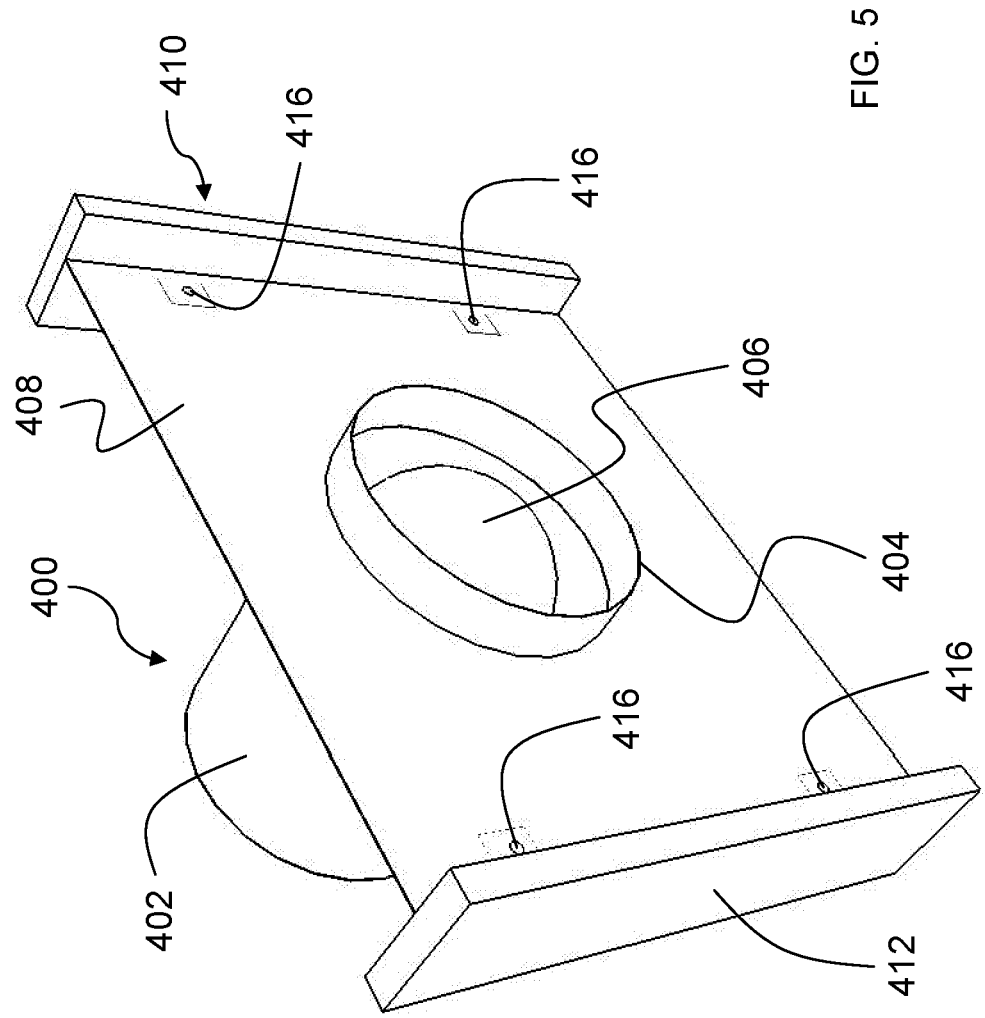
Figure 6:
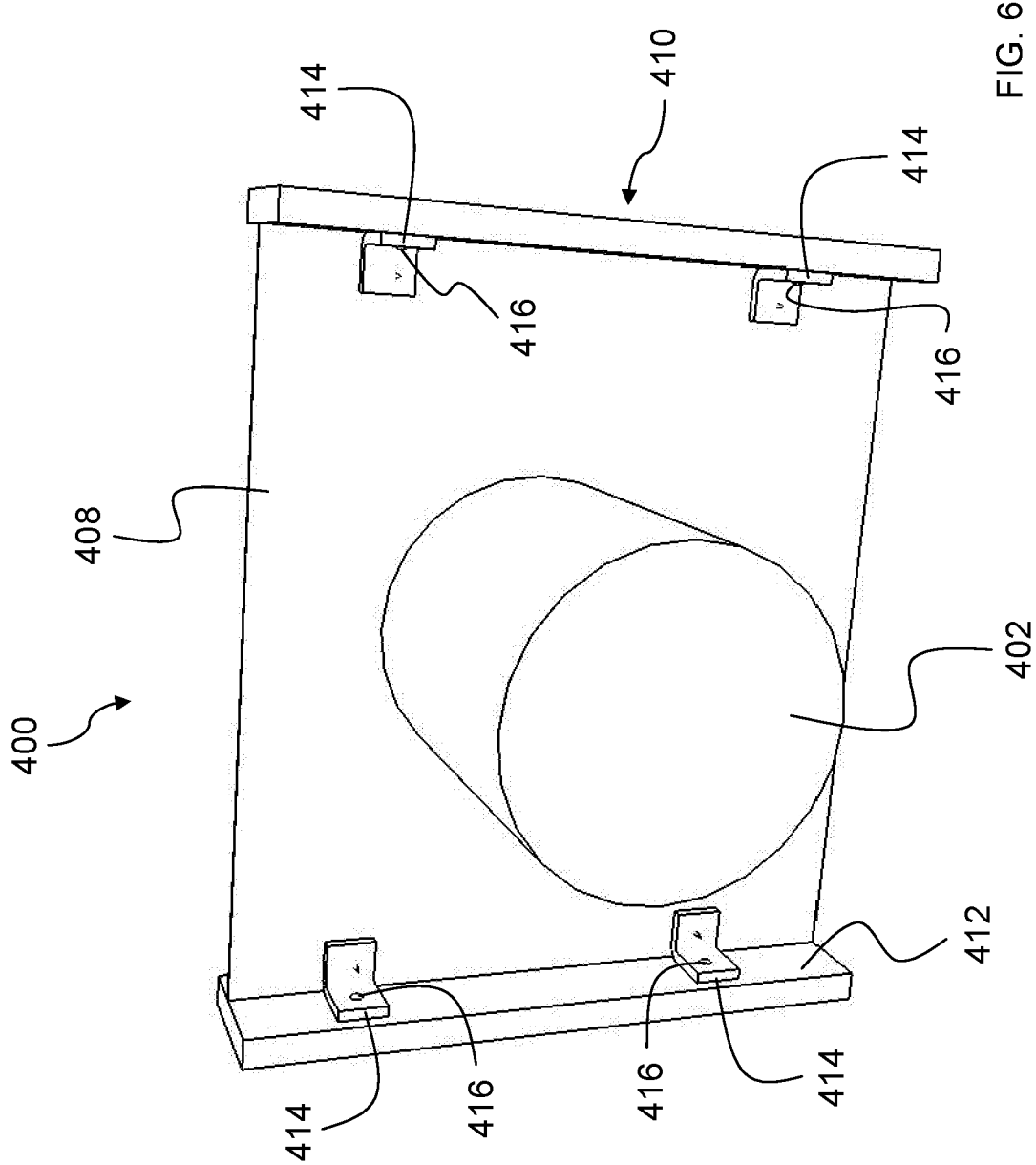
Figure 7:
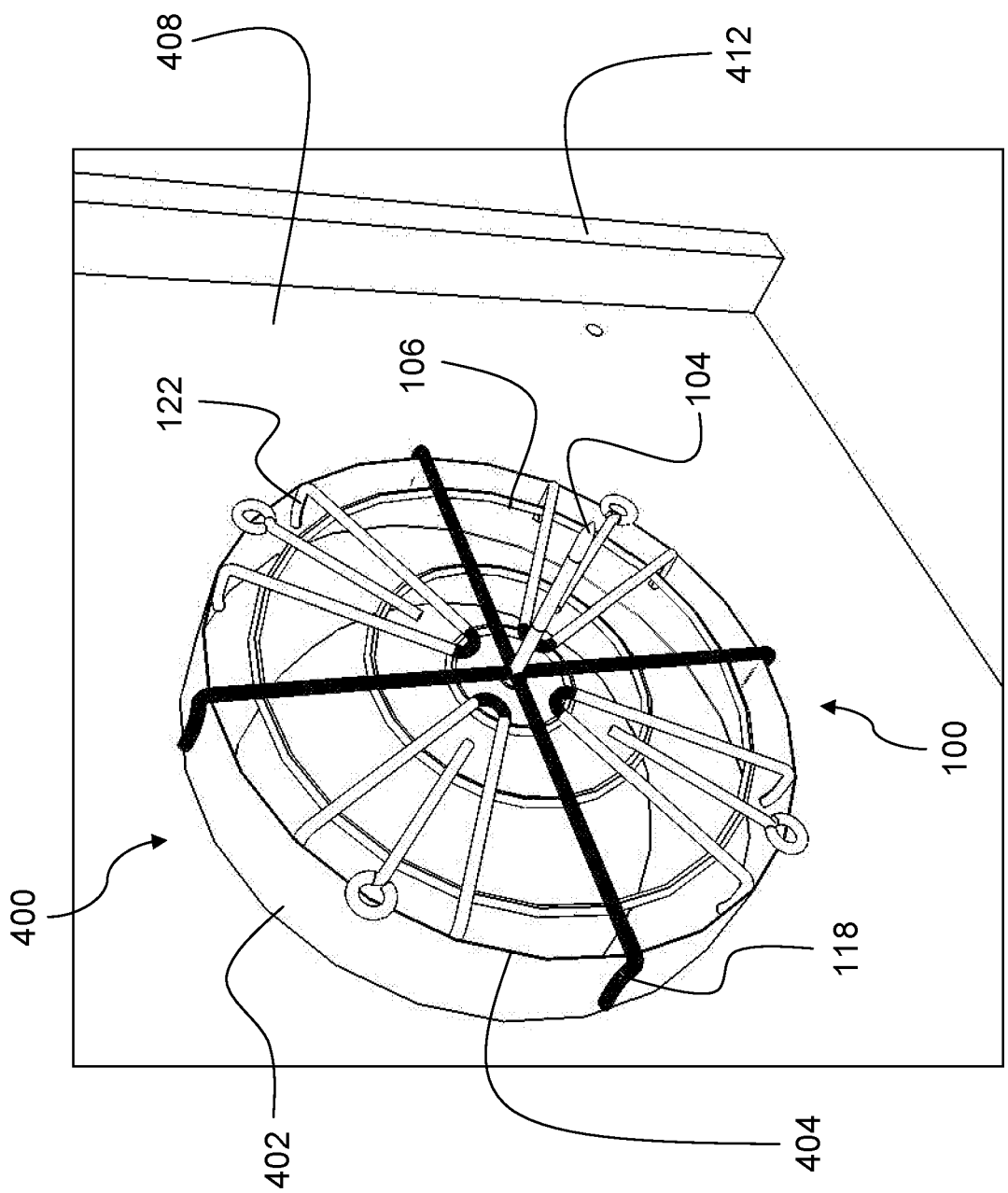
Figure 8:
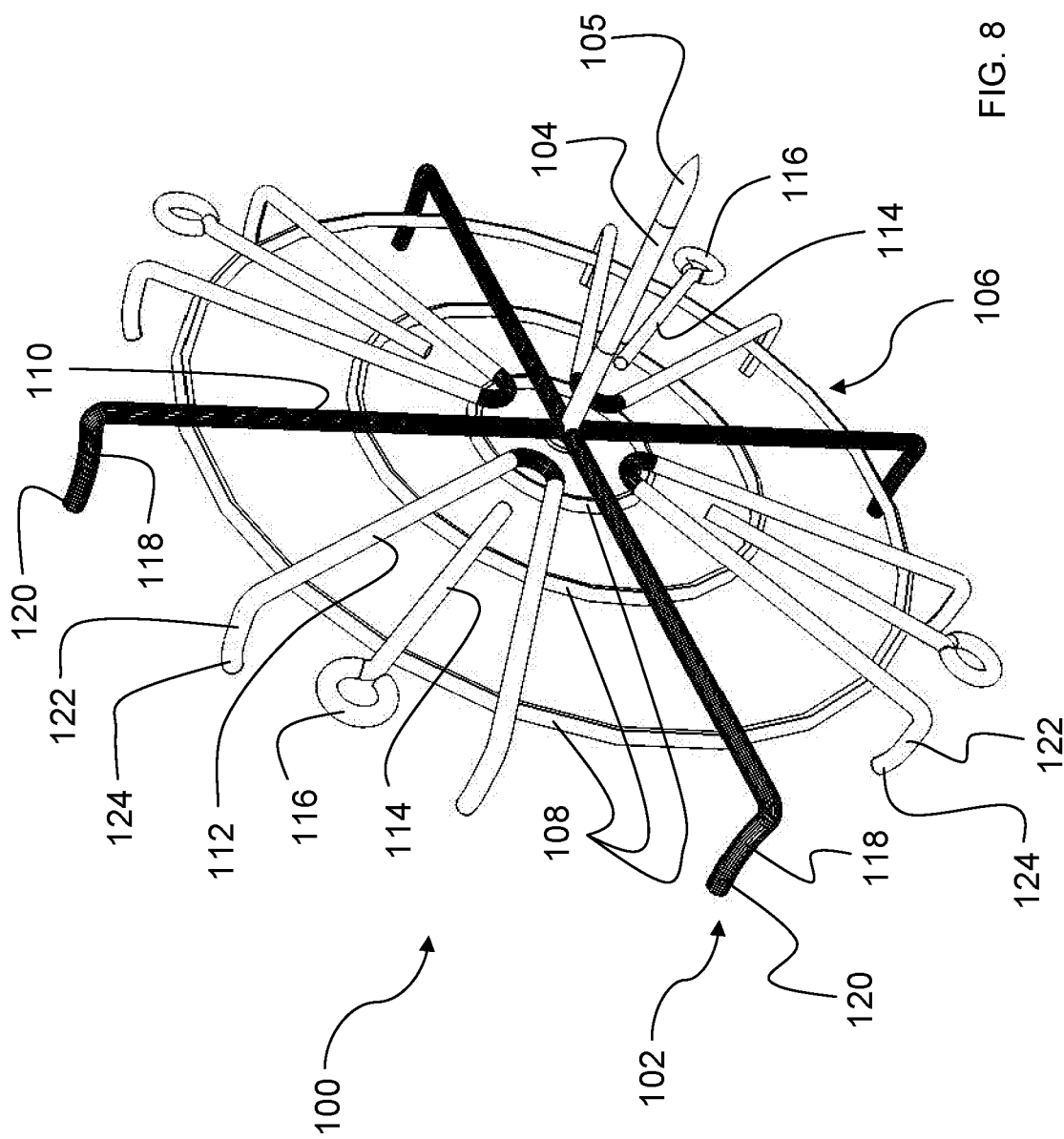
Figure 9:
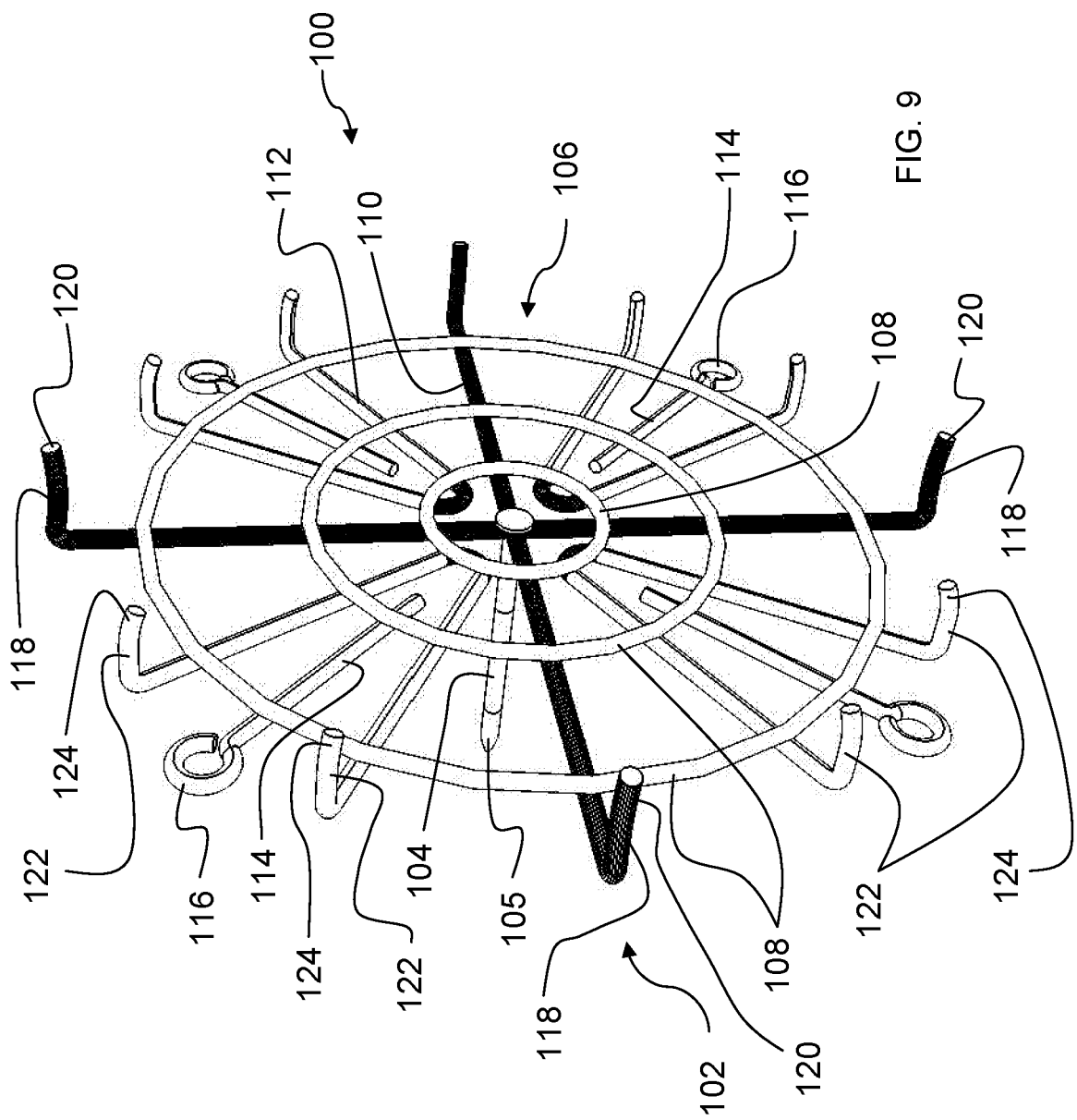
Figure 10:
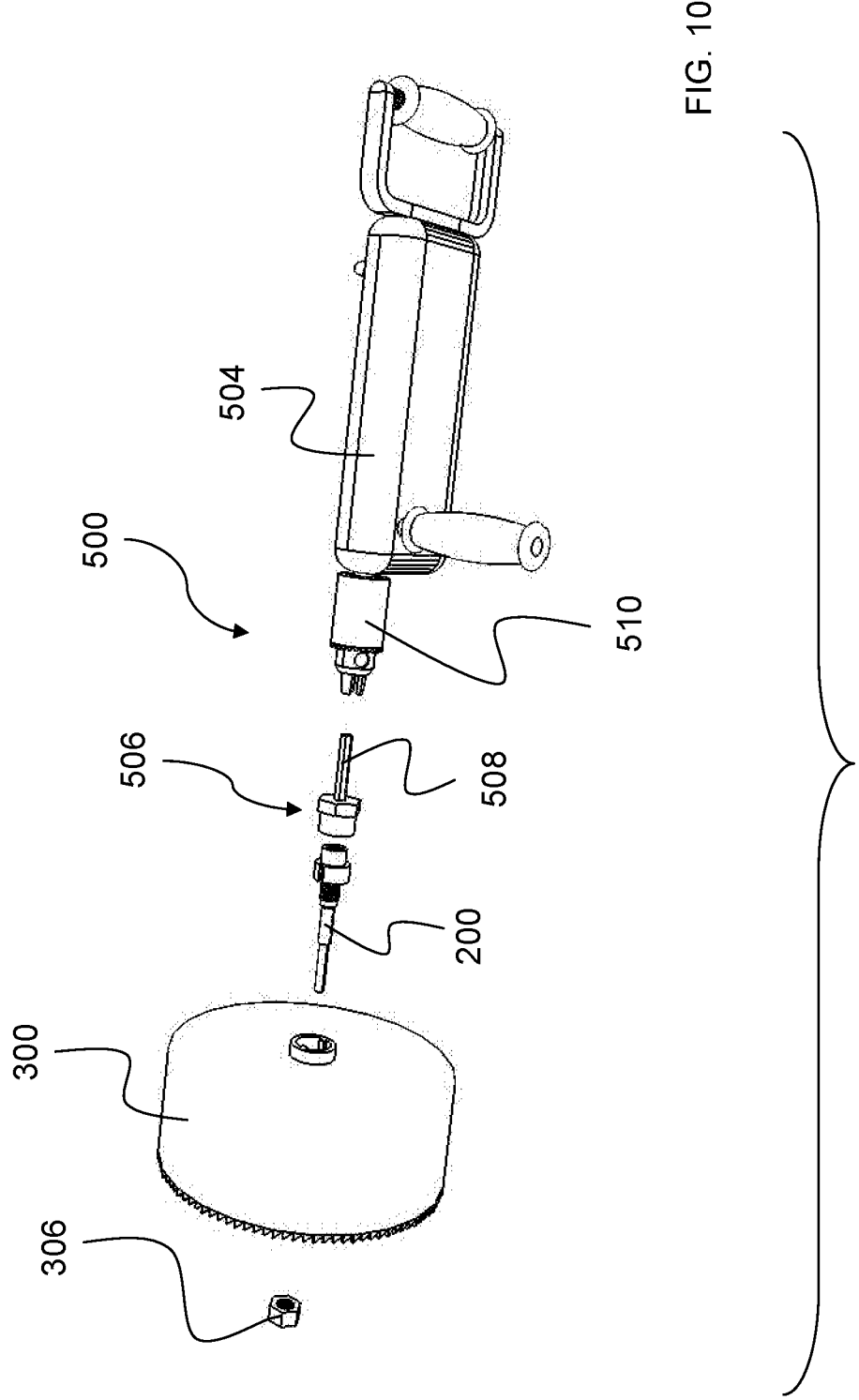
Figure 11:
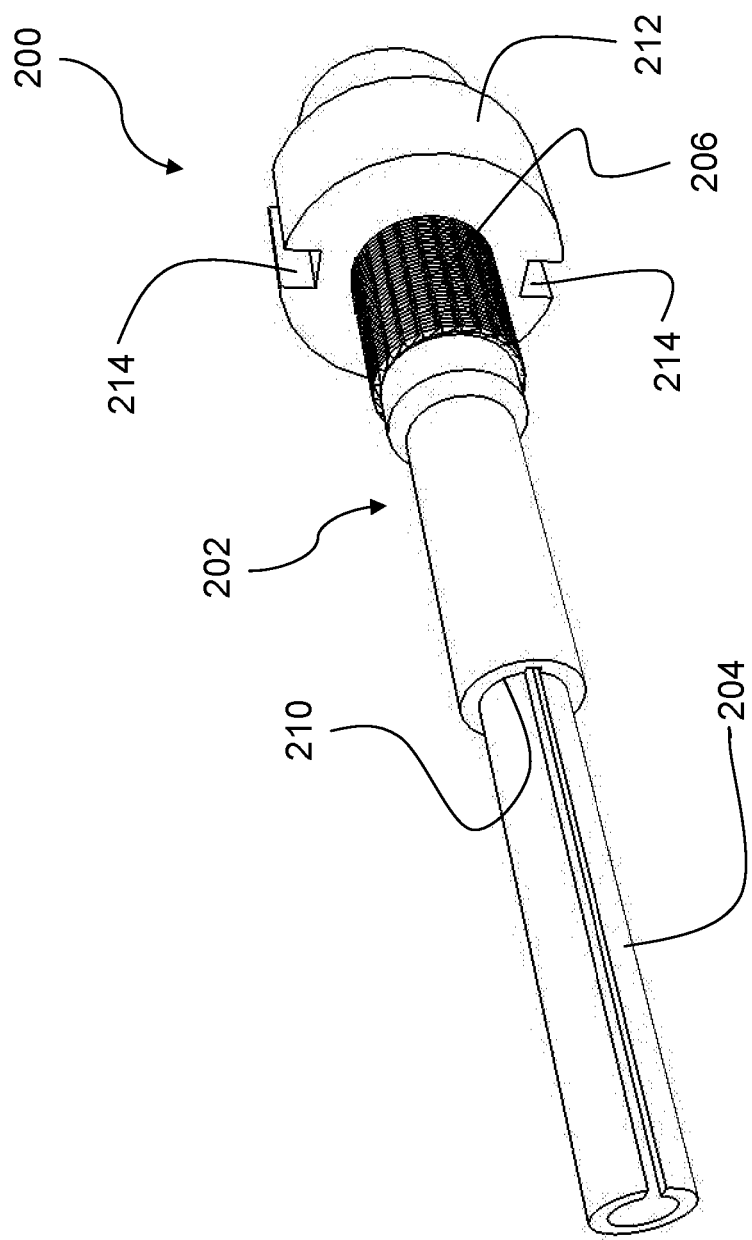
Figure 12:
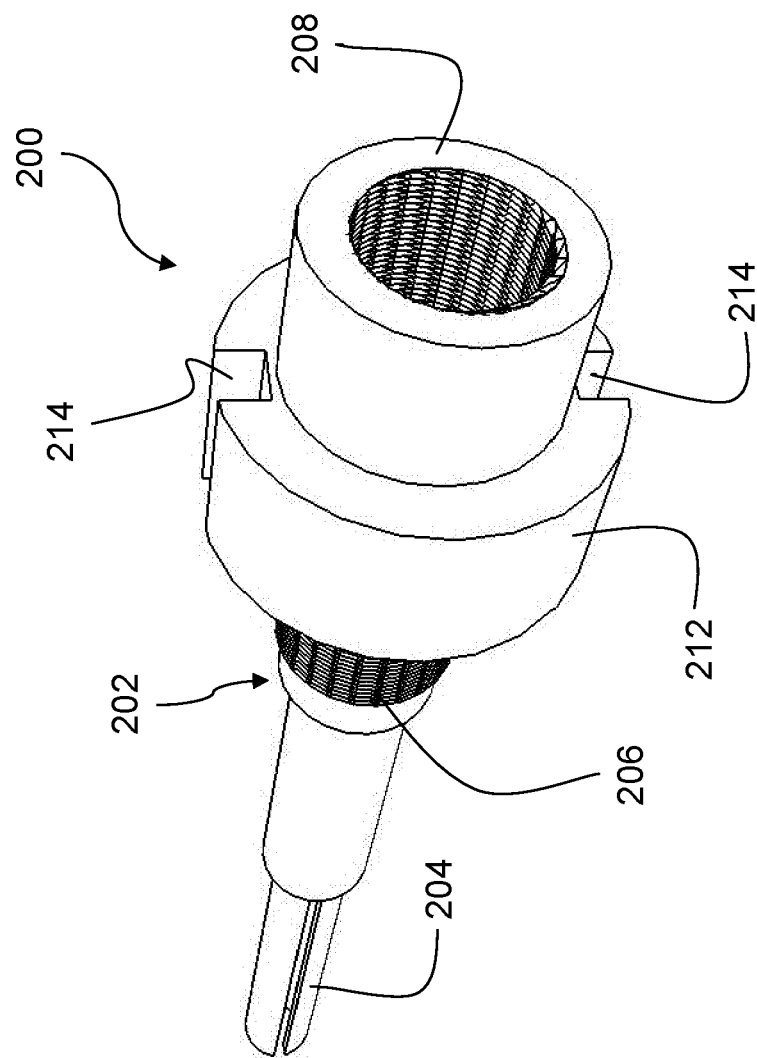
Figure 13:
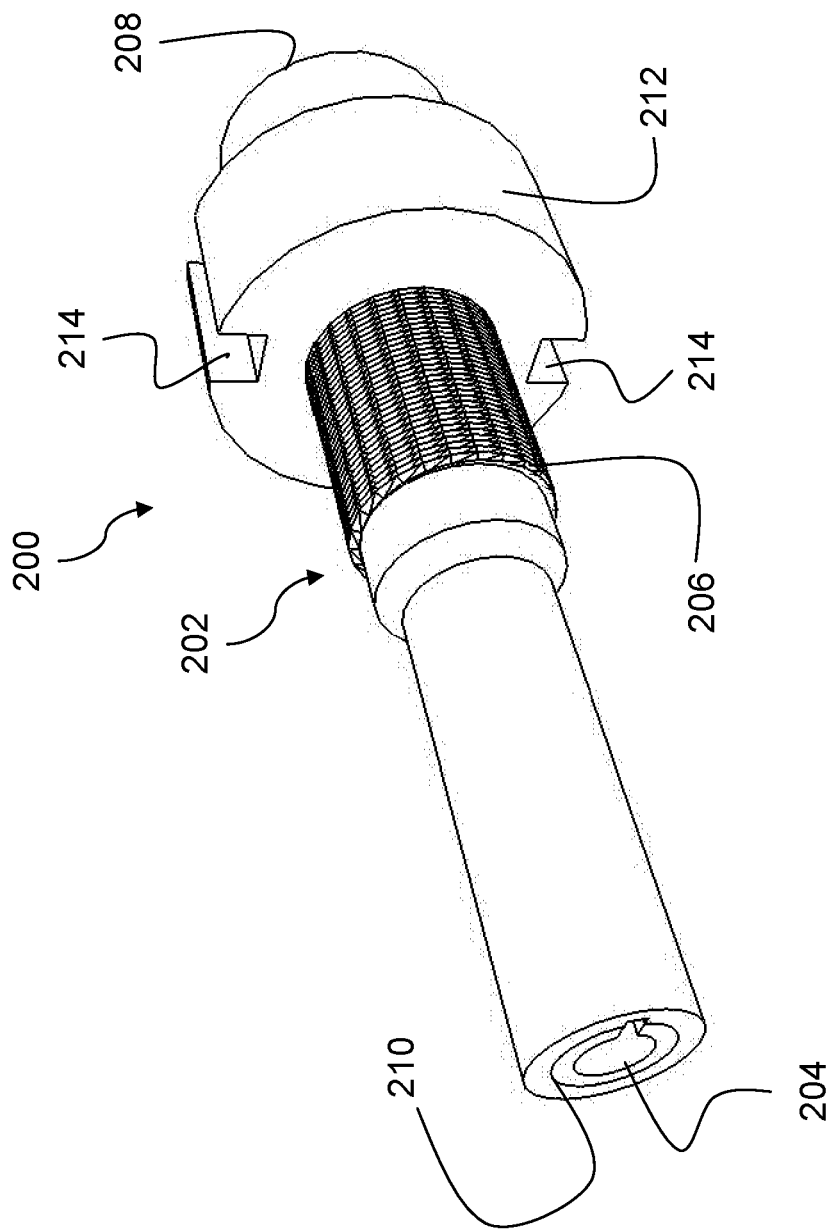
Figure 14:
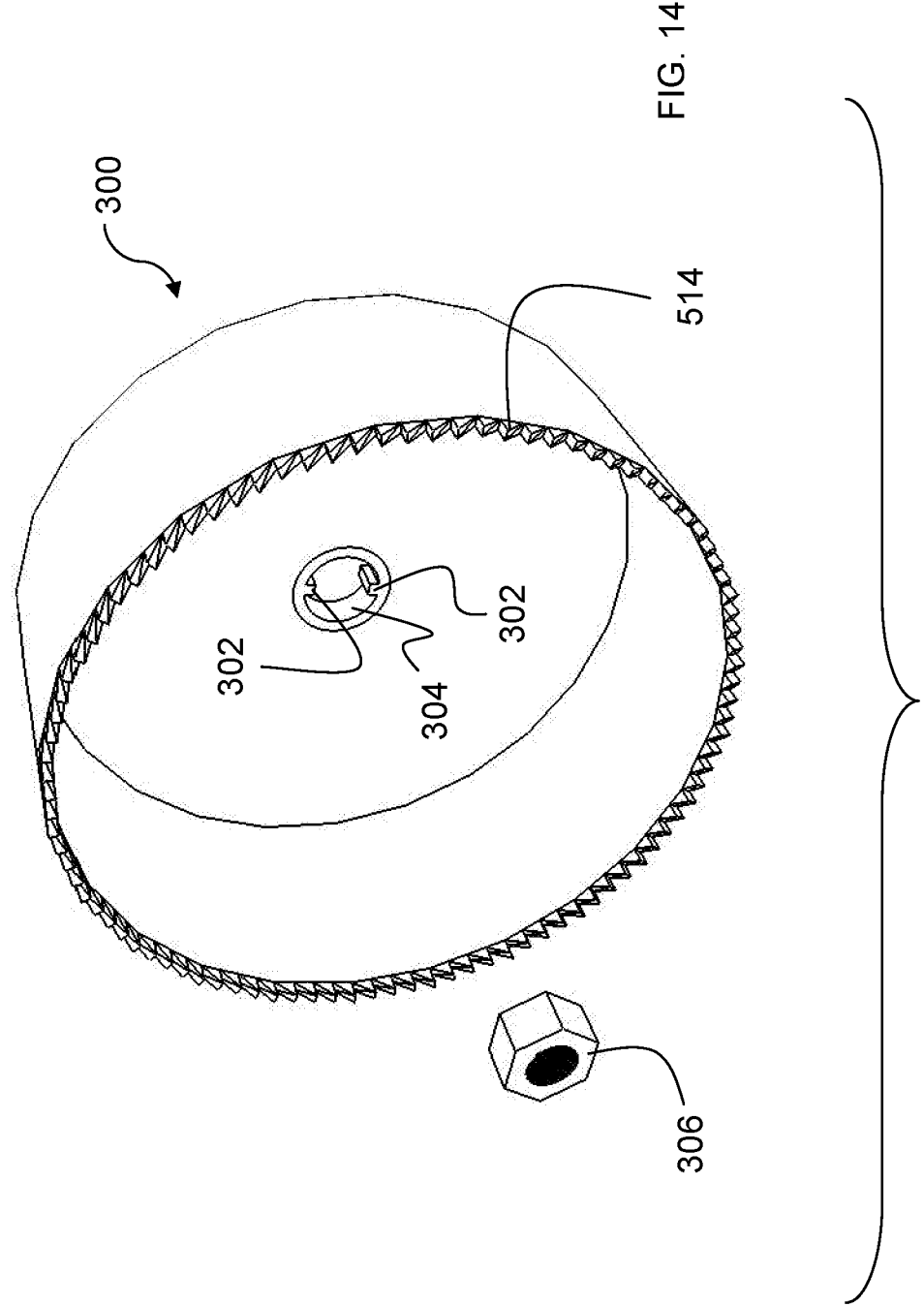
Figure 15:
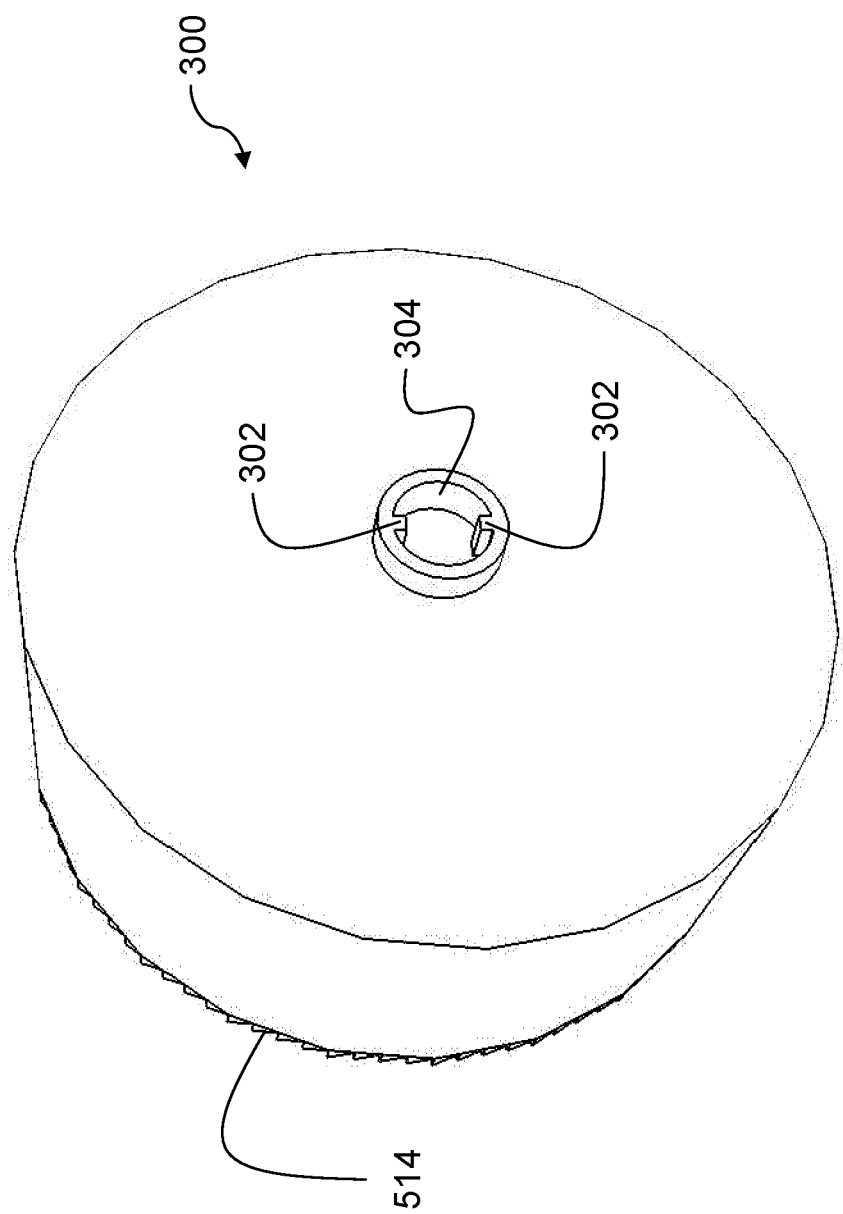
Figure 16:
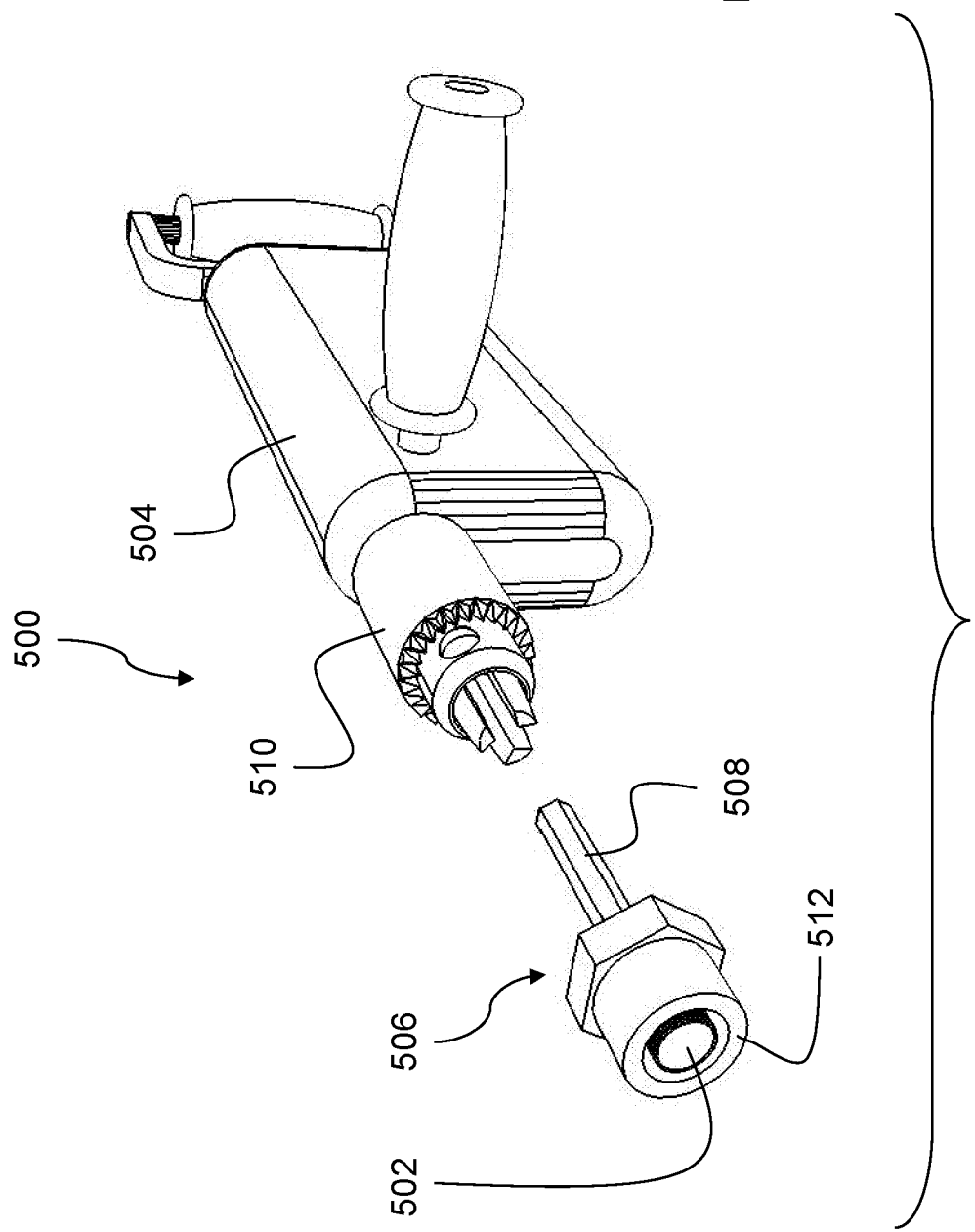
Figure 17:
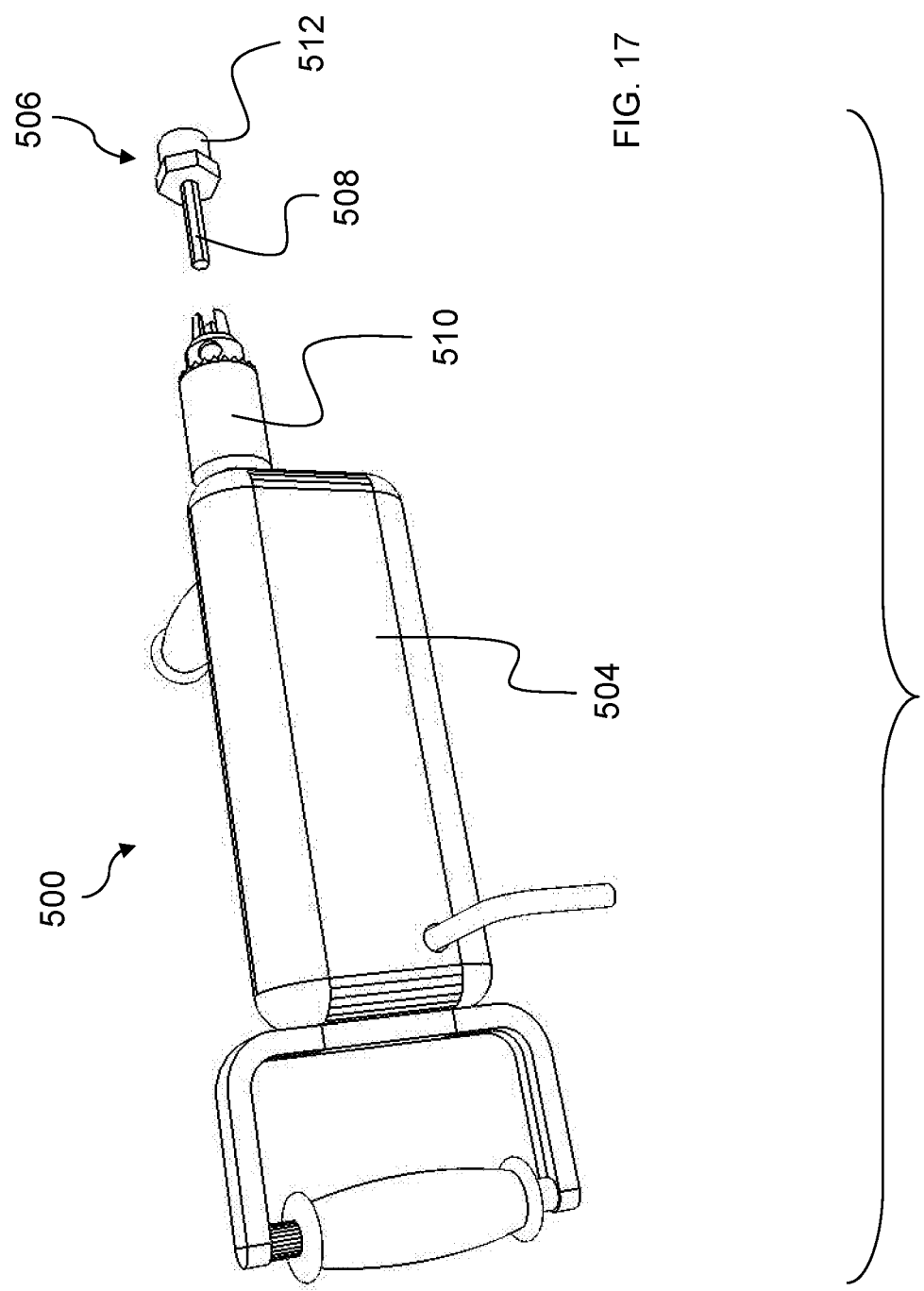

Referring to FIGS. 1-17, a first embodiment of the present invention can be seen. The first embodiment of the invention includes an electrical box locator device 100, a cutter guide 200, and a cylindrical cutter 300.

The locator device 100 includes a body 102 and a spike 104. In the illustrated example, the body 102 includes a frame 106. The frame 106 has circular members 108, radial members 110, radial members 112, radial members 114, circular members 116, outer resilient members 118, and inner resilient members 122. The distal portion 120 of each of the outer resilient members 118 curves outward away from the longitudinal axis of the spike 104. The distal portion 124 of each of the inner resilient members 122 curves inward toward the longitudinal axis of the spike 104. The spike 104 is attached to the center of the frame 106. The longitudinal axis of the spike 104 is concentric with the circular members 108. The spike 104 has a sharp, pointed end 105 that is located distally from the locator device body 102 for piercing sheet construction material 418.

The outer resilient members 118 and the inner resilient members 122 extend outward on the opposite side of the frame 106 relative to the spike 104. The outer resilient members 118 and the inner resilient members 122 are extensions of the radial members 110 and the radial members 112, respectively. Each of the circular members 116 is attached to the outer end, relative to the center of frame 106, of a respective one of the radial members 114. Each of the circular members 116 is positioned over the edge of the electrical box opening 404 to limit how far the locator device 100 can be pushed into the electrical box opening 404. The circular members 108 are held together at least by virtue of their attachment to the radial members 110. The spike 104 is attached to the inner ends of the radial members 110. The various members of the frame 106 and the spike 104 may be welded together.

In the illustrated example, the electrical box 400 is a light fixture. The electrical box 400 has a cylindrical portion 402 that houses the light 406. The cylindrical portion 402 of the electrical box 400 has a circular front opening 404 to allow the light to project outward to, for example, light a room. The circular opening 404 also defines the front opening of the electrical box 400. The electrical box 400 has a support plate 408. The cylindrical portion 402 of the electrical box 400 is attached to the support plate 408 such that cylindrical portion 402 of the electrical box 400 extends through a circular hole in the center of the support plate 408. The support plate 408 facilitates the attachment of the electrical box 400, including the cylindrical portion 402, to the building structure 410 that includes the framing 412, which may be ceiling or floor joists or wall studs. In the illustrated example, the electrical box 400 is attached to the framing 412 by attaching the support plate 408 to the framing 412 using brackets 414 and nails 416.

In building structures, it is customary to cover the framing 412 with sheets of construction material 418, which may be, for example, dry wall, also known as wall board, plasterboard, sheet rock, or gypsum board, wood paneling or plywood panels. In order for the light from fixture 400 to reach the interior of a room for example, a cutout 420 must be made in the opaque sheet 418 that corresponds to the front opening 404 of the electrical box 400, which means that the cutout 420 is of proper size and shape and is in registry with the front opening 404 of the electrical box 400.

The cutter guide 200 includes a cutter guide body 202 and a cutter guide sleeve 204. The cutter guide body 202 is adapted to be centrally located relative to the cylindrical cutter 300 and to rotate with the cylindrical cutter 300 as the cylindrical cutter 300 is rotated by a driver 500. The cutter guide sleeve 204 is supported by the cutter guide body 202 such that the cutter guide sleeve 204 can move telescopically relative to the cutter guide body 202. The cutter guide sleeve 204 is adapted to receive at least a portion of the spike 104 in its central bore. The cutter guide sleeve 204 can engage the spike 104 to locate the spike centrally relative to the cylindrical cutter 300 and help ensure that the cylindrical cutter 300 remains centered about the spike 104 while the cylindrical cutter 300 cuts through the sheet of construction material 418.

When the locator device 100 is mounted to the electrical box 400, the spike 104 will be concentric with the front opening 404 of the electrical box 400. The spike 104 is preferably long enough such that a portion of its shaft as well as its pointed end portion project outward from the side of the sheet of construction material 418 that is opposite the side of the sheet 418 that faces the electrical box 400 when the sheet of construction material 418 is positioned against the body 102 of the locator device 100 and over the opening of the electrical box. Preferably, the cutter guide sleeve 204 receives the portion of the spike 104 that projects outward from the side of the sheet 418 that faces away from the electrical box 400 when the cylindrical cutter 300 rests against that same side of the sheet and before the cutting operation has begun. Accordingly, the cylindrical cutter 300 will be concentric with the spike 104 and in turn with the electrical box front opening 404. Therefore, the cutout to be made will also be concentric with the electrical box front opening 404.

The cutter guide sleeve 204 is rectilinearly movable between an extended position and a fully retracted position relative to the cutter guide body 202. As the cutting operation begins and the cylindrical cutter 300 cuts and is pushed into the sheet material 418, the cutter guide sleeve 204 continues to receive the portion of the spike 104 projecting outward from the sheet material 418, while the cutter guide sleeve 204 continually retracts into the cutter guide body 202. The range of telescoping movement of the cutter guide sleeve 204 relative to the cutter guide body 202 must be at least long enough to ensure that the cutter guide sleeve 204 can continue to retract until the cutter 300 has cut completely through the sheet material 418 without being hindered by the cutter guide body 202. The continual engagement between the spike 104 and the cutter guide sleeve 204 ensures that the cutter 300 is at all times concentric with the front electrical box opening 404, which in turn ensures that the cutout is in proper registry or alignment with the front electrical box opening 404.

The cutter guide body 202 includes a first threaded portion 206, a second threaded portion 208, a non-circular portion 212 that has a non-circular cross section, and a bore 210 for telescopically receiving the cutter guide sleeve 204. The cutter 300 has a non-circular hole 304 that engages the non-circular portion 212 of the cutter guide so that the cutter 300 rotates together as a unit with the cutter guide body 202. Accordingly, when the cutter guide 200 is rotated by an appropriate driver, such as the power driver 500, the cutter 300 will rotate with the cutter guide 200 and cut material such as the sheet material 418. When the cutter 300 is engaged to the cutter guide 200 with the non-circular hole of the cutter 300 in mating engagement with the non-circular portion 212 of the cutter guide 200, a nut 306 can be threadedly engaged to the first threaded portion 206 to secure the cutter 300 to the cutter guide 200. In the illustrated example, the non-circular hole of the cutter 300 is provided with ribs 302 and the non-circular portion 212 of the cutter guide 200 is provided with grooves 214. The ribs 302 are matingly engageable with the grooves 214 so that the cutter 300 rotates together with the cutter guide body 202.

Alternatively, the non-circular hole of the cutter 300 and the non-circular portion 212 of the cutter guide 200 can each be provided with at least one flat side, also referred to as a flat. The flats on the non-circular portion 212 of the cutter guide 200 would matingly engage the flats on the non-circular hole of the cutter 300 so that the cutter 300 rotates together with the cutter guide body 202. Also the non-circular hole of the cutter 300 and the non-circular portion 212 of the cutter guide 200 can be keyed to one another, or they can be provided with matingly engageable teeth or splines.

The second threaded portion 208 is adapted for secure engagement to the shaft 502 of the driver 500 such that the cutter guide 200 and the shaft 502 of the driver 500 rotate together while the cutter 300 cuts the sheet material 418. In the illustrated example, the second threaded portion 208 is provided with female threads while the shaft 502 is provided with male threads. In the illustrated example, the driver 500 includes a standard power tool 504, such as a standard power drill, and a driver adapter 506. The shaft 502 of the driver 500 is part of the driver adapter 506. The driver adapter 506 has a shaft 508 extending opposite the shaft 502 for engagement with the chuck 510 of the power drill 504 so that the cutter guide body 202, and in turn the cutter 300, can be rotated under power by the power drill/driver 504 for cutting the sheet material 418. In the illustrated example, the driver adapter 506 also has a sleeve 512 around the threaded shaft 502. The second threaded portion 208 of the cutter guide body 202 fits between the threaded shaft 502 and the sleeve 512 when the second threaded portion 208 is secured to the shaft 502. The sleeve 512 blocks one end of each of the grooves 214 when the second threaded portion 208 is secured to the shaft 502 so as to capture and secure the cutter 300 between the nut 306 and the sleeve 512.

Alternatively, the grooves 214 may be closed off at their ends that are distal from the nut 306, thus obviating the need for the sleeve 512. Also, the standard power tool and adapter combination may be replaced with a specifically designed power tool that has the threaded shaft 502 as its output shaft and has the sleeve 512 if necessary. A hand cranked driver may also be used, either with a chuck and adapter or with the output shaft being in the form of shaft 502. Again, the sleeve 512 may be provided as part of the adapter or the hand cranked driver if required.

The cutter guide sleeve 204 may be keyed to cutter guide body 202. Also, the cutter guide sleeve 204 may be spring loaded to automatically return to the extended position. In the illustrated example, the cutter 300 as shown has saw teeth 514. Alternatively, the cutter 300 may have a plain, sharp edge coated with abrasive particles. The spike 104 can be color coded to code for the size of the cylindrical cutter 300 to be used for the particular electrical box opening.

In use, the locator device 100 is mounted to the front opening 404 of the electrical box 400. The inner resilient members 122 frictionally engage a portion of the interior of the electrical box proximate the opening 404 and the outer resilient members 118 frictionally engage a portion of the exterior of the electrical box proximate the opening 404 in order to hold the locator device 100 in position during the installation and cutting of the sheet material 418 to form the cutout 420 for the electrical box opening 404. The sheet material 418 is then positioned over its final intended position and pressed against the locator device 100 such that the spike 104 pierces the sheet material and extends outward from the side of the sheet material facing away from the locator device 100. The cutter 300 and the cutter guide 200 are assembled together and secured to the driver 500. The cutter guide sleeve 204 is then placed in the extended position manually, unless the cutter guide sleeve 204 is spring biased to the extended position. The cutter guide sleeve 204 is then engaged to the spike 104 such that the spike 104 is at least partially received in the bore of the cutter guide sleeve 204. The driver 500 is then started and the cutter 300 pushed into the sheet material until the cutter 300 cuts completely through the sheet material to form the cutout. During the cutting operation, the cutter guide sleeve 204 retracts farther into the cutter guide body 202 toward the fully retracted position as the cutter 300 cuts and is pushed farther into the sheet material 418. The engagement between the cutter guide sleeve 204 and the spike 104 keeps the cutter 300 in proper alignment and concentric with the opening of the electrical box, thus ensuring that the cutout 420 for the opening of the electrical box is in the proper location in the sheet material 418. The locator device 100 is then removed through the completed cutout 420.

Figure 18:
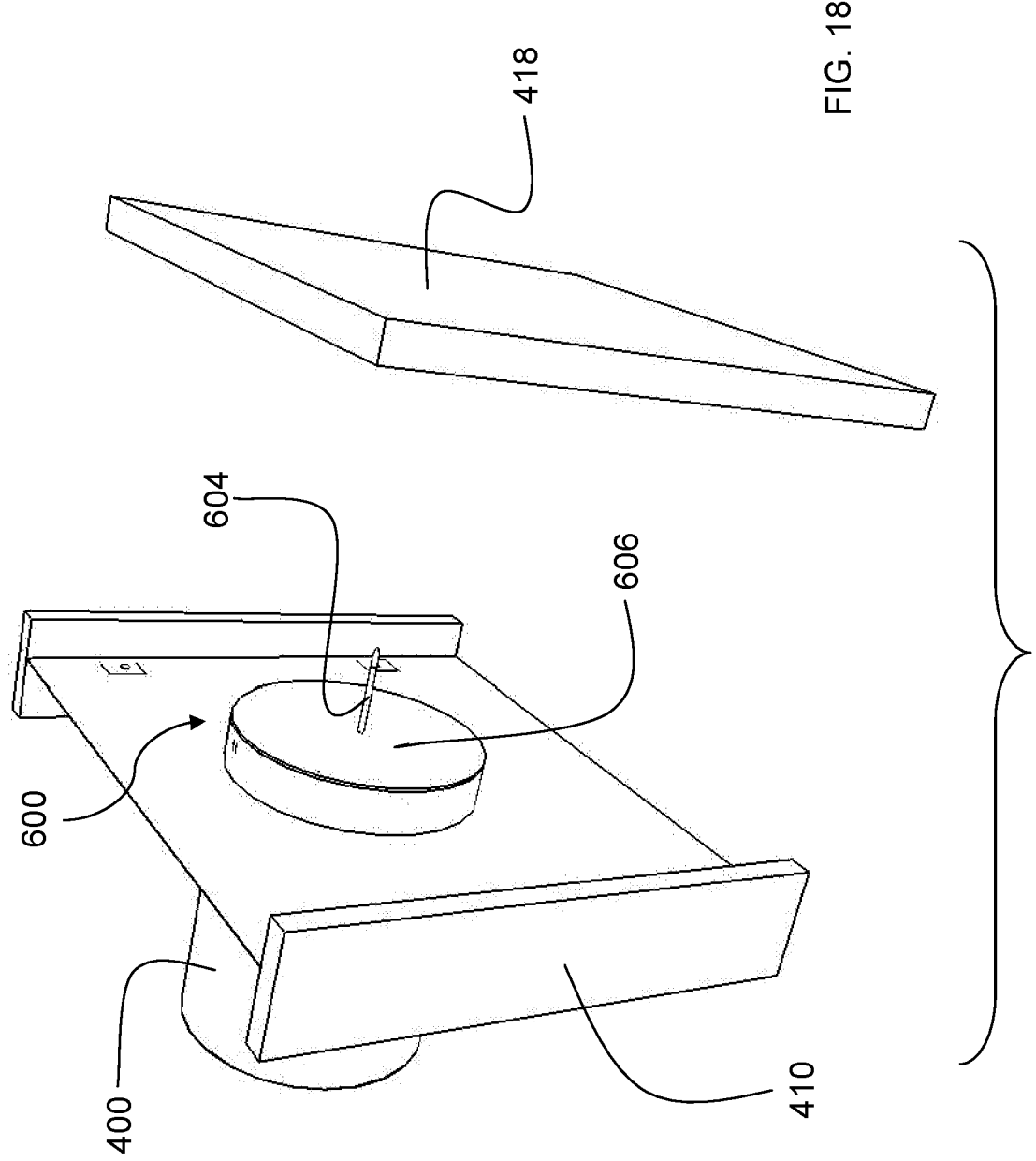
FIGS. 18-21 are views of a second embodiment of an apparatus for making cutouts in sheets of construction material in accordance with the present invention.
Figure 19:
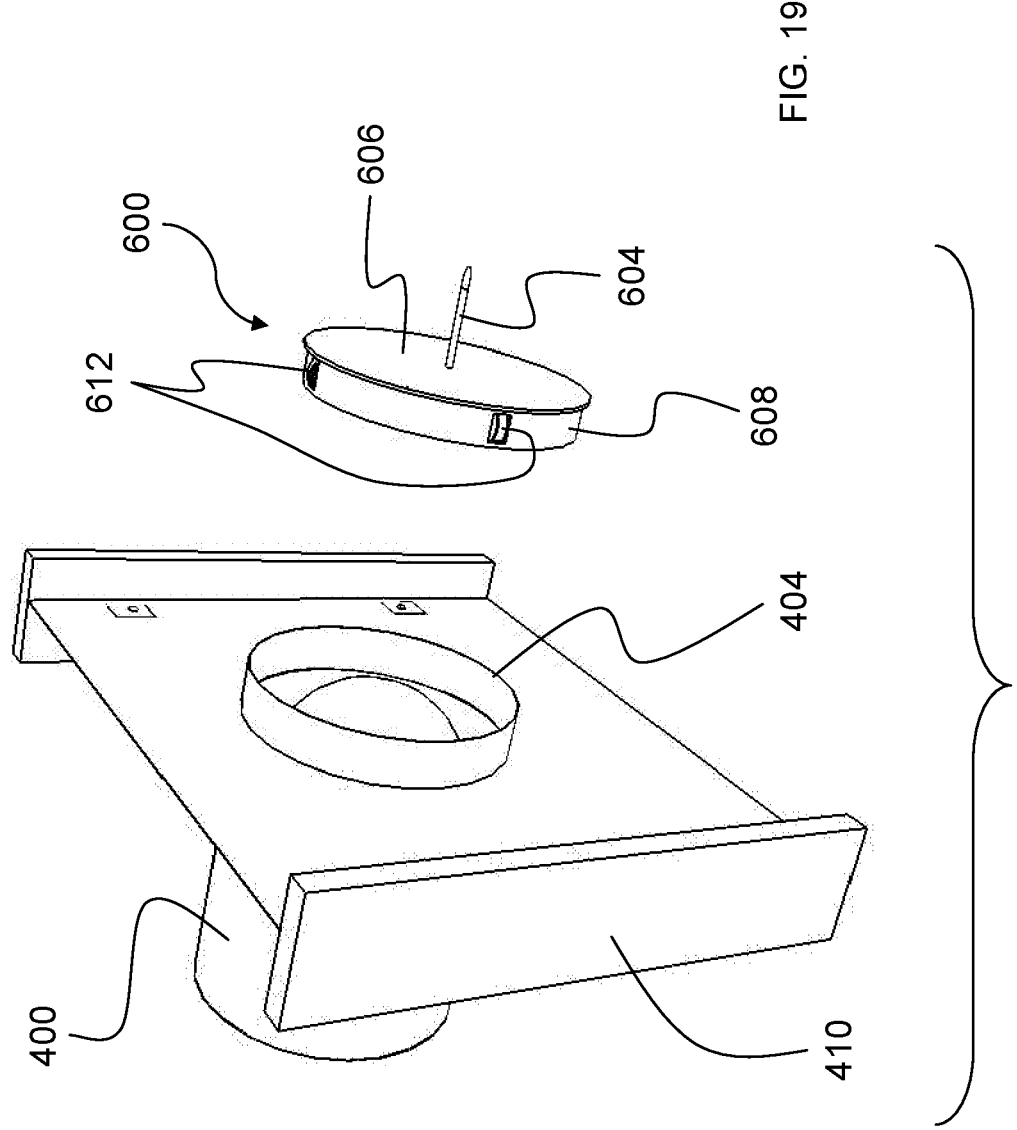
Figure 20:
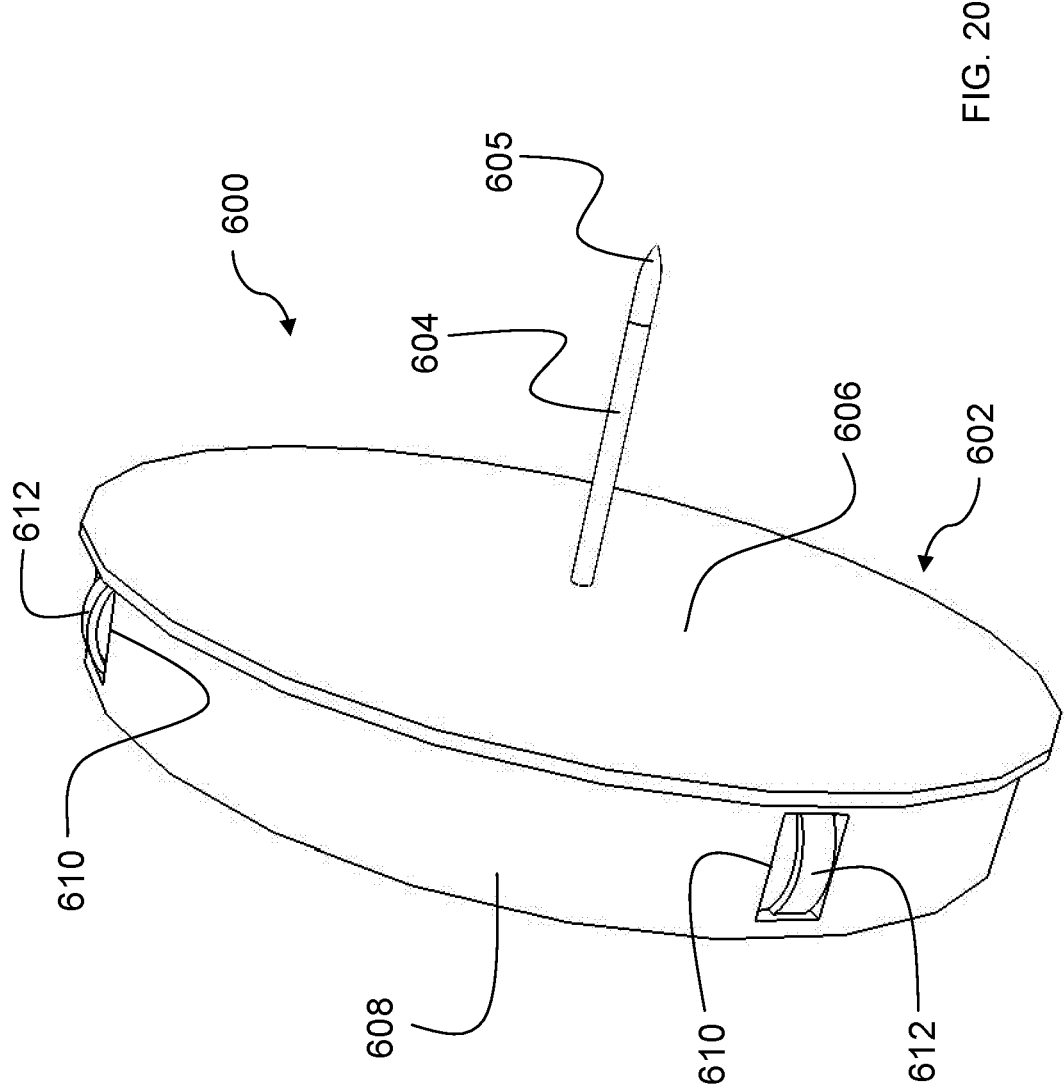
Figure 21:
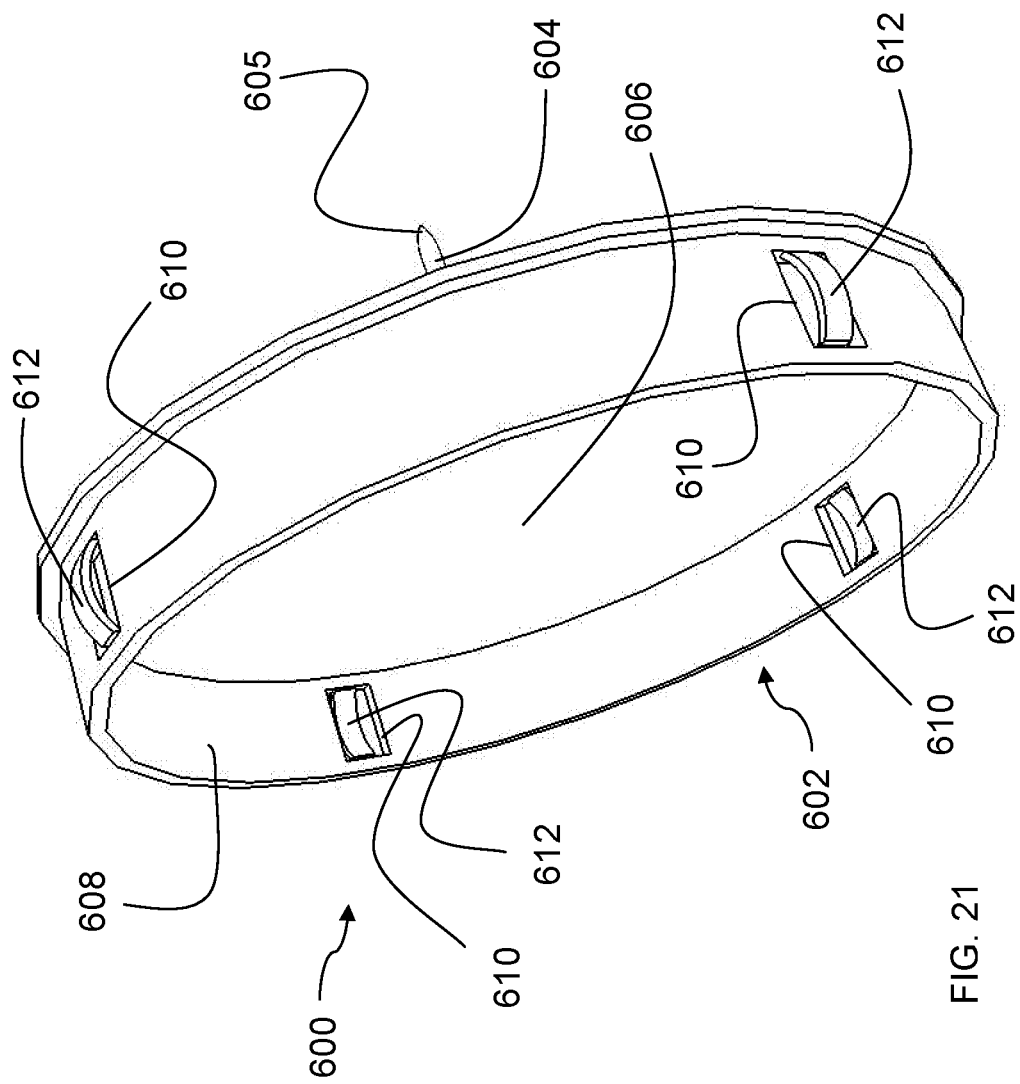

Referring to FIGS. 18-21, a second embodiment 600 of the locator device can be seen. The electrical box locator device 600 includes a body 602 and a spike 604. In the illustrated example, the body 602 includes a disc 606. The disc 606 is circular and sized to fit over the electrical box opening 404. The disc 606 is made of a flat plate material that is sufficiently strong and rigid. Examples of suitable material include metal plate such as steel or aluminum plate, sheet metal, composites, polymer material, and fiber reinforced polymers. The term "polymers" as used herein is intended to encompass plastics. The body 602 also includes a short cylindrical sleeve 608 that fits inside the electrical box opening 404 when the disc 606 is placed over the electrical box opening 404 and the electrical box locator device 600 is mounted to the electrical box 400. The sleeve 608 projects from the opposite side of the disc 606 relative to the spike 604. The sleeve 608 has windows 610 provided in its wall. A resilient member 612 is attached, in cantilever fashion, to the side of each window nearest the disc 606. Each of the resilient members 612 is bowed outward beyond the outer circumference of the sleeve 608 when not in use such that the resilient members can frictionally engage an interior surface of the electrical box 400 proximate the electrical box opening 404 when the electrical box locator device 600 is mounted to the electrical box 400. The spike 604 is attached to the center of the disc 606. The longitudinal axis of the spike 104 is perpendicular to the circular surfaces of the disc 606. The spike 604 has a sharp, pointed end 605 that is located distally from the locator device body 602 for piercing sheet construction material 418. The disc 606 extends over the edge of the electrical box opening 404 to limit how far the locator device 600 can be pushed into the electrical box opening 404.

In use, the locator device 600 is mounted to the front opening 404 of the electrical box 400. The resilient members 612 frictionally engage a portion of the interior of the electrical box proximate the opening 404 in order to hold the locator device 600 in position during the installation and cutting of the sheet material 418 to form the cutout 420 for the electrical box opening 404. The locator device 600 is used and functions in exactly the same way as the locator device 100. Vent cutouts can be made in the disc 606 if desired.

Figure 22:
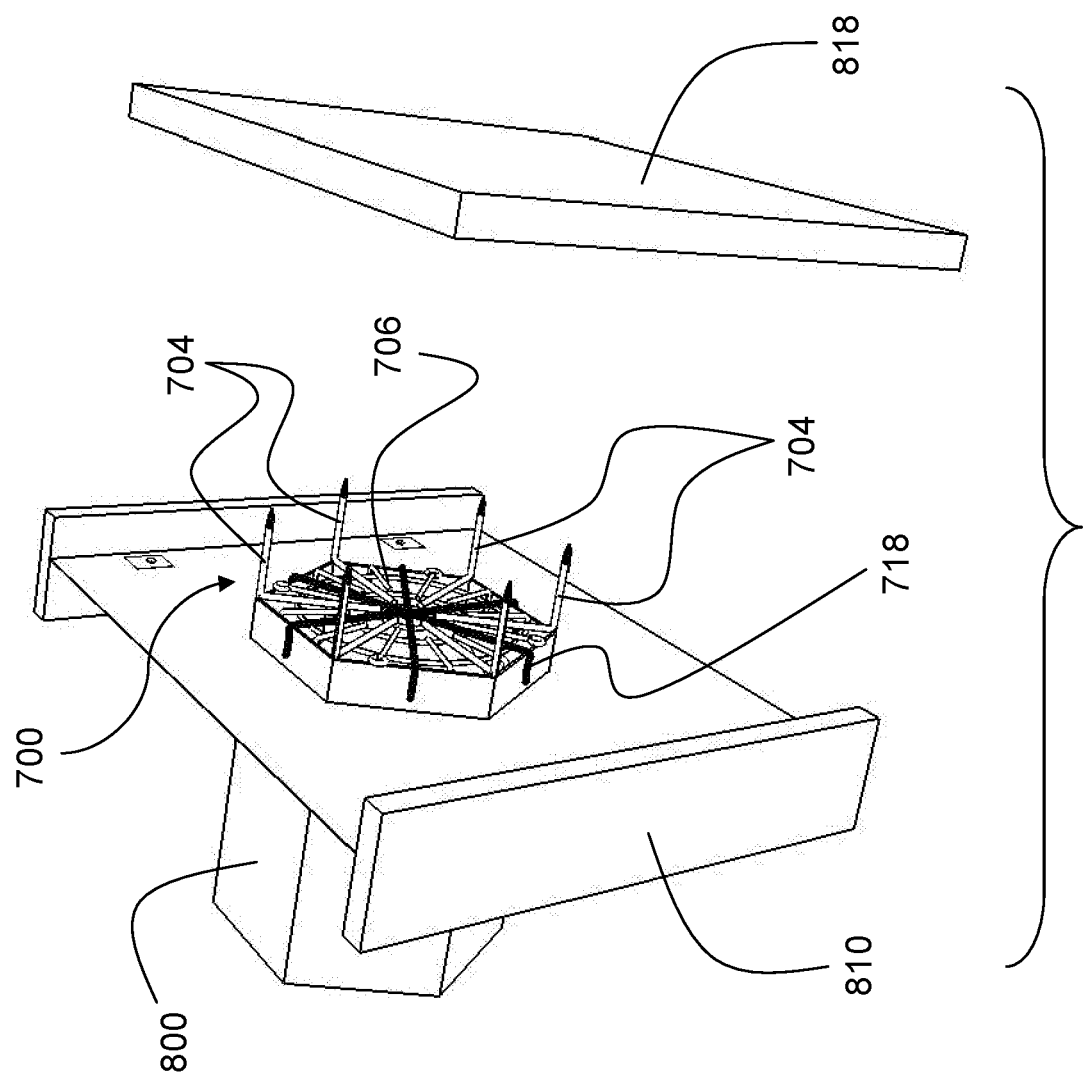
FIGS. 22-25 are views of a third embodiment of an apparatus for making cutouts in sheets of construction material in accordance with the present invention.
Figure 23:
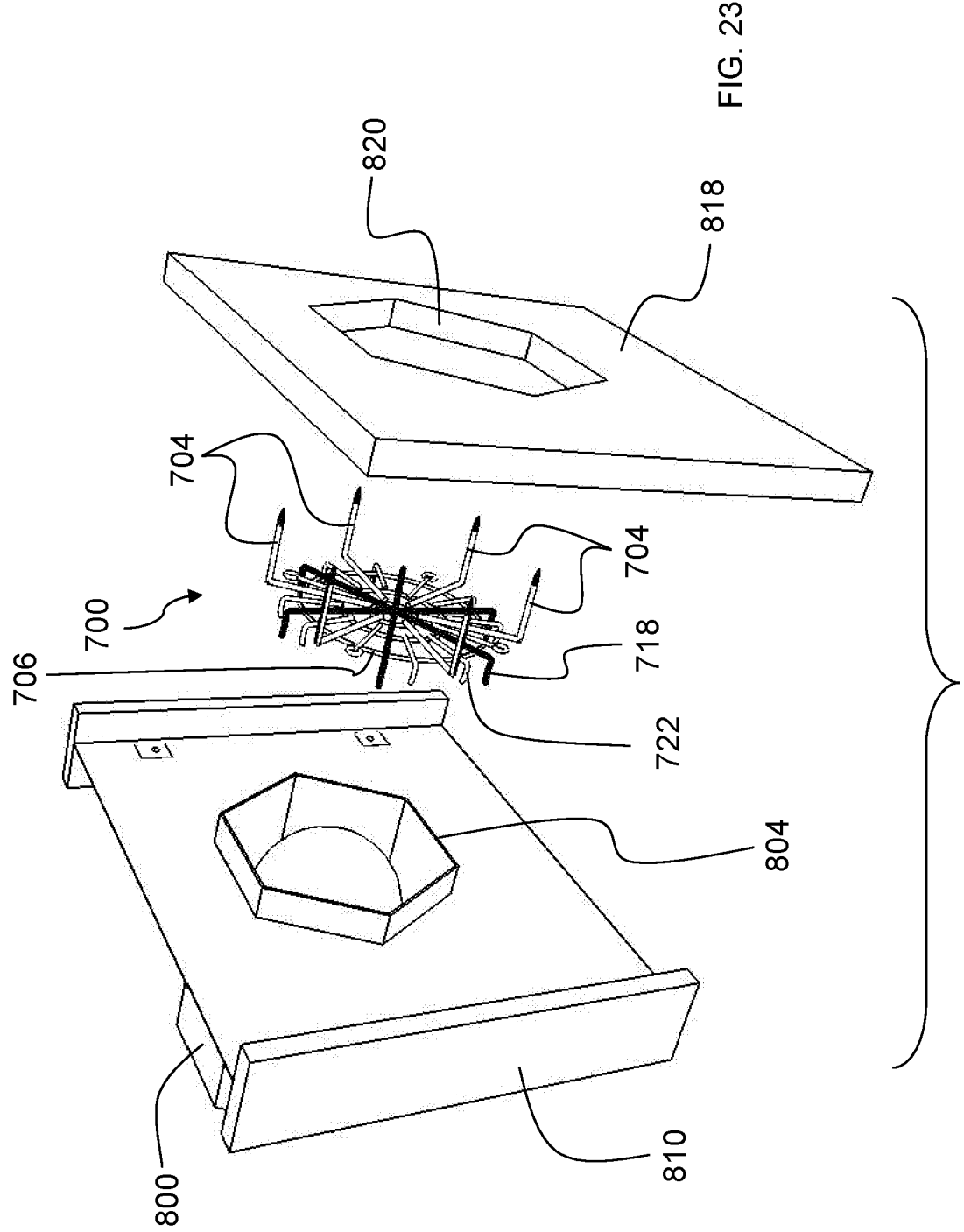
Figure 24:
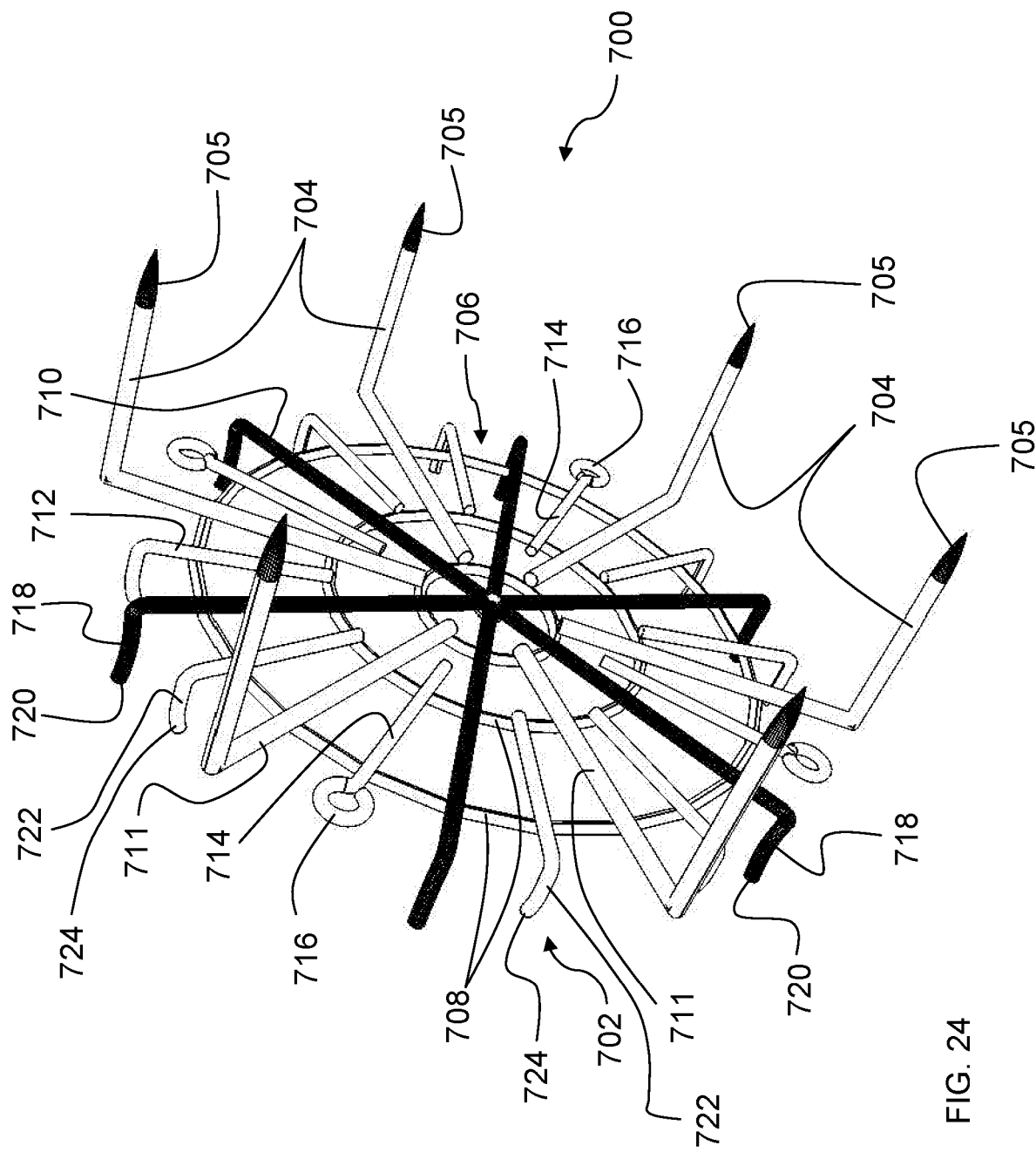
Figure 25:
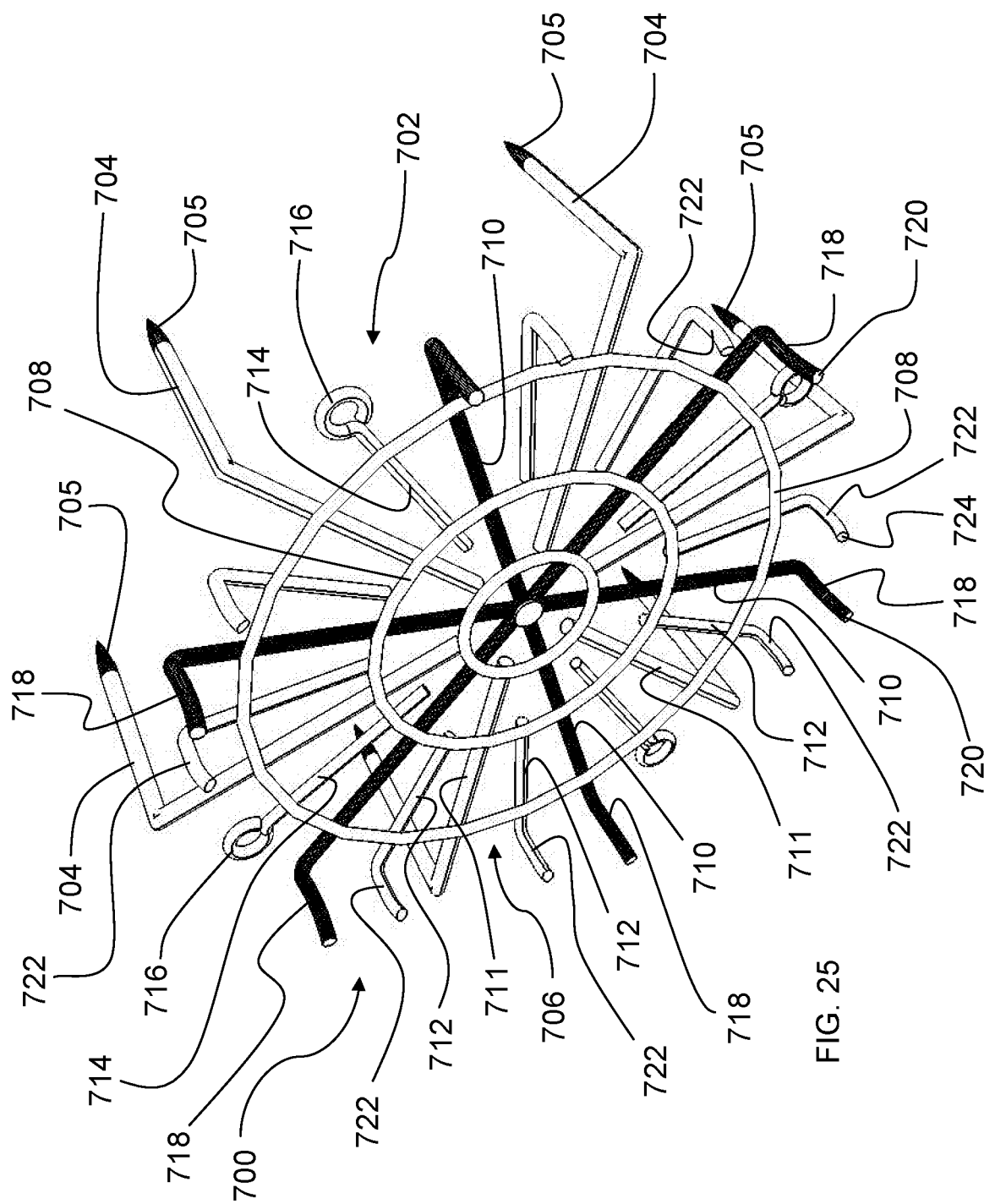

Referring to FIGS. 22-25, a third embodiment 700 of the electrical box locator device of the present invention can be seen. The locator device 700 includes a body 702 and a plurality of spikes 704. In the illustrated example, the body 702 includes a frame 706. The frame 706 has circular members 708, radial members 710, radial members 711, radial members 712, radial members 714, circular members 716, outer resilient members 718, and inner resilient members 722. The distal portion 720 of each of the outer resilient members 718 curves outward away from the center axis of the frame 706. The center axis of the frame 706 is perpendicular to the radial members 710 in direction and passes through the center of the circular members 708. The distal portion 724 of each of the inner resilient members 722 curves inward toward the central axis of the frame 706. Each of the spikes 704 is attached to the outer end of a respective one of the radial members 711. By outer end is meant the end that is farthest from the center of the frame 706. The longitudinal axis of each of the spikes 704 is essentially perpendicular to the respective one of the radial members 711 to which the spike 704 is attached. Accordingly, the plurality of spikes all extend outward from the frame 706 in the same direction such that they will all be perpendicular to the sheet material 818 when the locator device 700 is mounted to the opening of an electrical box. The spikes 704 each have a sharp, pointed end 705 that is located distally from the locator device body 702 for piercing sheet construction material 818.

The outer resilient members 718 and the inner resilient members 722 extend outward on the opposite side of the frame 706 relative to the spikes 704. The outer resilient members 718 and the inner resilient members 722 are extensions of the radial members 710 and the radial members 712, respectively. Each of the circular members 716 is attached to the outer end, relative to the center of frame 706, of a respective one of the radial members 714. Each of the circular members 716 is positioned over the edge of the electrical box opening 804 to limit how far the locator device 700 can be pushed into the electrical box opening 804. The circular members 708 are held together at least by virtue of their attachment to the radial members 710. The various members of the frame 706 may be welded together. In the illustrated example, the spikes 704 are continuations of the radial members 711, although the spikes 704 could be attached to the respective radial members 711 by welding if desired.

In the illustrated example, the electrical box 800 is a light fixture. The electrical box 800 has a hexagonal portion 802 that houses the light 806. The hexagonal portion 802 is in the form of a sleeve having a hexagonal cross section that has a hexagonal front opening 804 and is closed off at the rear. The hexagonal portion 802 of the electrical box 800 has a hexagonal front opening 804 to allow the light to project outward to, for example, light a room. The hexagonal opening 804 also defines the front opening of the electrical box 800. The electrical box 800 has a support plate 808. The hexagonal portion 802 of the electrical box 800 is attached to the support plate 808 such that hexagonal portion 802 of the electrical box 800 extends through a hexagonal hole in the center of the support plate 408. The support plate 808 facilitates the attachment of the electrical box 800, including the hexagonal portion 802, to the building structure 810 that includes the framing 812, which may be ceiling or floor joists or wall studs. In the illustrated example, the electrical box 800 is attached to the framing 812 by attaching the support plate 808 to the framing 812 using brackets 814 and nails 816.

In use, the locator device 700 is mounted to the front opening 804 of the electrical box 800. The inner resilient members 722 frictionally engage a portion of the interior of the electrical box proximate the opening 804 and the outer resilient members 718 frictionally engage a portion of the exterior of the electrical box proximate the opening 804 in order to hold the locator device 700 in position during the installation and cutting of the sheet material 818 to form the cutout 820 for the electrical box opening 804. The sheet material 818 is then positioned over its final intended position and pressed against the locator device 700 such that each of the spikes 704 pierces the sheet material and extends outward from the side of the sheet material facing away from the locator device 700. The end of each of the spikes 704 that is attached to the frame 706 is located in alignment with a vertex of the hexagonal opening 804 so that, when the spikes 704 pierce the sheet material 818, they mark the vertices of the opening 804 on the side of the sheet material that faces the interior of the room and are visible to the persons installing the sheet material 818. The installer can then use a pencil and straight edge or a chalk line connecting the vertices marked by the spikes 704 to create the outline of the cutout 820. A manual saw, a handheld power saw, or any other appropriate cutting implement can then be used to complete the cutout 820. The locator device 700 is then removed through the completed cutout 820. Locator devices similar to the locator device 700 can be used to create cutouts matching any polygonal electrical box opening by having spikes similar to spikes 704 that are arranged to mark the vertices of the particular polygonal shape of the electrical box opening.

Figure 26:
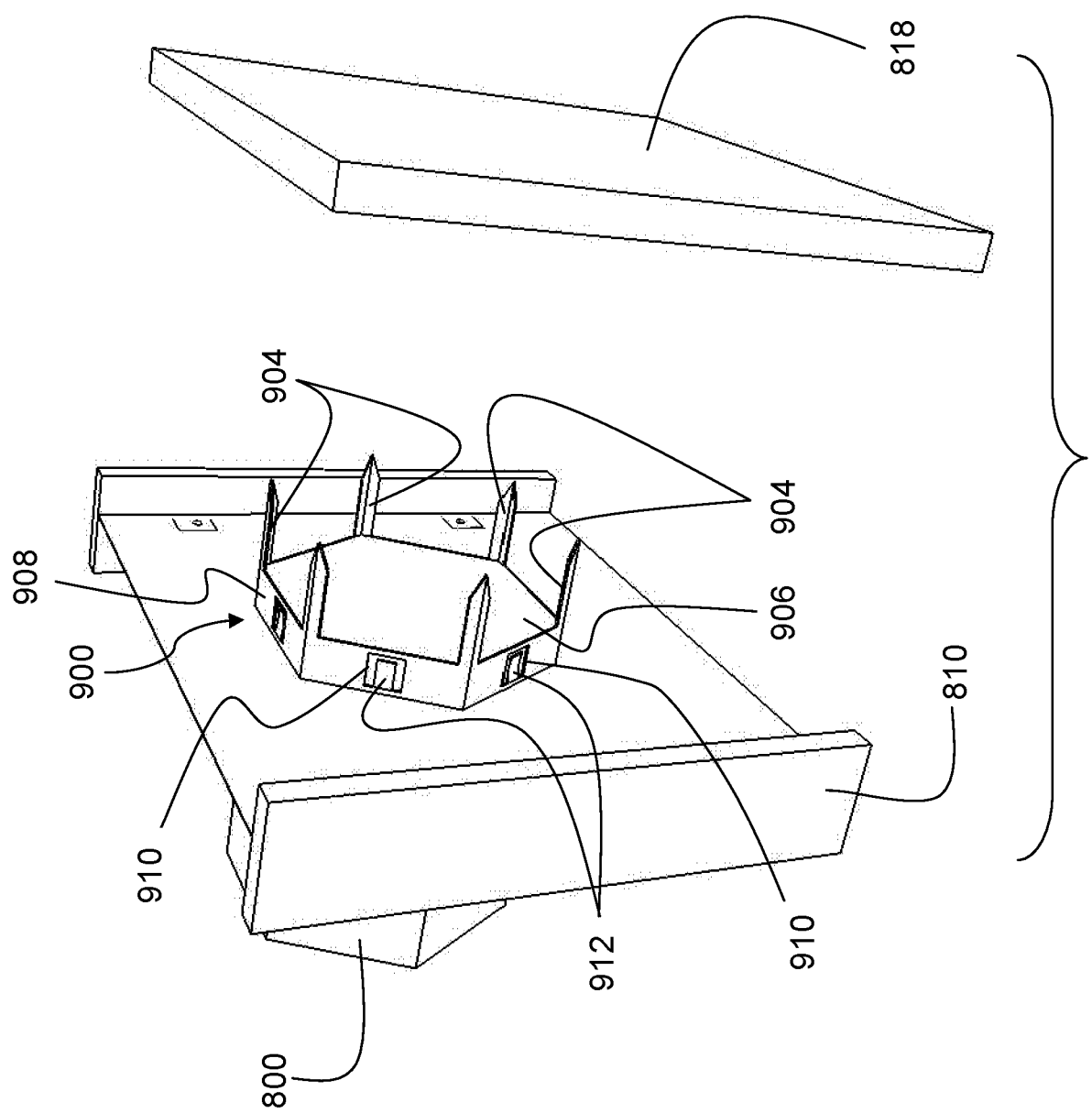
FIGS. 26-29 are views of a fourth embodiment of an apparatus for making cutouts in sheets of construction material in accordance with the present invention.
Figure 27:
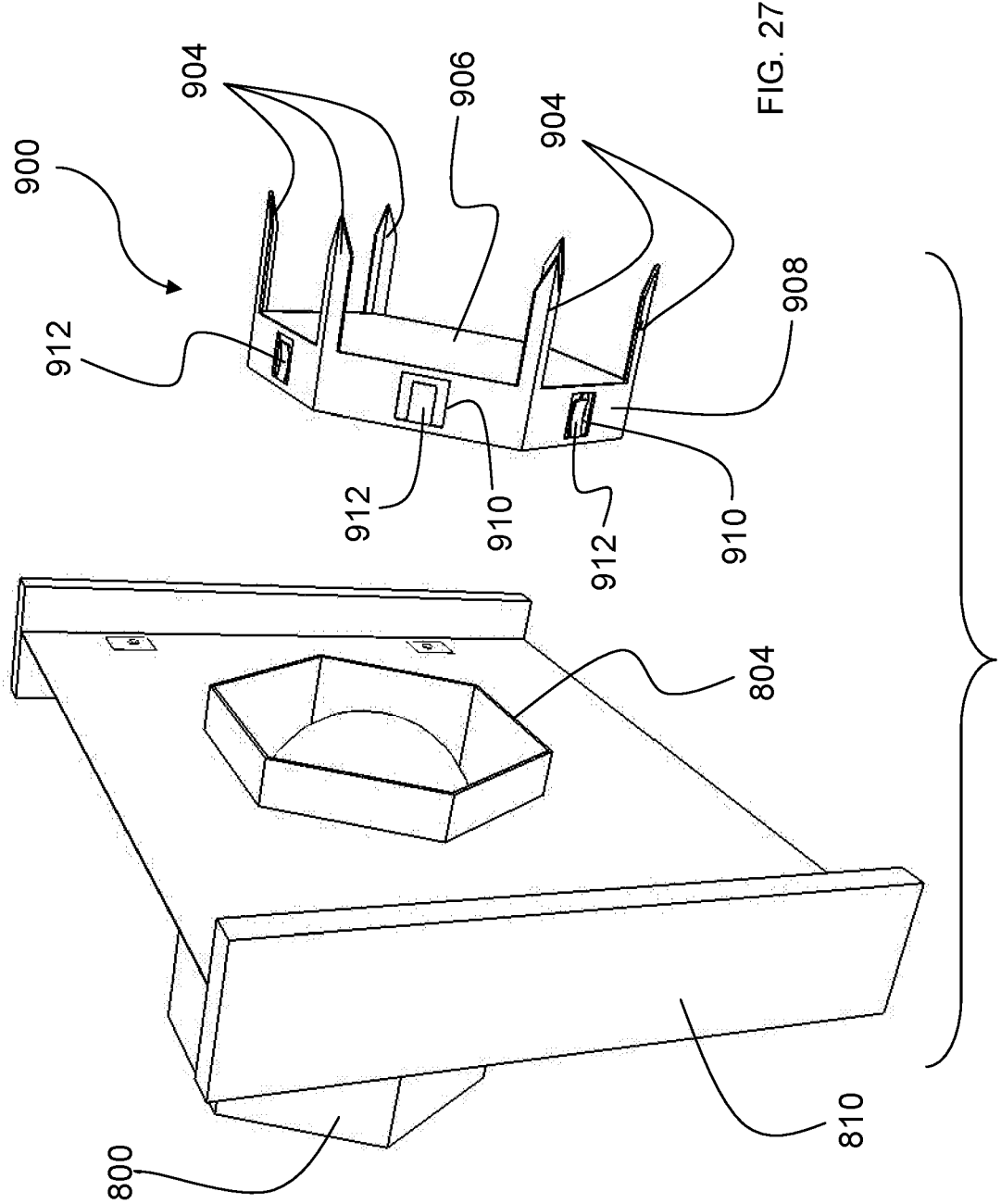
Figure 28:
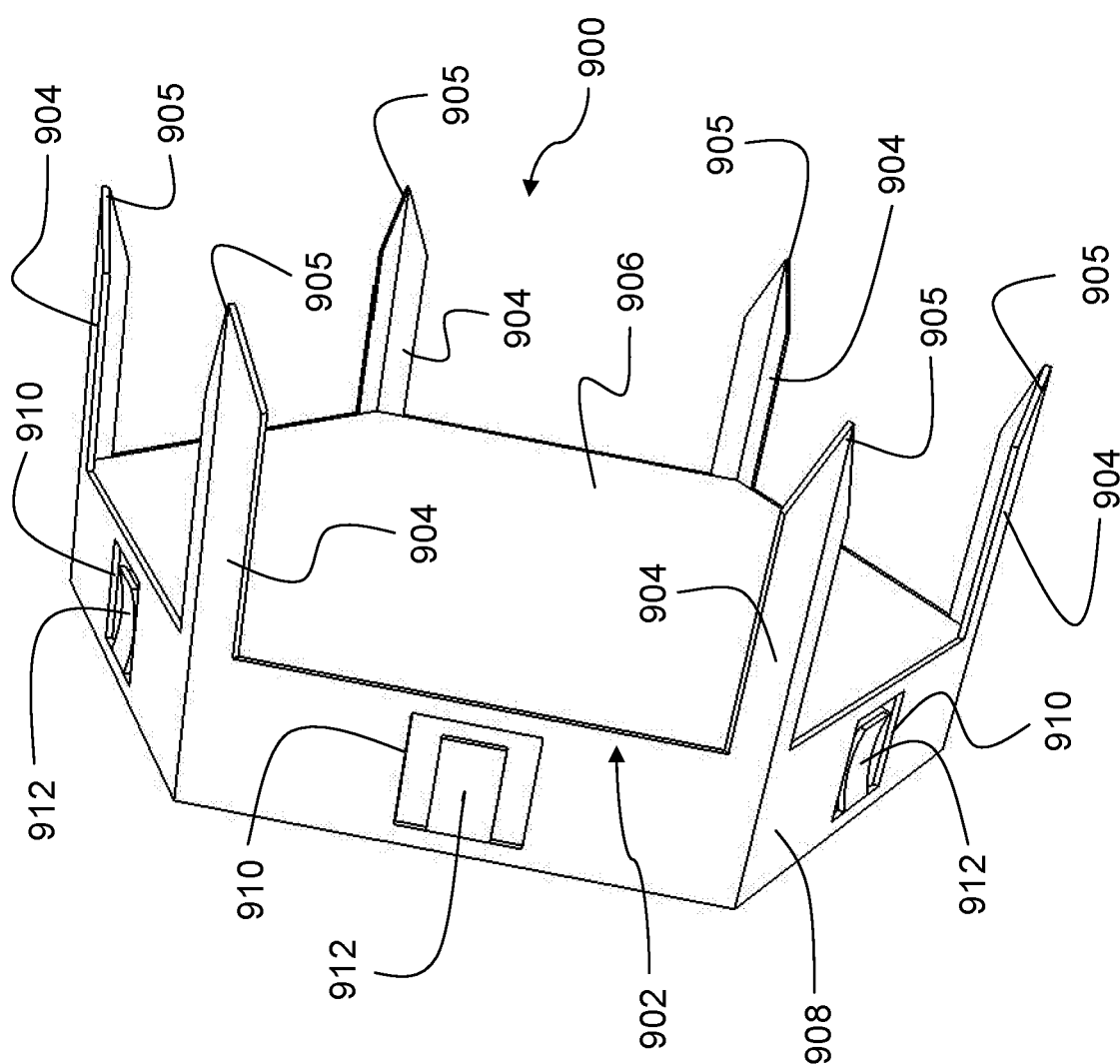
Figure 29:
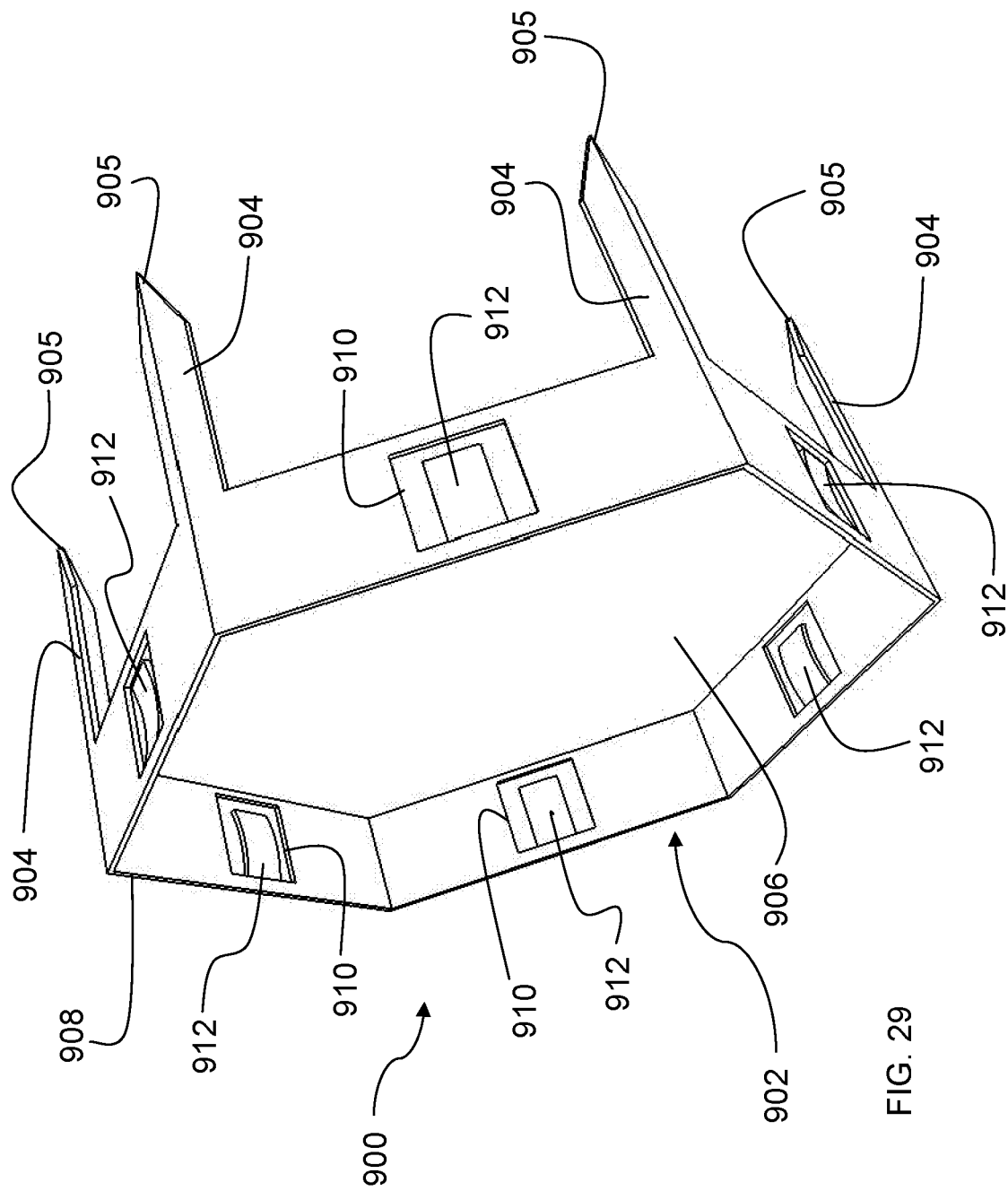

Referring to FIGS. 26-29, a fourth embodiment 900 of the locator device can be seen. The electrical box locator device 900 includes a body 902 and a plurality of spikes 904. In the illustrated example, the body 902 includes a base plate 906. The base plate 906 is hexagonal and sized to fit over the electrical box opening 804 (shown in FIG. 23). The base plate 906 is made of a flat plate material that is sufficiently strong and rigid. Examples of suitable material include metal plate such as steel or aluminum plate, sheet metal, composites, polymer material, and fiber reinforced polymers. The term "polymers" as used herein is intended to encompass plastics. The body 902 also includes a short hexagonal sleeve 908 that fits around the outside of the electrical box opening 804 when the base plate 906 is placed over the electrical box opening 804 and the electrical box locator device 900 is mounted to the electrical box 800. The sleeve 908 projects from the opposite side of the base plate 906 relative to the spikes 904. The sleeve 908 has windows 910 provided in its wall. A resilient member 912 is attached, in cantilever fashion, to the side of each window farthest from the base plate 906. Each of the resilient members 912 is bowed inward of the inner surface of the sleeve 908 when not in use such that the resilient members can frictionally engage an exterior surface of the electrical box 800 proximate the electrical box opening 804 when the electrical box locator device 900 is placed over the electrical box opening 804 and mounted to the electrical box 800. Each of the spikes 904 is attached proximate a respective vertex of the hexagonal base plate 906. The longitudinal axis of each of the spikes 904 is perpendicular to the hexagonal surfaces of the base plate 906. Each of the spikes 904 has a sharp, pointed end 905 that is located distally from the locator device body 902 for piercing sheet construction material 818. The base plate 906 extends over the edge of the electrical box opening 804 to limit how far the locator device 900 can be pushed into the electrical box opening 804.

In use, the locator device 900 is mounted to the front opening 804 of the electrical box 800. The resilient members 912 frictionally engage a portion of the exterior of the electrical box proximate the opening 804 in order to hold the locator device 900 in position during the installation and cutting of the sheet material 818 to form the cutout 820 for the electrical box opening 804. The locator device 900 is used and functions in exactly the same way as the locator device 700, except as otherwise noted. Vent cutouts can be made in the base plate 906 if desired. In the illustrated example of FIGS. 26-29, each of the spikes 904 has a V-shaped cross section, with the lesser included angle of 120°, rather than the round cross section of the spikes 704.

Figure 30:
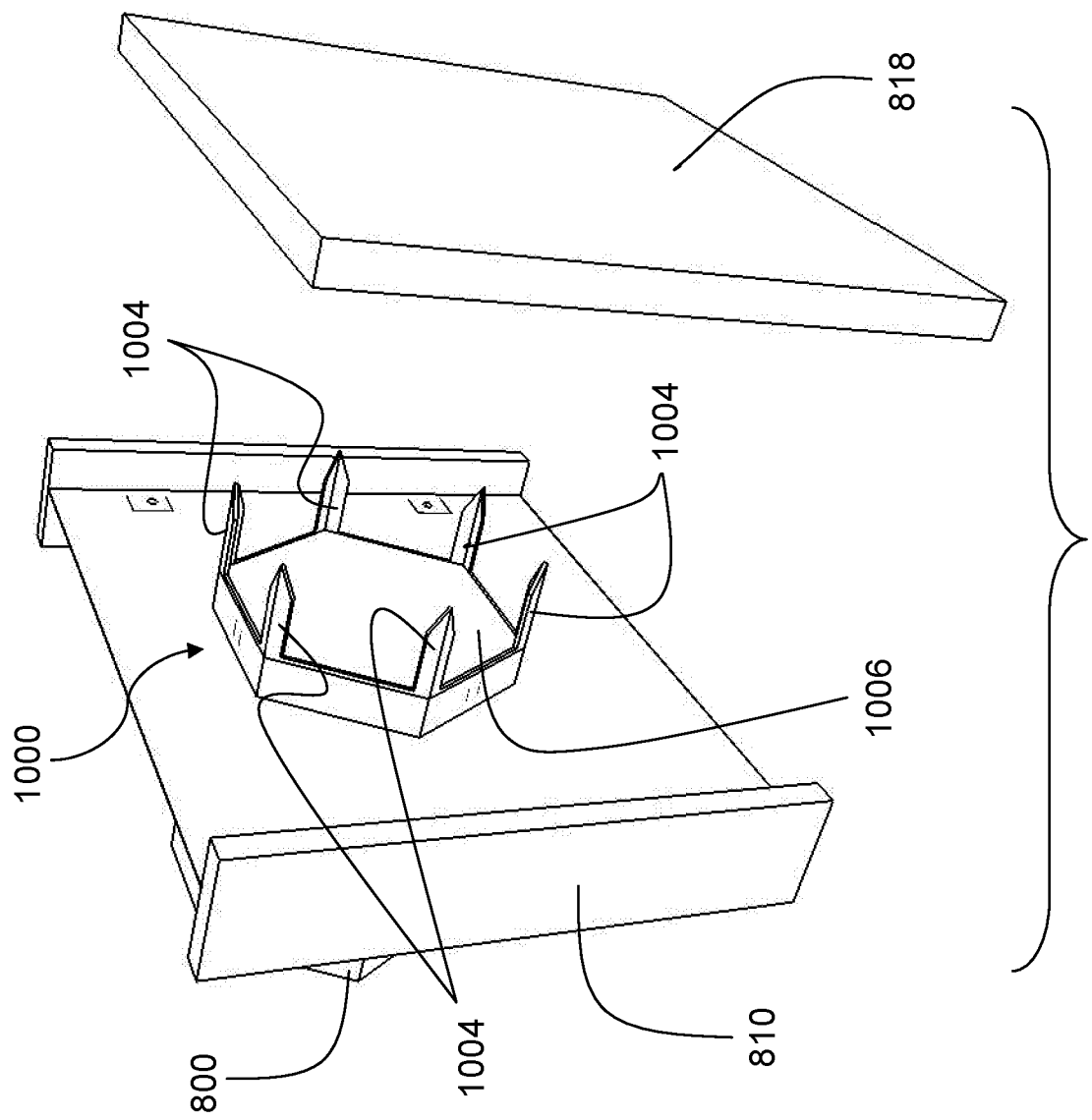
FIGS. 30-33 are views of a fifth embodiment of an apparatus for making cutouts in sheets of construction material in accordance with the present invention.
Figure 31:
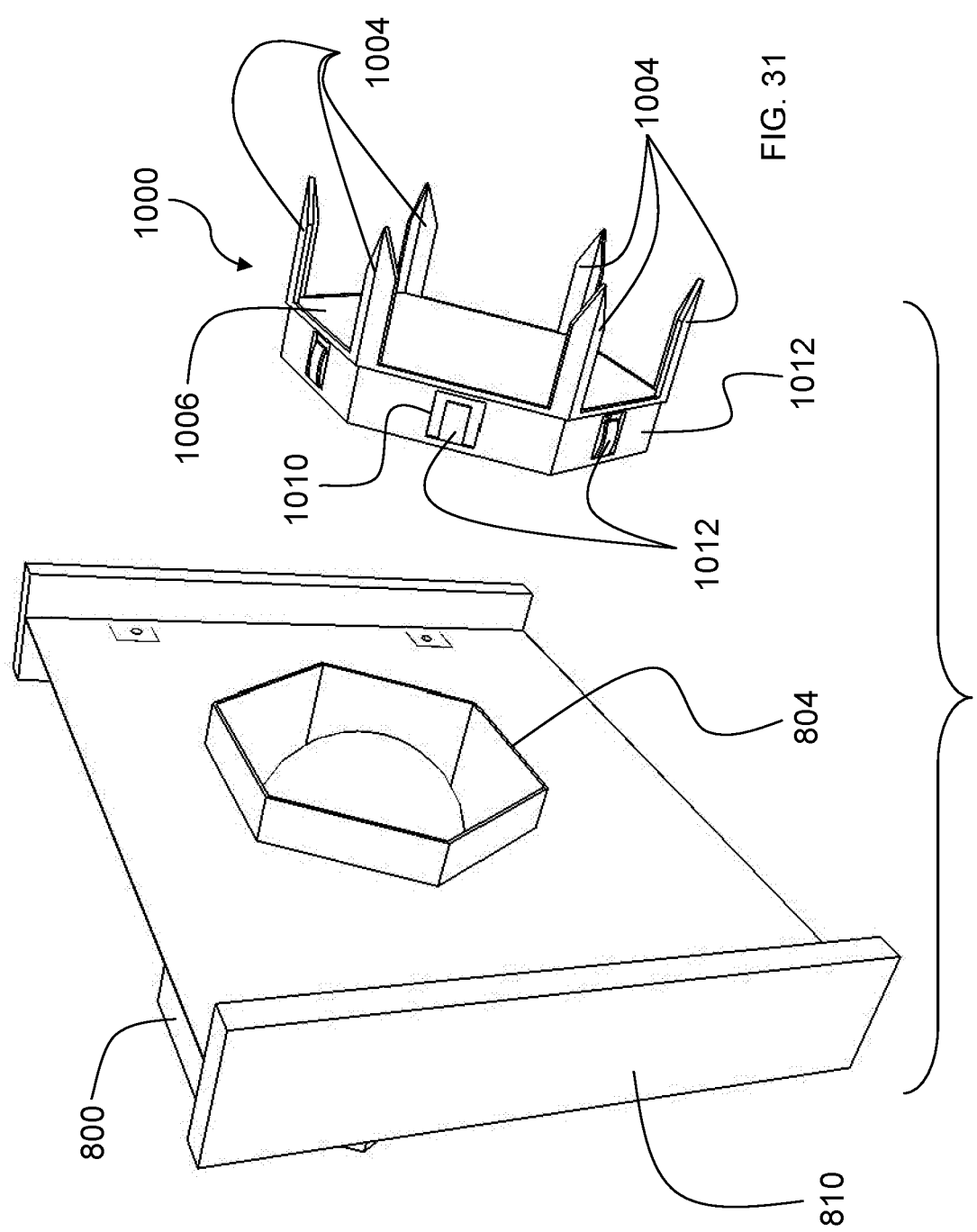
Figure 32:
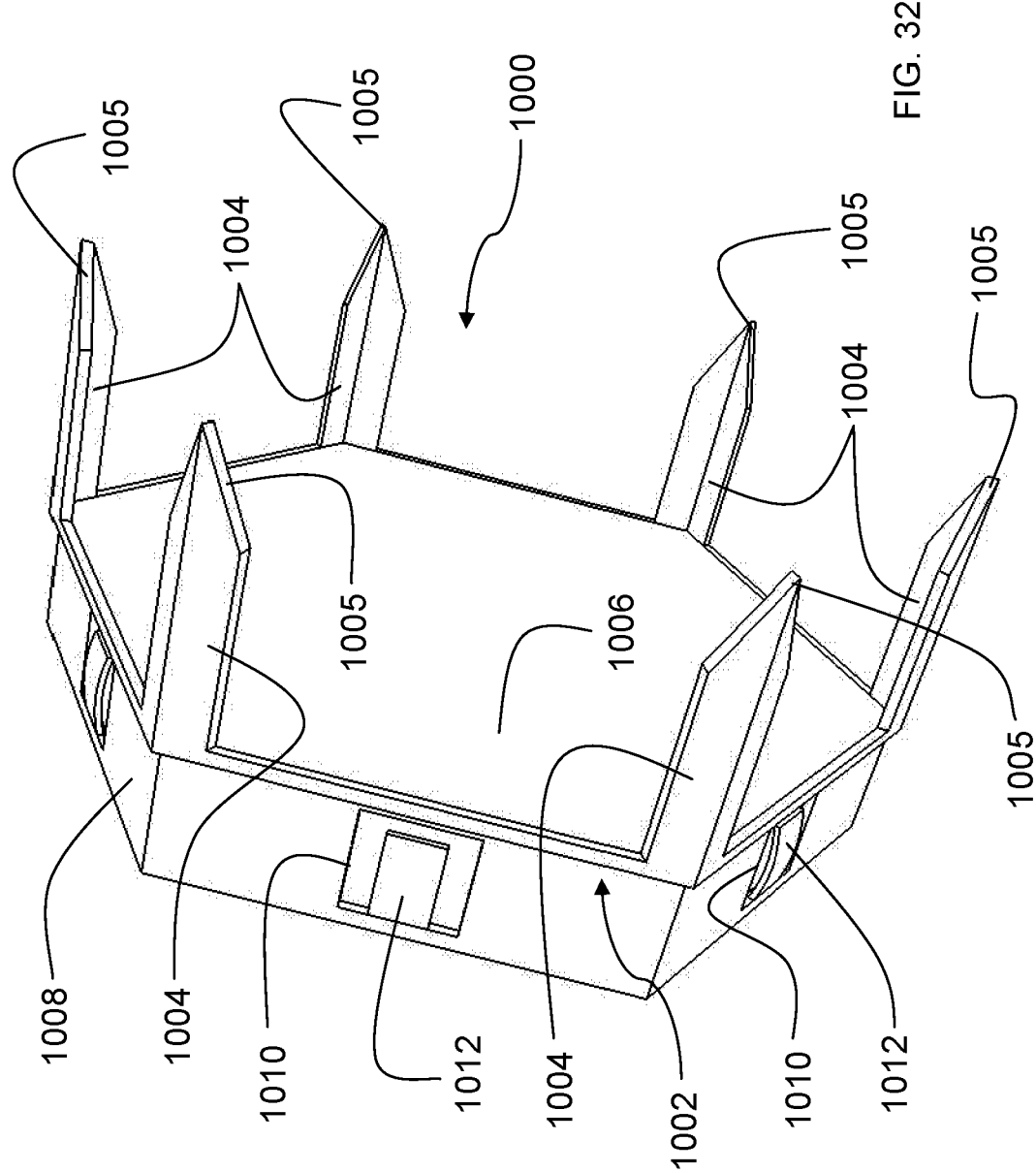
Figure 33:
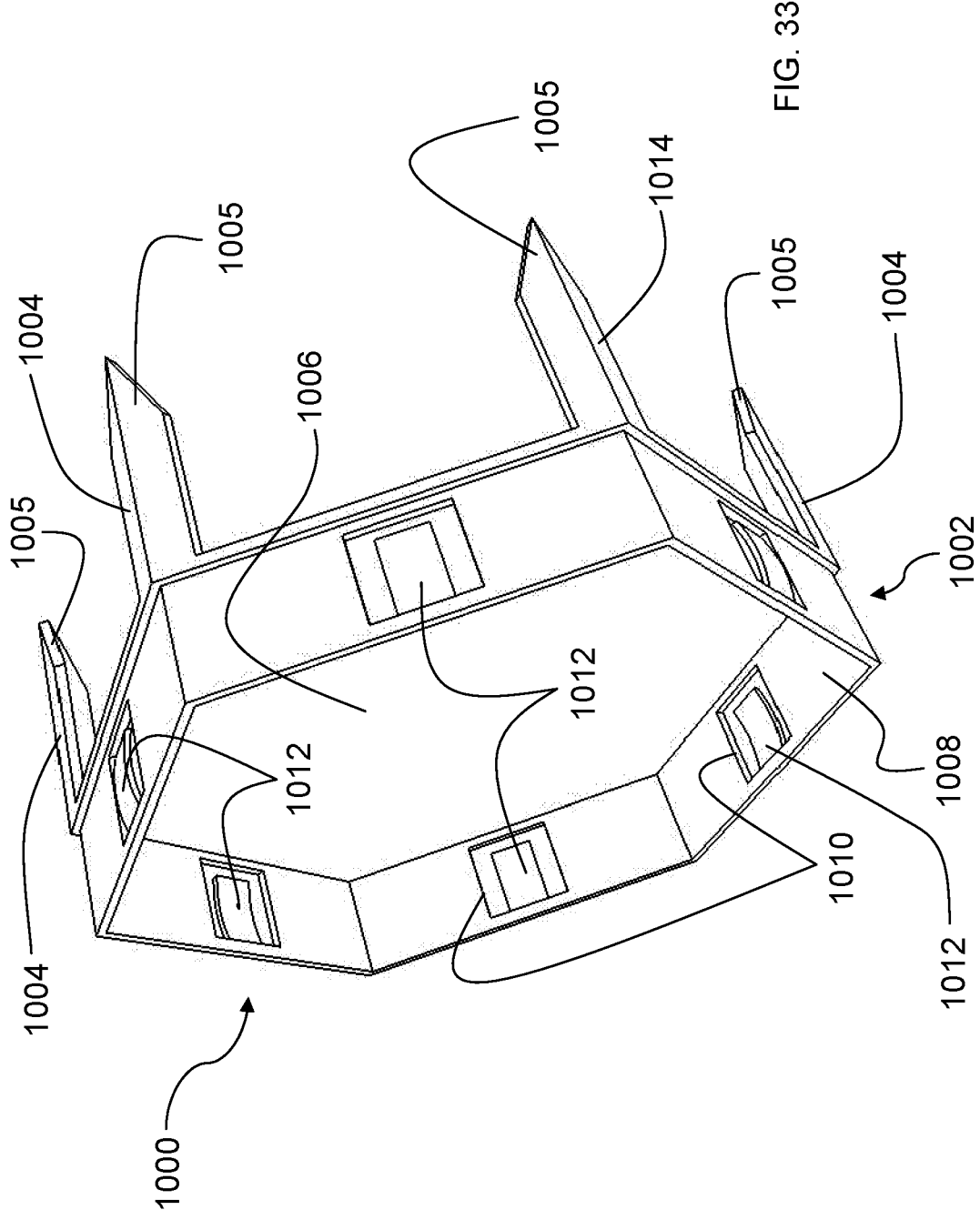

Referring to FIGS. 30-33, a fifth embodiment 1000 of the locator device can be seen. The electrical box locator device 1000 includes a body 1002 and a plurality of spikes 1004. In the illustrated example, the body 1002 includes a base plate 1006. The base plate 1006 is hexagonal and sized to fit over the electrical box opening 804 (shown in FIG. 23). The base plate 1006 is made of a flat plate material that is sufficiently strong and rigid. Examples of suitable material include metal plate such as steel or aluminum plate, sheet metal, composites, polymer material, and fiber reinforced polymers. The term "polymers" as used herein is intended to encompass plastics. The body 1002 also includes a short hexagonal sleeve 1008 that fits inside the electrical box opening 804 when the base plate 1006 is placed over the electrical box opening 804 and the electrical box locator device 1000 is mounted to the electrical box 800. The sleeve 1008 projects from the opposite side of the base plate 1006 relative to the spikes 1004. The sleeve 1008 has windows 1010 provided in its wall. A resilient member 1012 is attached, in cantilever fashion, to the side of each window farthest from the base plate 1006. Each of the resilient members 1012 is bowed outward of the outer surface of the sleeve 1008 when not in use such that the resilient members can frictionally engage an interior surface of the electrical box 800 proximate the electrical box opening 804 when the electrical box locator device 1000 is placed over the electrical box opening 804 and mounted to the electrical box 800. Each of the spikes 1004 is attached proximate a respective vertex of the hexagonal base plate 1006. The longitudinal axis of each of the spikes 1004 is perpendicular to the hexagonal surfaces of the base plate 1006. Each of the spikes 1004 has a sharp, pointed end 1005 that is located distally from the locator device body 1002 for piercing sheet construction material 818. The base plate 1006 extends over the edge of the electrical box opening 804 to limit how far the locator device 1000 can be pushed into the electrical box opening 804.

In use, the locator device 1000 is mounted to the front opening 804 of the electrical box 800. The resilient members 1012 frictionally engage a portion of the interior of the electrical box proximate the opening 804 in order to hold the locator device 1000 in position during the installation and cutting of the sheet material 818 to form the cutout 820 for the electrical box opening 804. The locator device 1000 is used and functions in exactly the same way as the locator devices 700 and 900, except as otherwise noted. Vent cutouts can be made in the base plate 1006 if desired. In the illustrated example of FIGS. 30-33, each of the spikes 1004 has a V-shaped cross section, with the lesser included angle of 120°, rather than the round cross section of the spikes 704.

Figure 34:
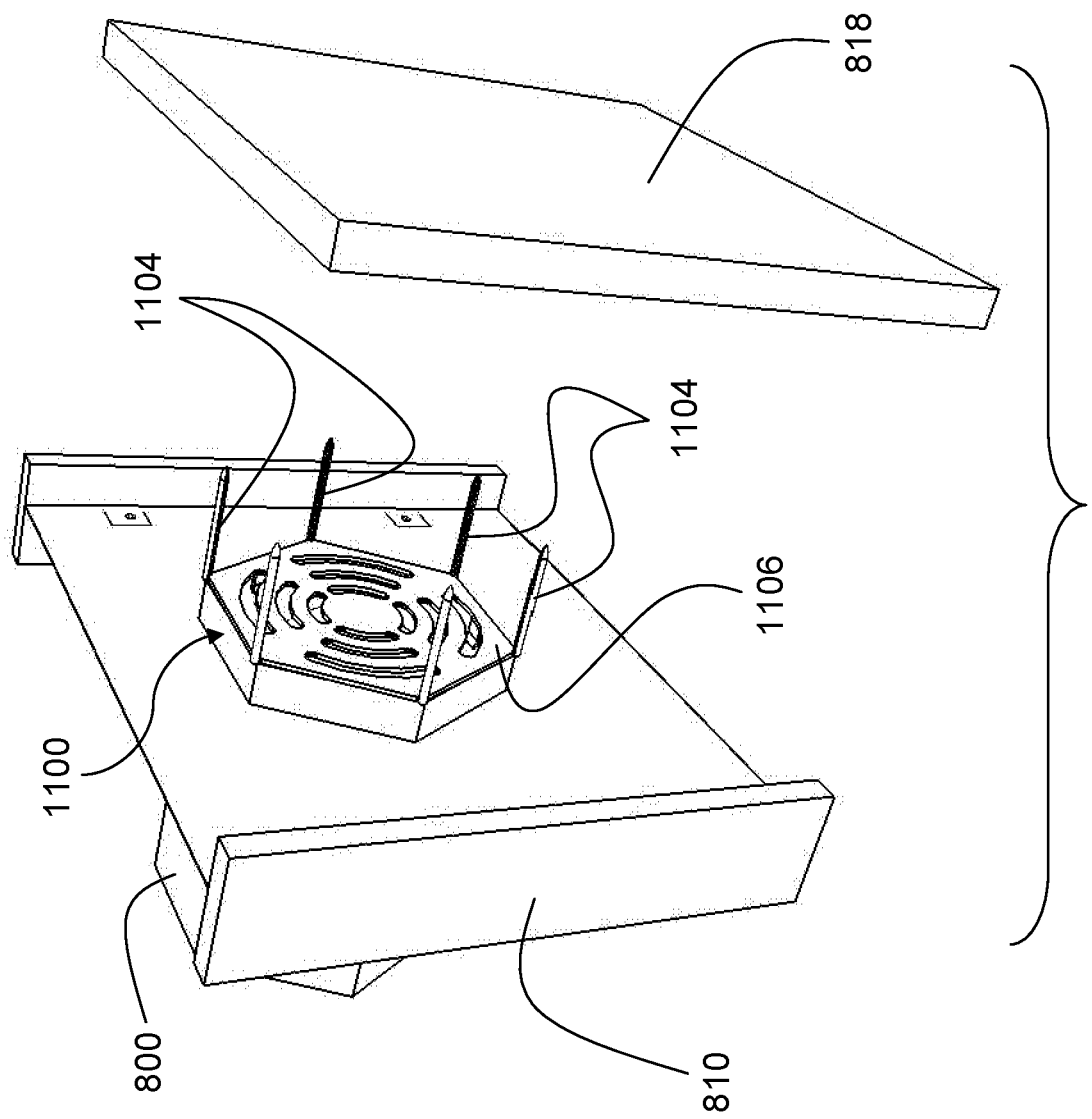
FIGS. 34-37 are views of a sixth embodiment of an apparatus for making cutouts in sheets of construction material in accordance with the present invention.
Figure 35:
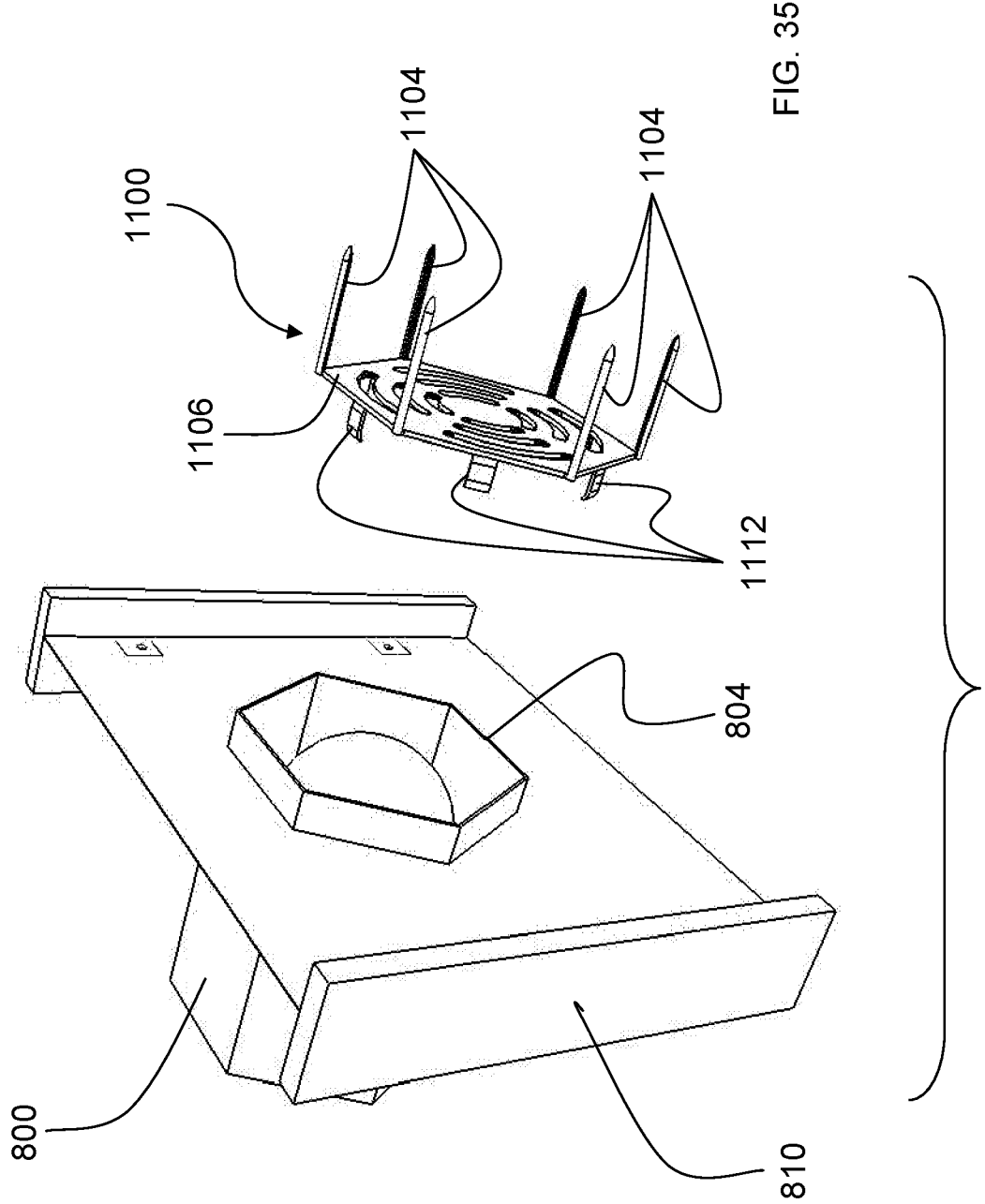
Figure 36:
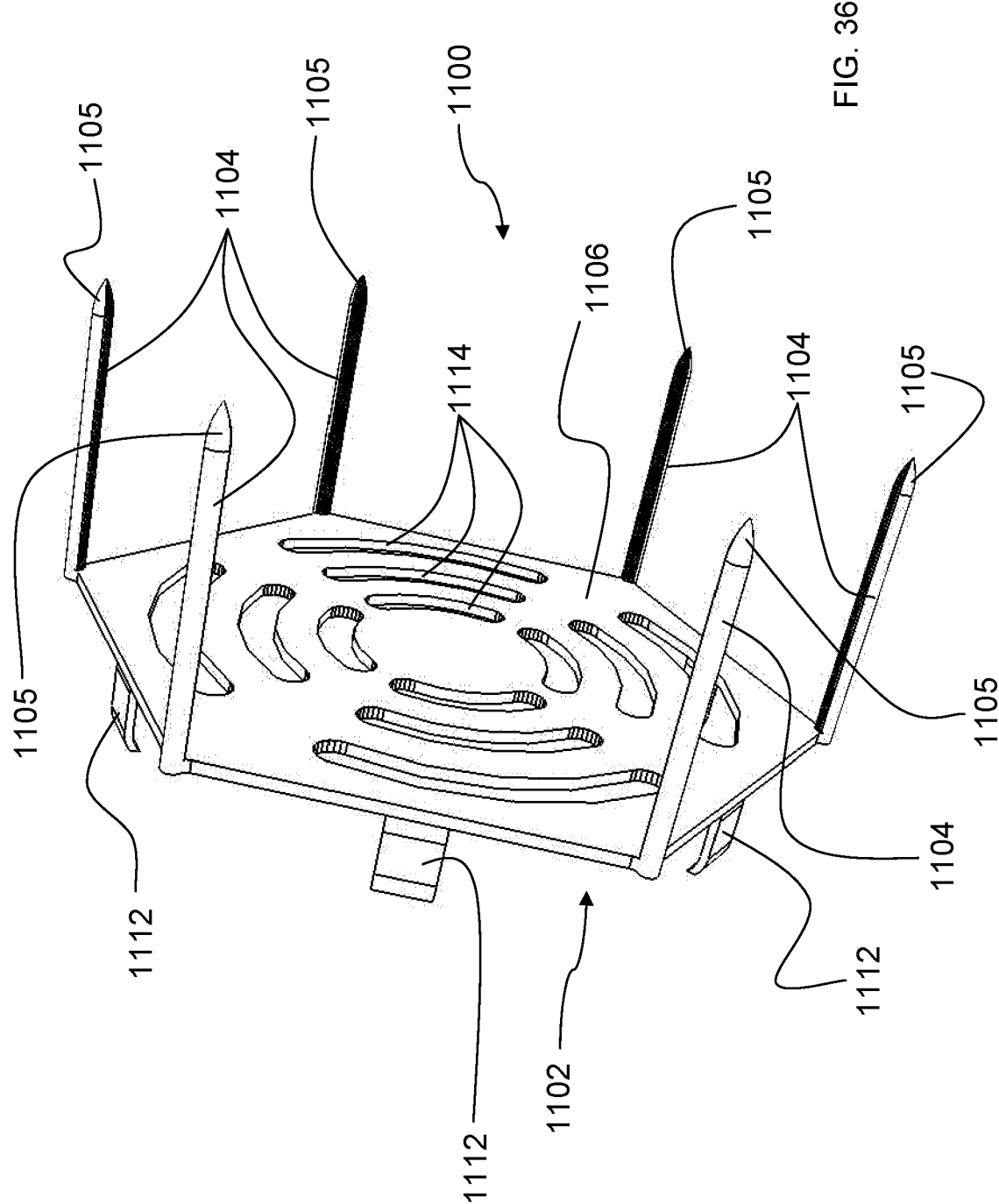
Figure 37:
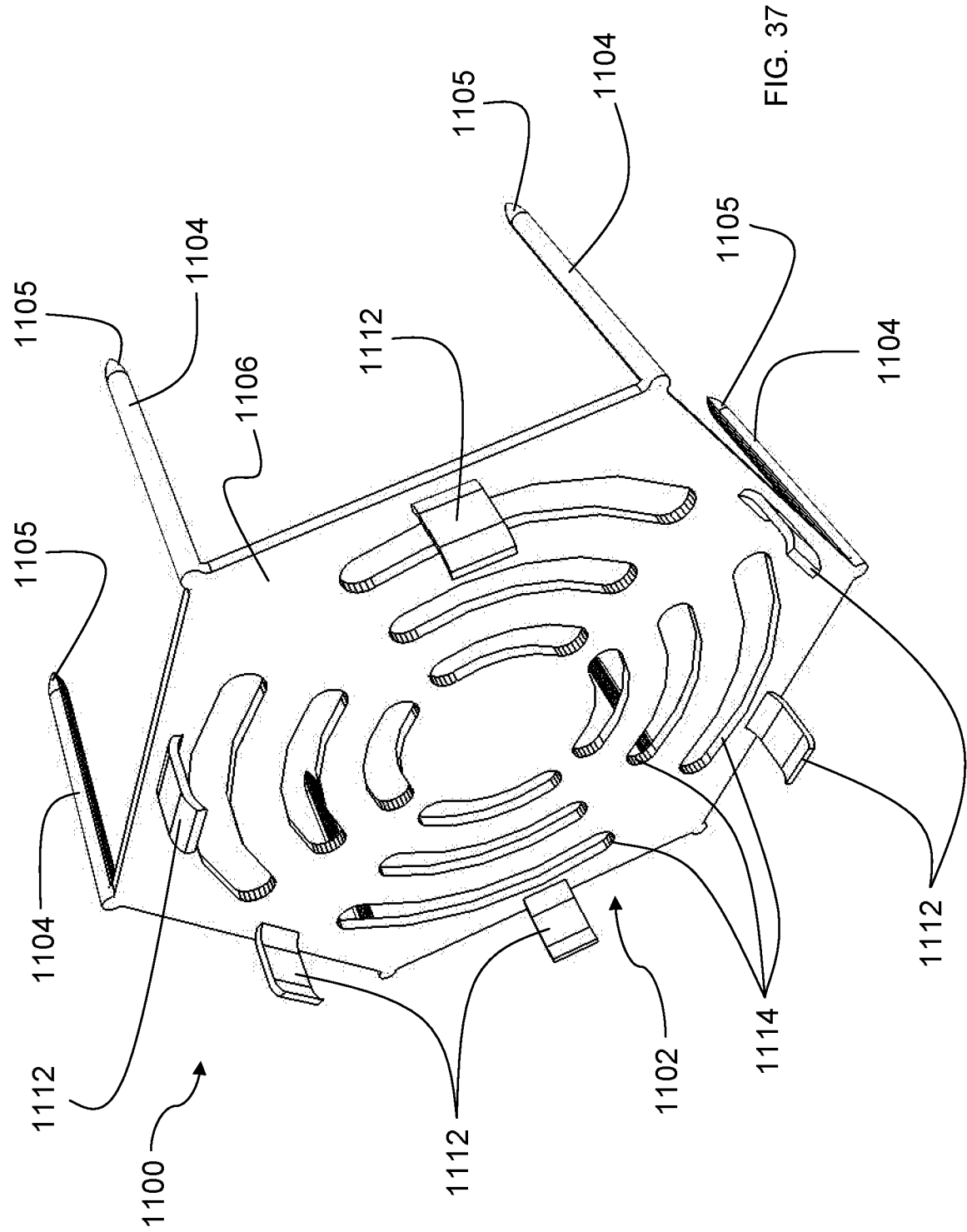

Referring to FIGS. 34-37, a sixth embodiment 1100 of the locator device can be seen. The electrical box locator device 1100 includes a body 1102 and a plurality of spikes 1104. In the illustrated example, the body 1102 includes a base plate 1106. The base plate 1106 is hexagonal and sized to fit over the electrical box opening 804 (shown in FIG. 23). The base plate 1106 is made of a flat plate material that is sufficiently strong and rigid. Examples of suitable material include metal plate such as steel or aluminum plate, sheet metal, composites, polymer material, and fiber reinforced polymers. The term "polymers" as used herein is intended to encompass plastics. The body 1102 also includes a plurality of resilient members 1112 that fit inside the electrical box opening 804 when the base plate 1106 is placed over the electrical box opening 804 and the electrical box locator device 1100 is mounted to the electrical box 800. Each of the plurality of resilient members 1112 projects from the opposite side of the base plate 1106 relative to the spikes 1104. The resilient members 1112 are attached, in cantilever fashion, to the opposite side of the base plate 1106 relative to the spikes 1104. Each of the resilient members 1112 is bowed outward of the inner surface of the electrical box proximate the electrical box opening 804, when the electrical box locator device 1100 is aligned with the electrical box opening 804 but before it is mounted to the electrical box 800, such that the resilient members can frictionally engage the inner surface of the electrical box 800 proximate the electrical box opening 804 when the electrical box locator device 1100 is mounted to the electrical box 800. Each of the spikes 1104 is attached proximate a respective vertex of the hexagonal base plate 1106. The longitudinal axis of each of the spikes 1104 is perpendicular to the hexagonal surfaces of the base plate 1106. Each of the spikes 1104 has a sharp, pointed end 1105 that is located distally from the locator device body 1102 for piercing sheet construction material 818. The base plate 1106 extends over the edge of the electrical box opening 804 to limit how far the locator device 1100 can be pushed into the electrical box opening 804.

In use, the locator device 1100 is mounted to the front opening 804 of the electrical box 800. The resilient members 1112 frictionally engage a portion of the interior of the electrical box proximate the opening 804 in order to hold the locator device 1100 in position during the installation and cutting of the sheet material 818 to form the cutout 820 for the electrical box opening 804. The locator device 1100 is used and functions in exactly the same way as the locator devices 700, 900, and 1000, except as otherwise noted. Vent cutouts 1114 can be made in the base plate 1106 if desired. In the illustrated example of FIGS. 34-37, each of the spikes 1104 has a round cross section.

Figure 38:
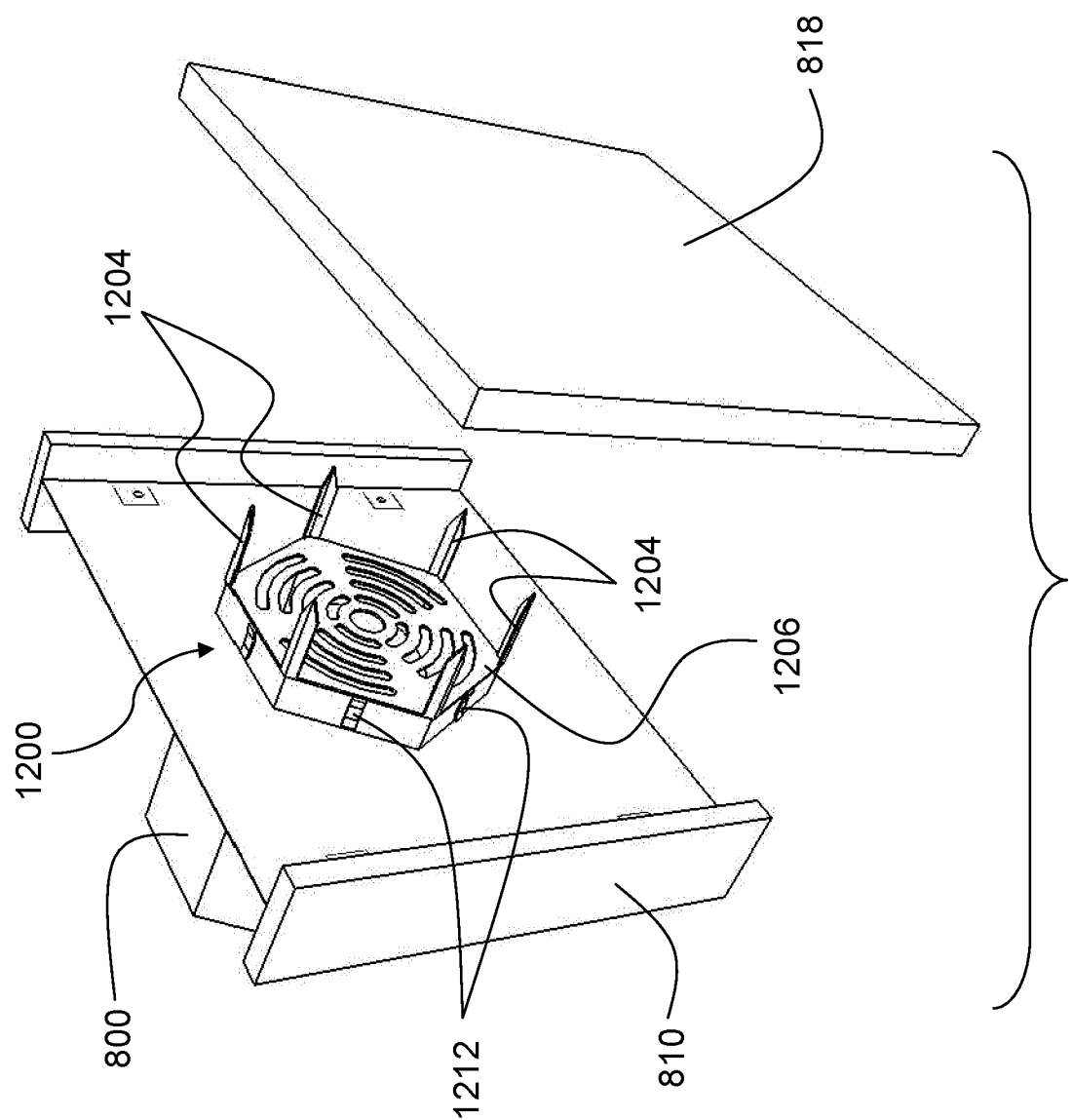
FIGS. 38-41 are views of a seventh embodiment of an apparatus for making cutouts in sheets of construction material in accordance with the present invention.
Figure 39:
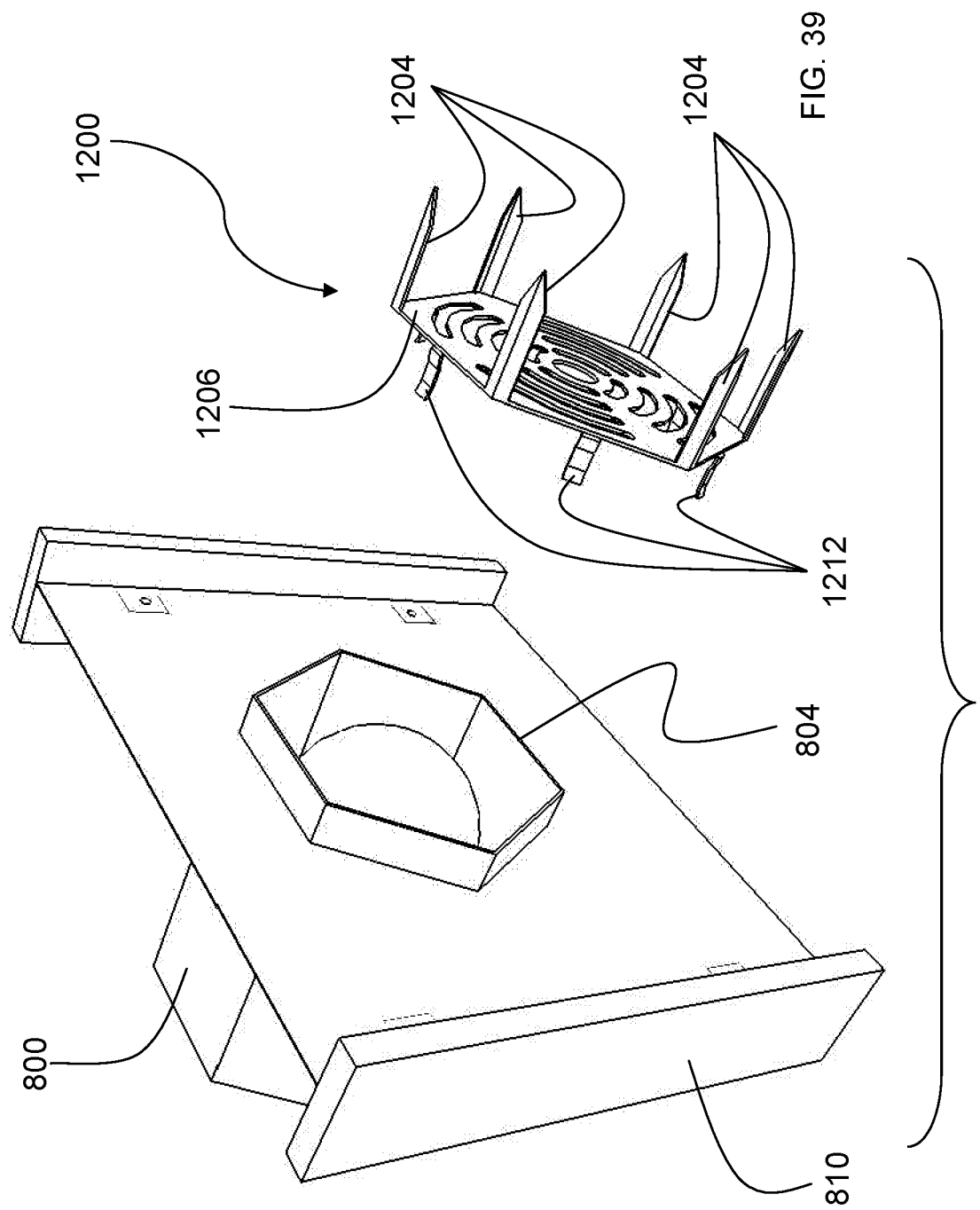
Figure 40:
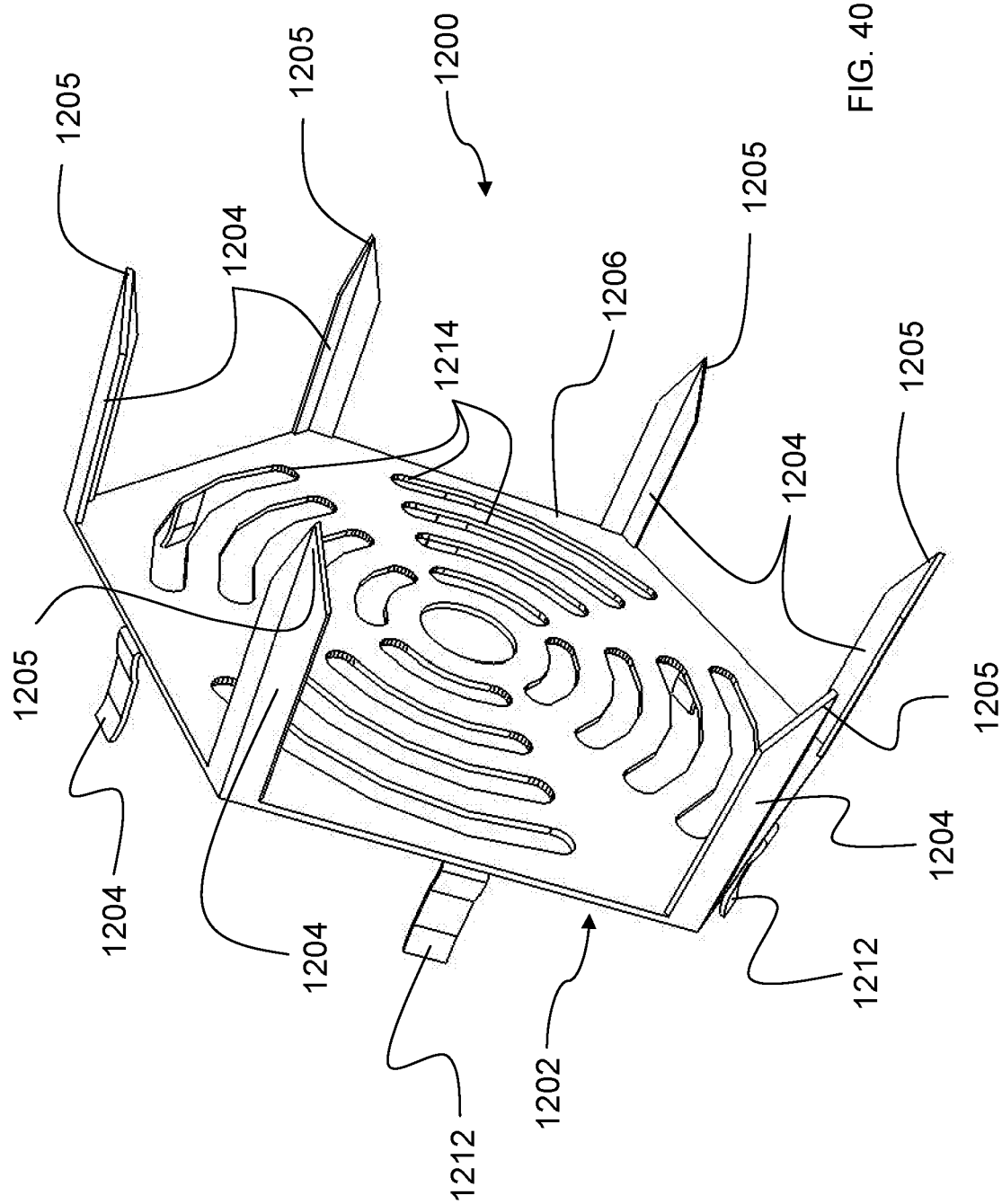
Figure 41:
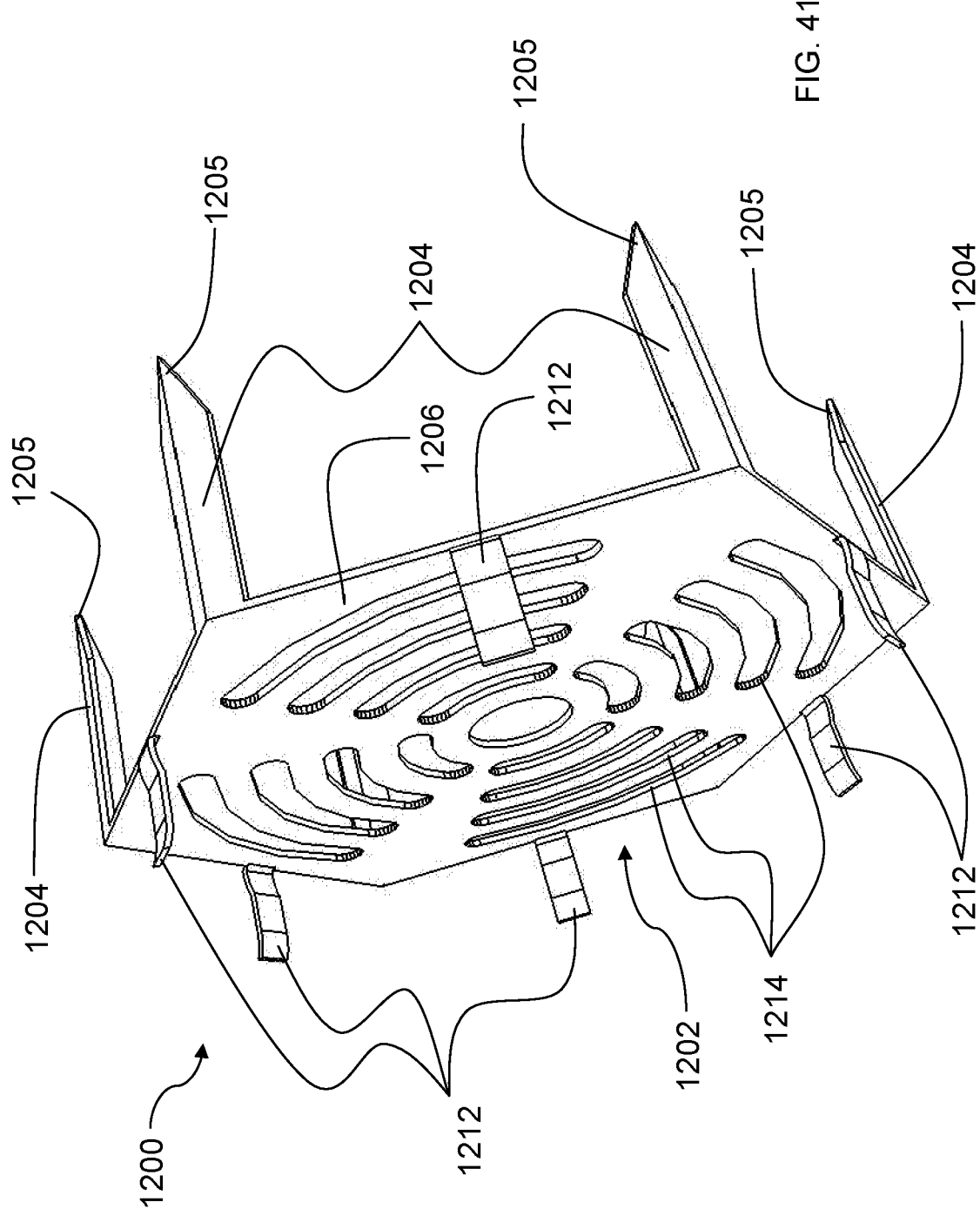

Referring to FIGS. 38-41, a seventh embodiment 1200 of the locator device can be seen. The electrical box locator device 1200 includes a body 1202 and a plurality of spikes 1204. In the illustrated example, the body 1202 includes a base plate 1206. The base plate 1206 is hexagonal and sized to fit over the electrical box opening 804 (shown in FIG. 23). The base plate 1206 is made of a flat plate material that is sufficiently strong and rigid. Examples of suitable material are the same as previously listed for the other embodiments. The body 1202 also includes a plurality of resilient members 1212 that fit outside the electrical box opening 804 when the base plate 1206 is placed over the electrical box opening 804 and the electrical box locator device 1200 is mounted to the electrical box 800. Each of the plurality of resilient members 1212 projects from the opposite side of the base plate 1206 relative to the spikes 1204. The resilient members 1212 are attached, in cantilever fashion, around the periphery of the base plate 1206. Each of the resilient members 1212 is bowed inward of the outer surface of the electrical box proximate the electrical box opening 804, when the electrical box locator device 1200 is aligned with the electrical box opening 804 but before it is mounted to the electrical box 800, such that the resilient members can frictionally engage the outer surface of the electrical box 800 proximate the electrical box opening 804 when the base plate 1206, and thus the electrical box locator device 1200, is mounted to the electrical box 800. Each of the spikes 1204 is attached proximate a respective vertex of the hexagonal base plate 1206. The longitudinal axis of each of the spikes 1204 is perpendicular to the hexagonal surfaces of the base plate 1206. Each of the spikes 1204 has a sharp, pointed end 1205 that is located distally from the locator device body 1202 for piercing sheet construction material 818. The base plate 1206 extends over the edge of the electrical box opening 804 to limit how far the locator device 1200 can be pushed into the electrical box opening 804.

In use, the locator device 1200 is mounted to the front opening 804 of the electrical box 800. The resilient members 1212 frictionally engage a portion of the exterior of the electrical box proximate the opening 804 in order to hold the locator device 1200 in position during the installation and cutting of the sheet material 818 to form the cutout 820 for the electrical box opening 804. The locator device 1200 is used and functions in exactly the same way as the locator devices 700, 900, 1000, and 1100, except as otherwise noted. Vent cutouts 1214 can be made in the base plate 1206 if desired. In the illustrated example of FIGS. 38-41, each of the spikes 1204 has a V-shaped cross section, with the lesser included angle of 120°.

Figure 42:
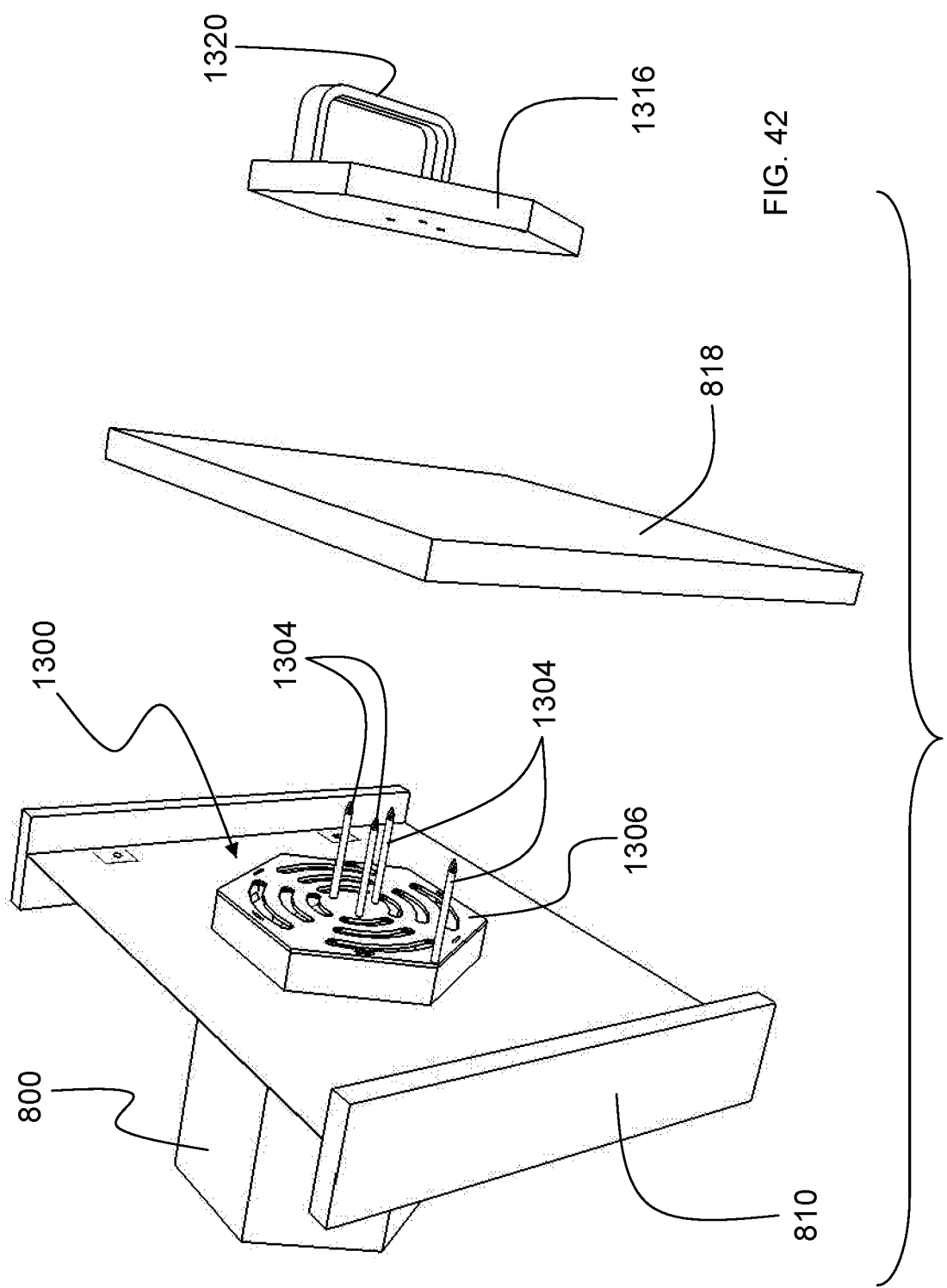
FIGS. 42-47 are views of a eighth embodiment of an apparatus for making cutouts in sheets of construction material in accordance with the present invention.
Figure 43:
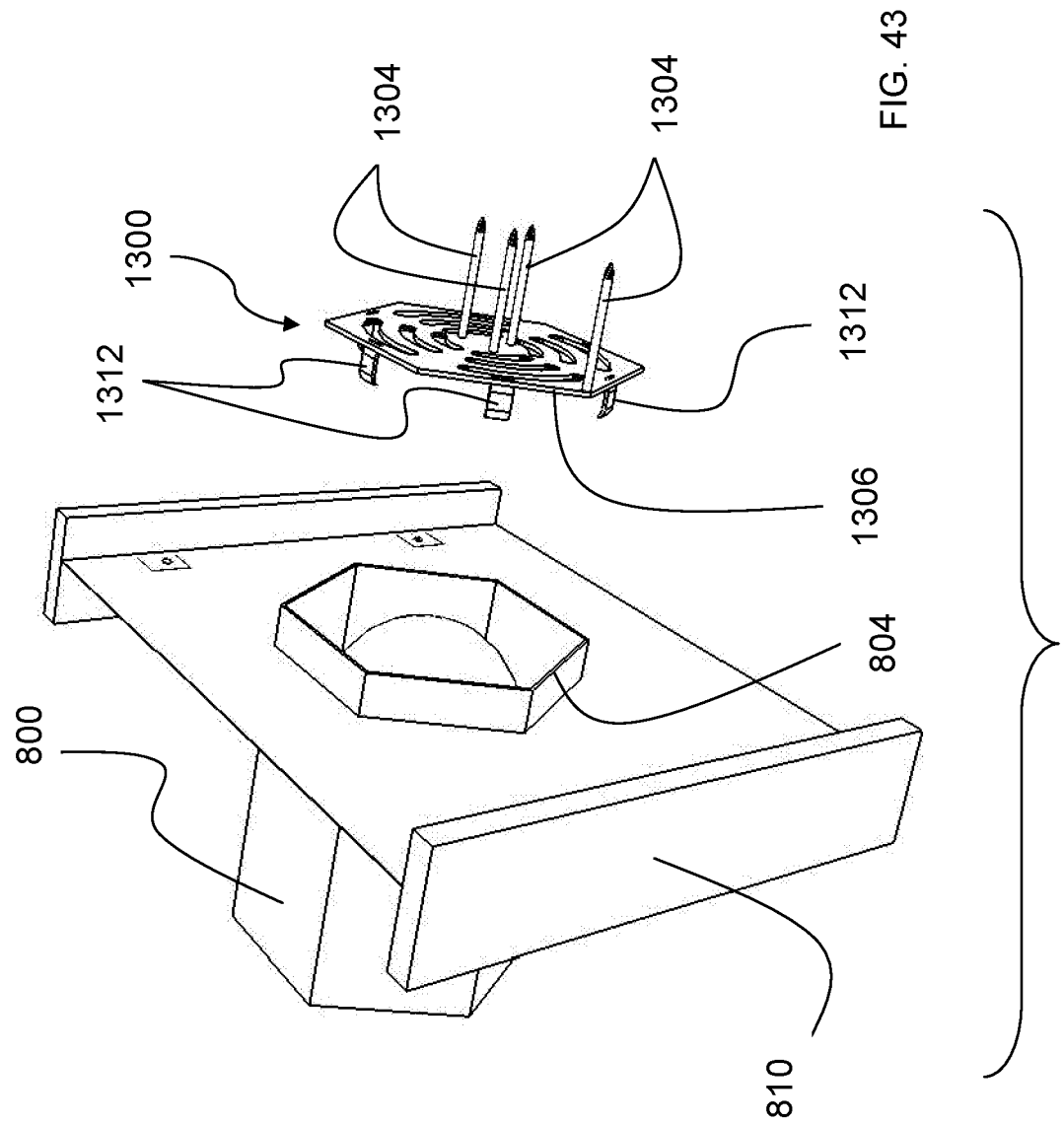
Figure 44:
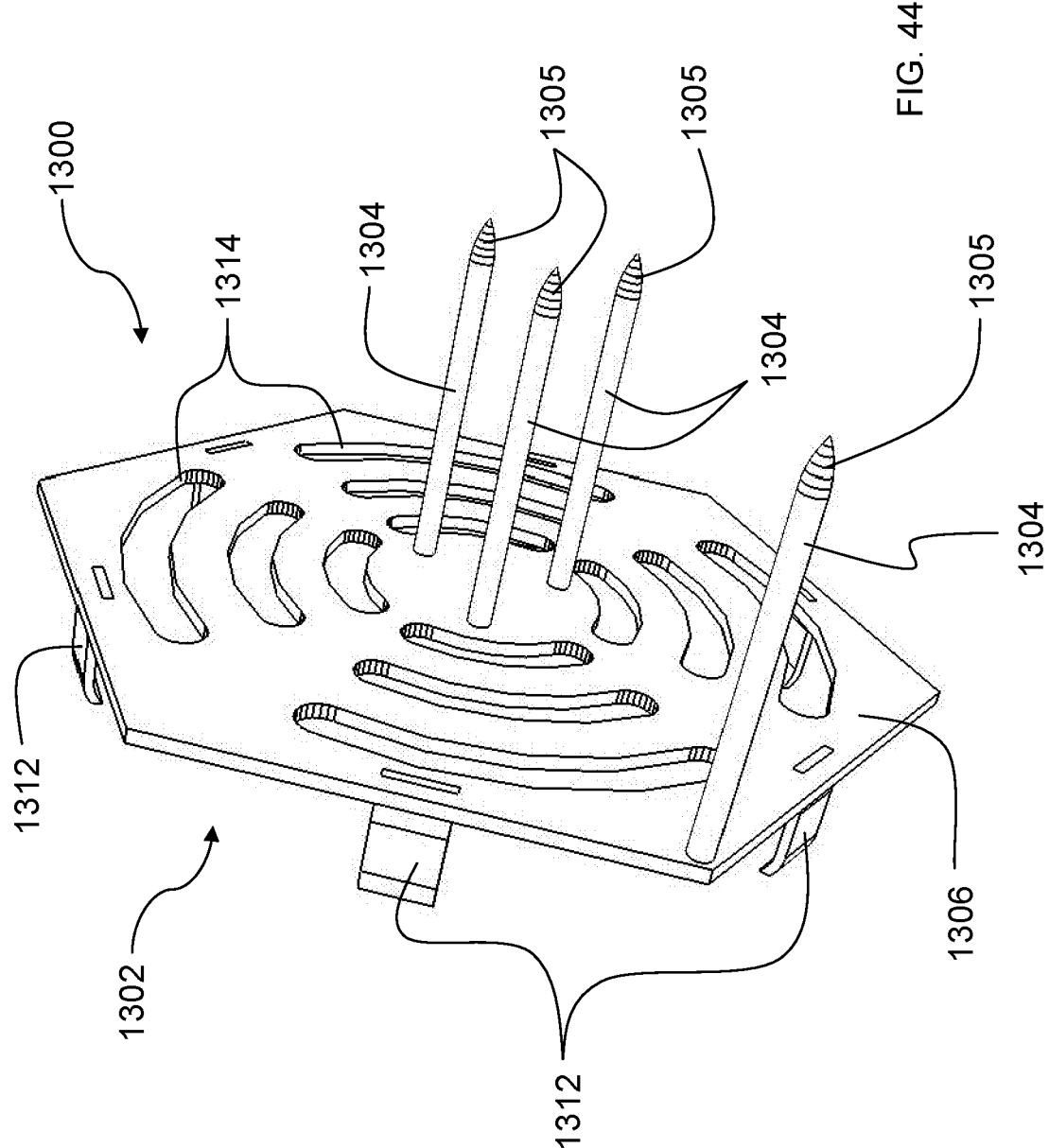
Figure 45:
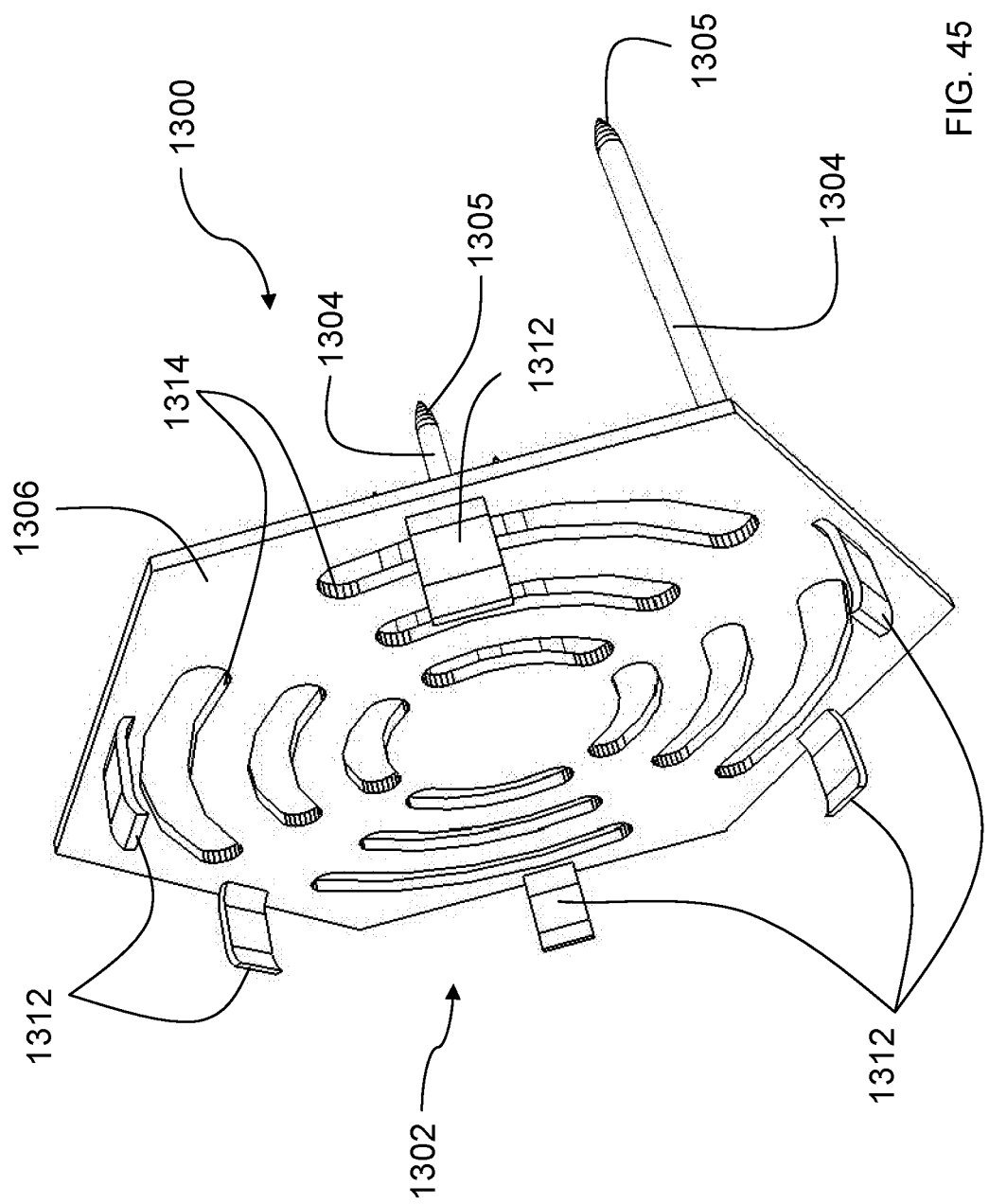
Figure 46:
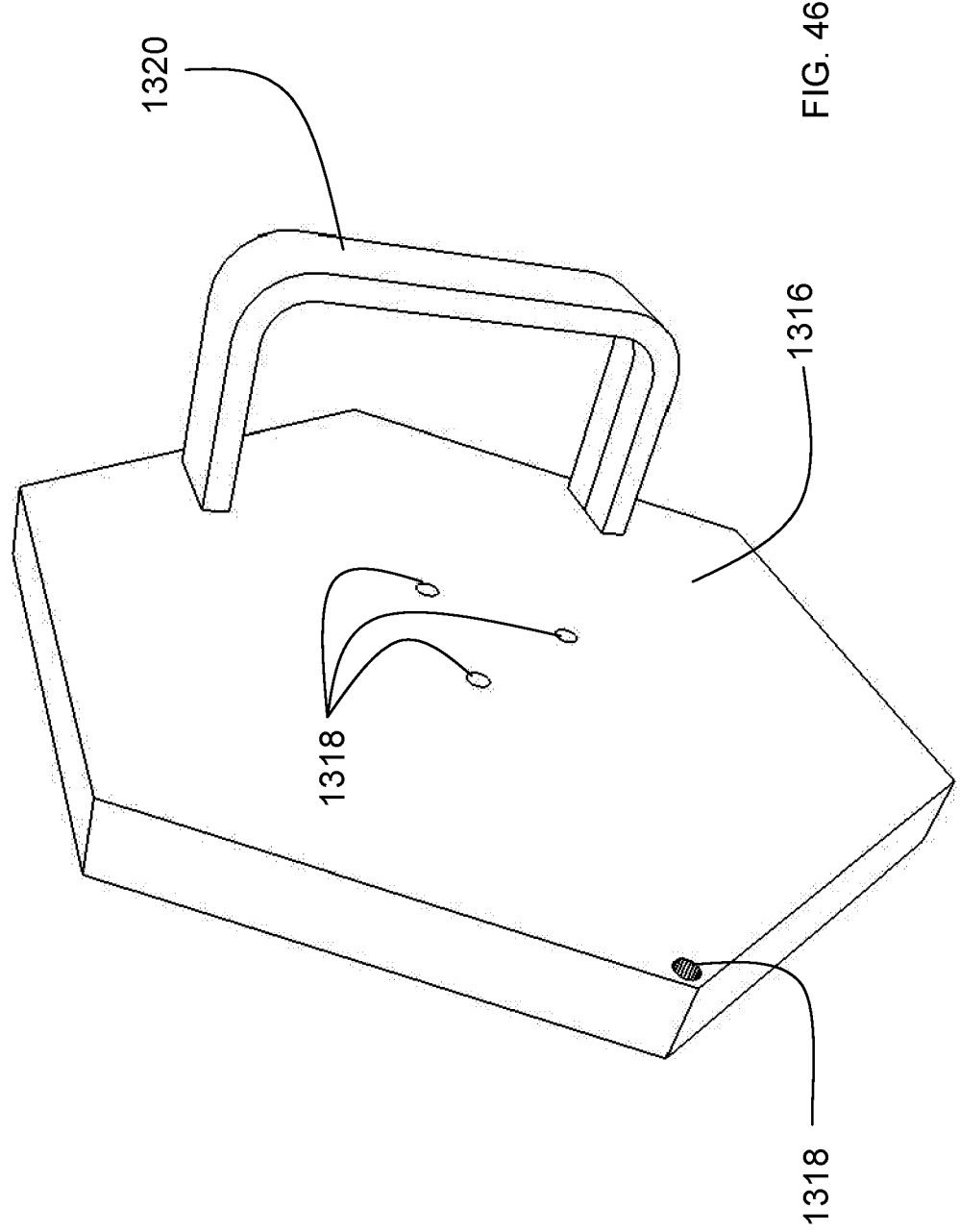
Figure 47:
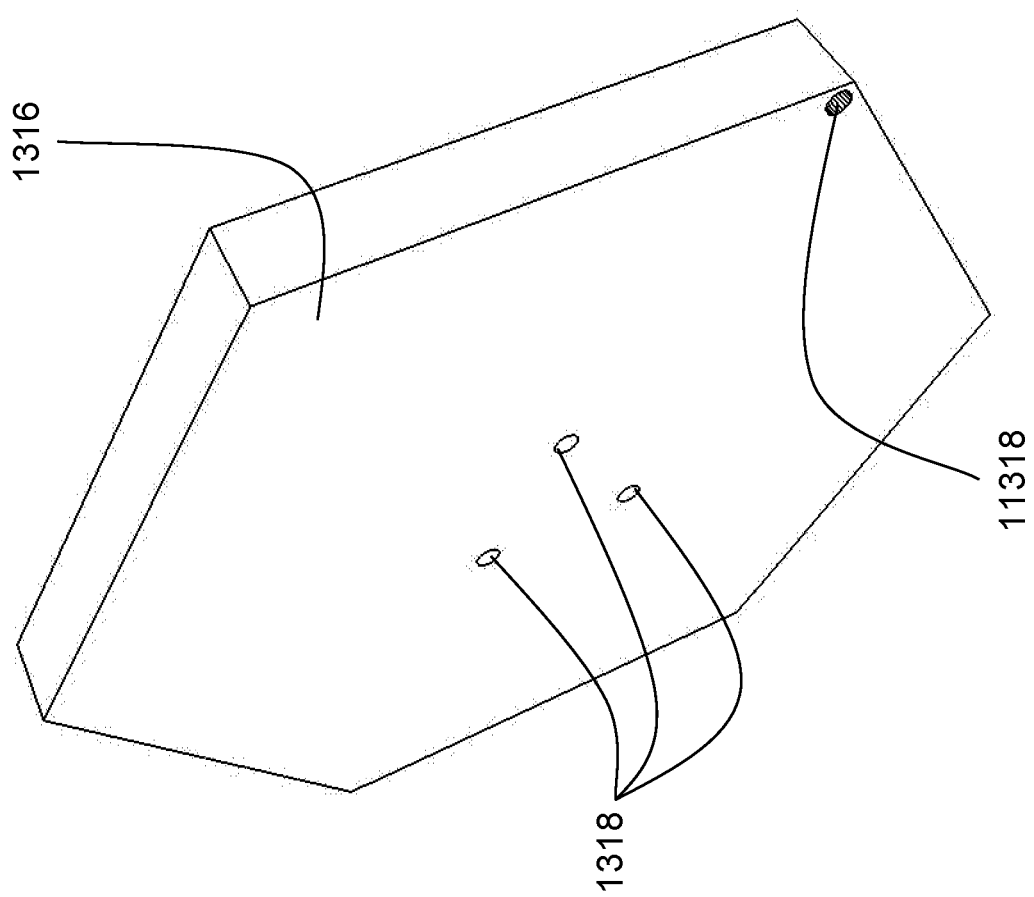

Referring to FIGS. 42-47, an eighth embodiment 1300 of the locator device can be seen. The electrical box locator device 1300 includes a body 1302 and a plurality of spikes 1304. In the illustrated example, the body 1302 includes a base plate 1306. The base plate 1306 is hexagonal and sized to fit over the hexagonal electrical box opening 804 (shown in FIG. 23). The base plate 1306 is made of a flat plate material that is sufficiently strong and rigid. Examples of suitable material are the same as previously listed for the other embodiments. The body 1302 also includes a plurality of resilient members 1312 that fit inside the electrical box opening 804 when the base plate 1306 is placed over the electrical box opening 804 and the electrical box locator device 1300 is mounted to the electrical box 800. Each of the plurality of resilient members 1312 projects from the opposite side of the base plate 1306 relative to the spikes 1304. The resilient members 1312 are attached, in cantilever fashion, to the opposite side of the base plate 1306 relative to the spikes 1304. Each of the resilient members 1312 is bowed outward of the inner surface of the electrical box proximate the electrical box opening 804, when the electrical box locator device 1300 is aligned with the electrical box opening 804 but before it is mounted to the electrical box 800, such that the resilient members can frictionally engage the inner surface of the electrical box 800 proximate the electrical box opening 804 when the electrical box locator device 1300 is mounted to the electrical box 800. The spikes 1304 are attached to the outer surface, that is the surface facing away from the electrical box opening 804, of the base plate 1306 in a predetermined pattern. The longitudinal axis of each of the spikes 1304 is perpendicular to the hexagonal surfaces of the base plate 1306. Each of the spikes 1304 has a sharp, pointed end 1305 that is located distally from the locator device body 1302 for piercing sheet construction material 818. The base plate 1306 extends over the edge of the electrical box opening 804 to limit how far the locator device 1300 can be pushed into the electrical box opening 804.

In use, the locator device 1300 is mounted to the front opening 804 of the electrical box 800. The resilient members 1312 frictionally engage a portion of the interior of the electrical box proximate the opening 804 in order to hold the locator device 1300 in position during the installation and cutting of the sheet material 818 to form the cutout 820 for the electrical box opening 804.

The locator device 1300 is used with a template 1316 having a perimeter corresponding in size and shape to the cutout 820 that is to be formed in the sheet of construction material 818. The template 1316 has a plurality of holes 1318 corresponding in number and locations to said plurality of spikes 1304. In other words, the holes 1318 are distributed in a predetermined pattern matching the predetermined pattern of distribution of the spikes 1304 such that each spike 1304 can be received at least in part within a respective one of the holes 1318.

When the electrical box is mounted to the structure and the locator device body 1302 is mounted to the electrical box 800 and the sheet of construction material 818 is positioned relative to the structure 810 with the plurality of spikes 1304 piercing through the sheet of construction material 818, the template 1316 can be placed against the sheet of construction material 818 with each of the plurality of spikes 1304 being received at least in part in a corresponding one of the plurality of holes 1318 in the template 1316 so as to define a location for the cutout 820 in the sheet of construction material 818 such that the cutout is in registry with the electrical box 800. The correspondence between the plurality of spikes 1304 and the plurality of holes 1318 ensures that the correct template 1316 is used such that the cutout 820 is suitable for the electrical box 800 in terms of size, shape, and orientation. The correspondence between the plurality of spikes 1304 and the plurality of holes 1318 also ensures that the cutout 820 is in proper registry with the electrical box 800. An optional handle 1320 can be provided to allow the user to hold the template in position. The handle 1320 must be located relative to the holes 1318 such that there is no risk of injury to the user from the spikes 1304. Alternatively, the template 1316 can be made thicker and the holes 1318 can be blind holes to avoid risk of injury. With this alternative, the handle 1320 can be placed anywhere. Vent cutouts 1314 can be made in the base plate 1306 if desired. In the illustrated example of FIGS. 42-47, each of the spikes 1304 has a round cross section.

Once the template 1316 is in position against the sheet of construction material 818 with each of the plurality of spikes 1304 received at least in part in a respective one of the plurality of holes 1318 in the template 1316, the user or installer can use a pencil to trace the outline of the template 1316, which defines the outline of the cutout 820 that is to be formed. A manual saw, a handheld power saw, or any other appropriate cutting implement can then be used to complete the cutout 820. The locator device 1300 is then removed through the completed cutout 820. Alternatively, the installer can cut directly around the perimeter of the template 1316 with the manual saw, the handheld power saw, or any other appropriate cutting implement to form the cutout 820.

Figure 48:
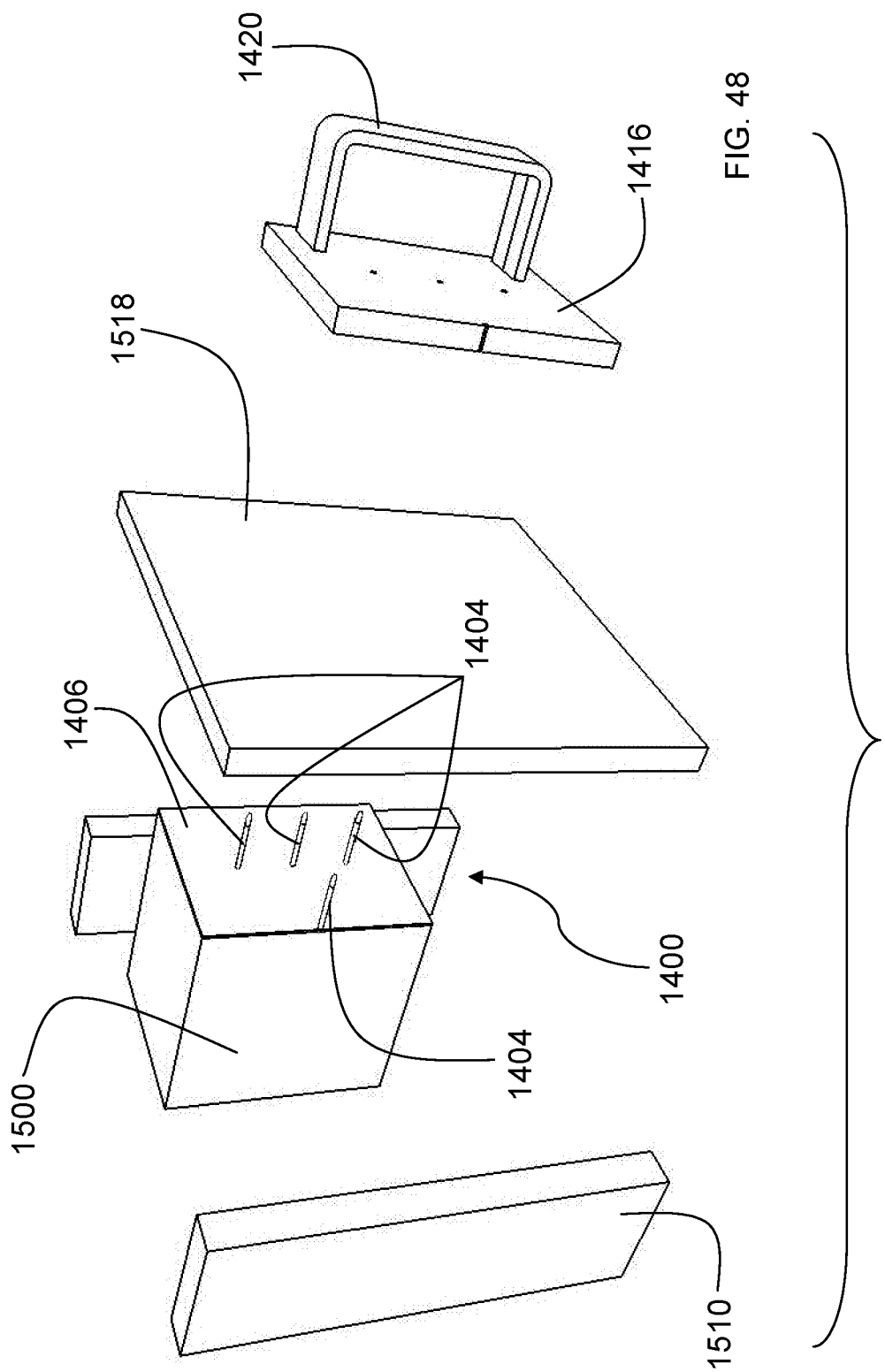
FIGS. 48-53 are views of a ninth embodiment of an apparatus for making cutouts in sheets of construction material in accordance with the present invention.
Figure 49:
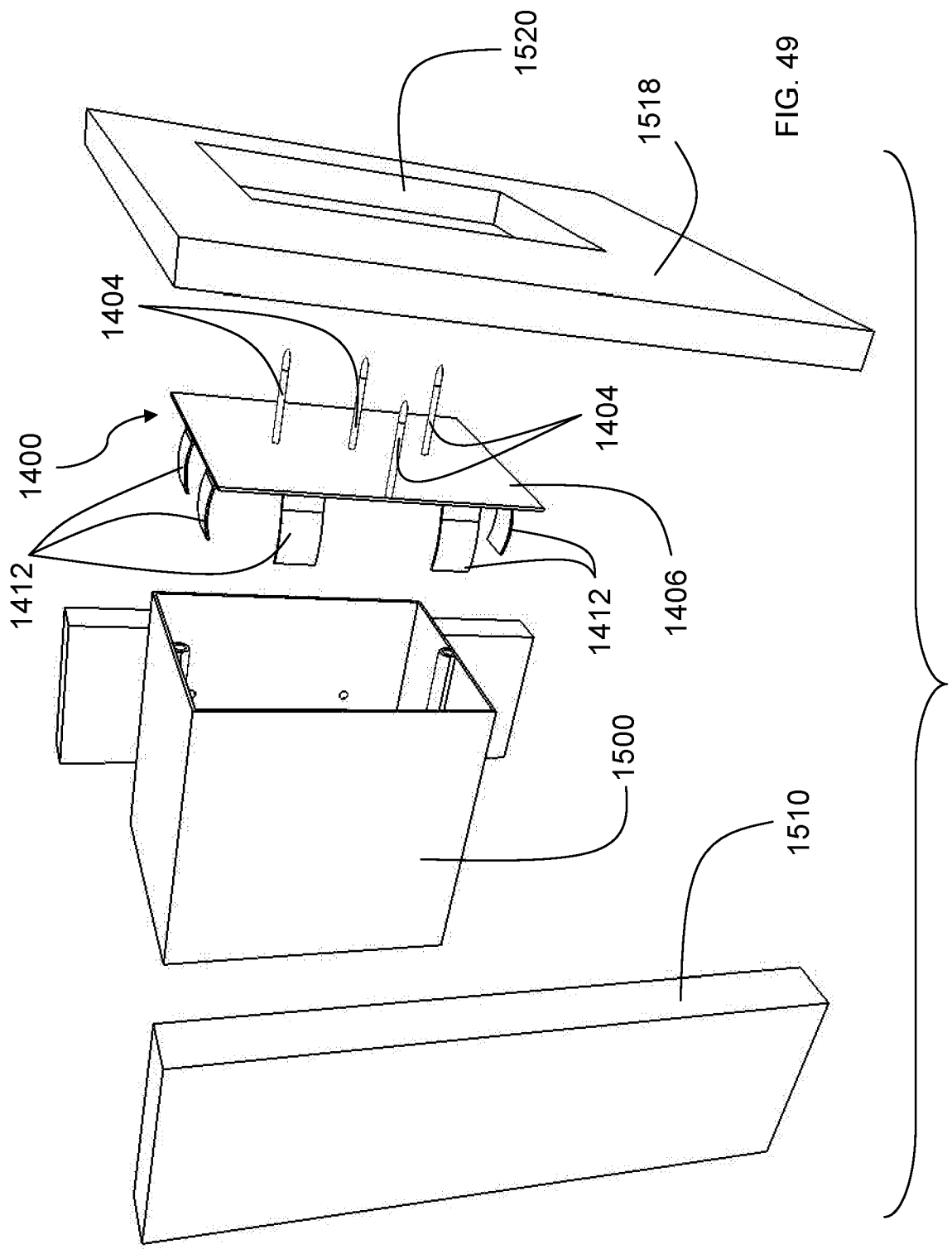
Figure 50:
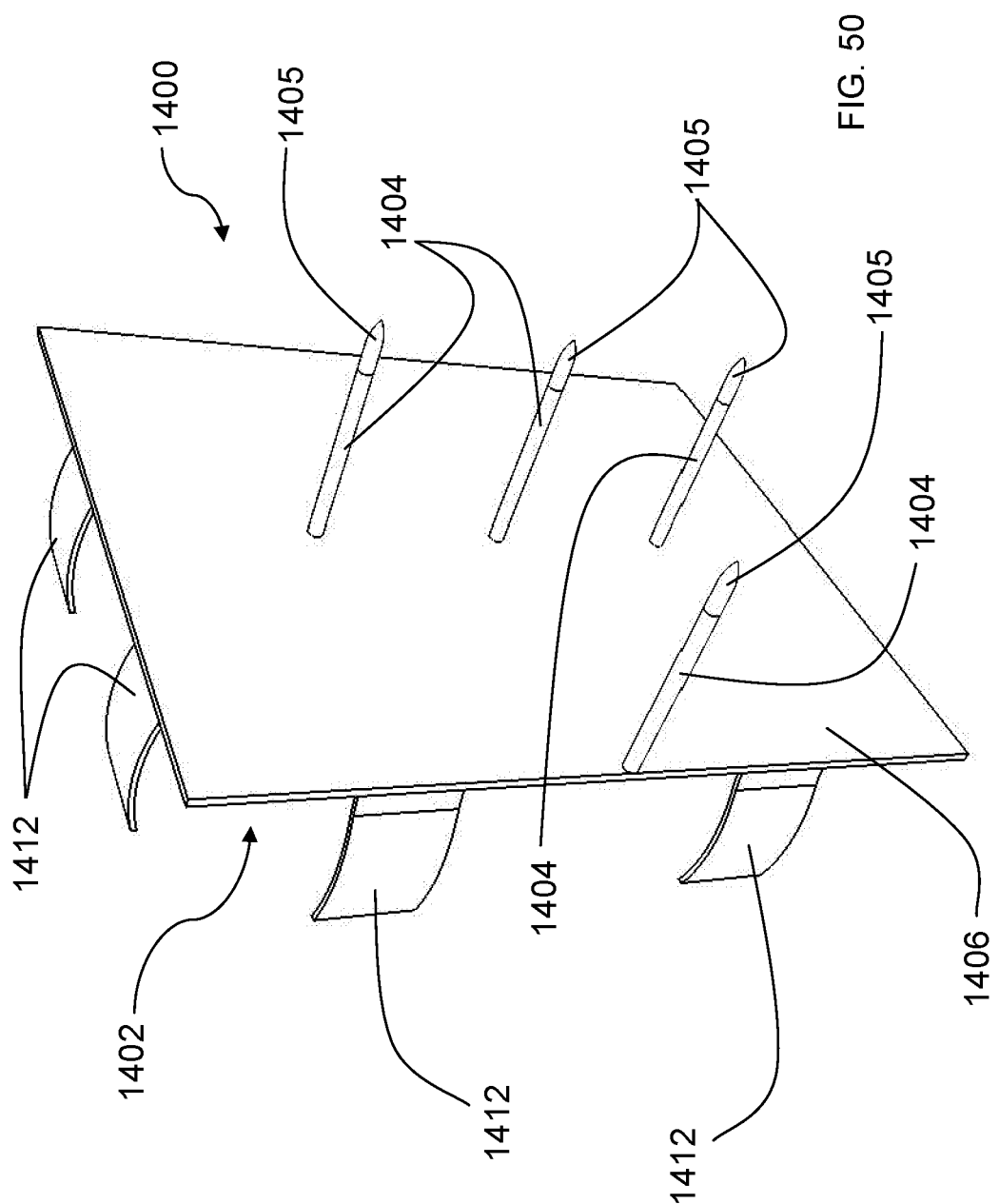
Figure 51:
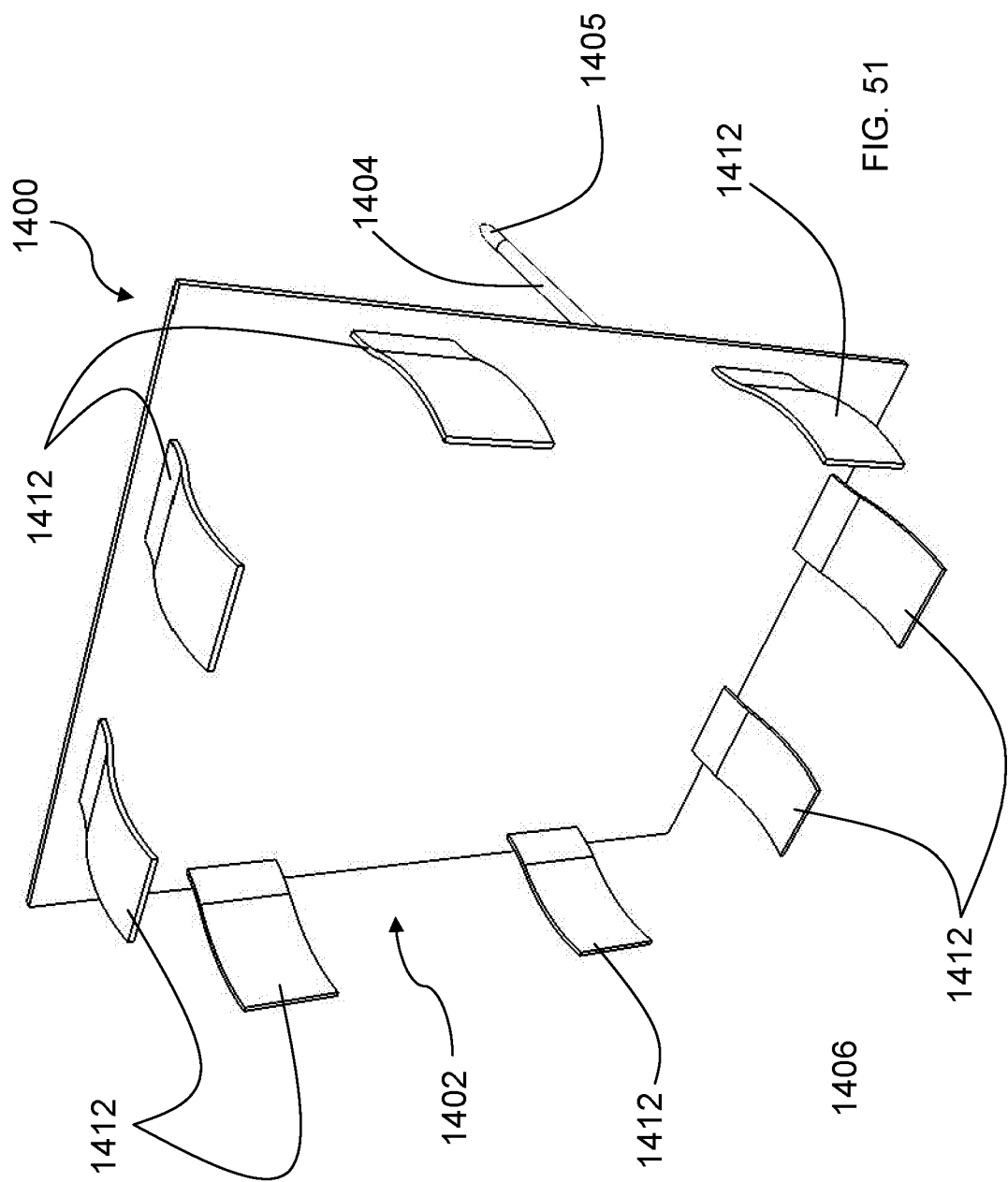
Figure 52:
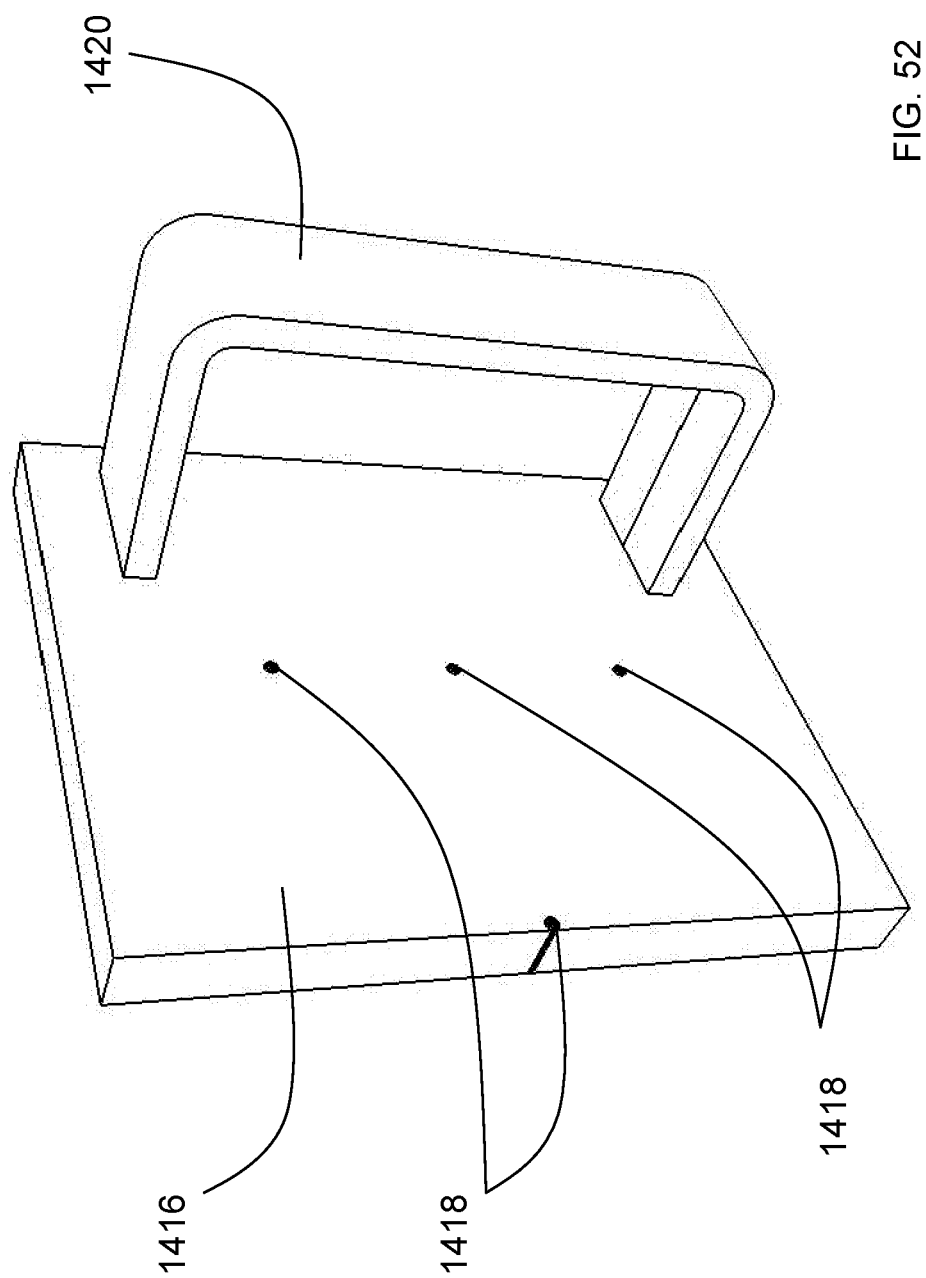
Figure 53:
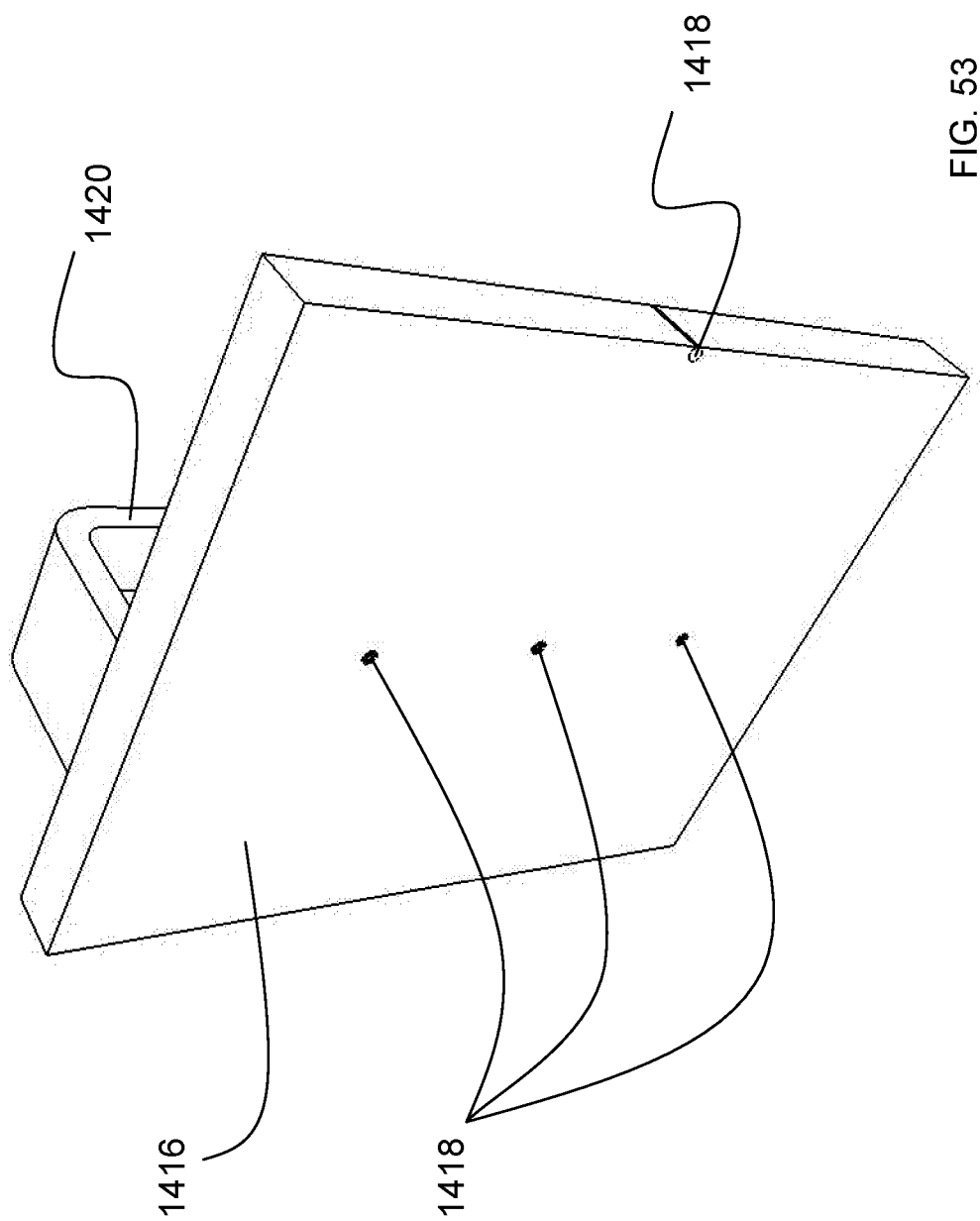

Referring to FIGS. 48-53, a ninth embodiment 1400 of the locator device can be seen. The electrical box locator device 1400 includes a body 1402 and a plurality of spikes 1404. In the illustrated example, the body 1402 includes a base plate 1406. The base plate 1406 is rectangular and sized to fit over the rectangular electrical box opening 1504. The base plate 1406 is made of a flat plate material that is sufficiently strong and rigid. Examples of suitable material are the same as previously listed for the other embodiments. The body 1402 also includes a plurality of resilient members 1412 that fit inside the electrical box opening 1504 when the base plate 1406 is placed over the electrical box opening 1504 and the electrical box locator device 1400 is mounted to the electrical box 1500. Each of the plurality of resilient members 1412 projects from the opposite side of the base plate 1406 relative to the spikes 1404. The resilient members 1412 are attached, in cantilever fashion, to the opposite side of the base plate 1406 relative to the spikes 1404. Each of the resilient members 1412 is bowed outward of the inner surface of the electrical box proximate the electrical box opening 1504, when the electrical box locator device 1400 is aligned with the electrical box opening 1504 but before it is mounted to the electrical box 1500, such that the resilient members can frictionally engage the inner surface of the electrical box 1500 proximate the electrical box opening 1504 when the electrical box locator device 1400 is mounted to the electrical box 1500. The spikes 1404 are attached to the outer surface, which is the surface facing away from the electrical box opening 1504, of the base plate 1406 in a predetermined pattern. The longitudinal axis of each of the spikes 1404 is perpendicular to the hexagonal surfaces of the base plate 1406. Each of the spikes 1404 has a sharp, pointed end 1405 that is located distally from the locator device body 1402 for piercing sheet construction material 1518. The base plate 1406 extends over the edge of the electrical box opening 1504 to limit how far the locator device 1400 can be pushed into the electrical box opening 1504.

In use, the locator device 1400 is mounted to the front opening 1504 of the electrical box 1500. The resilient members 1412 frictionally engage a portion of the interior of the electrical box proximate the opening 1504 in order to hold the locator device 1400 in position during the installation and cutting of the sheet material 1518 to form the cutout 1520 for the electrical box opening 1504.

The locator device 1400 is used with a template 1416 having a perimeter corresponding in size and shape to the cutout 1520 that is to be formed in the sheet of construction material 1518. The template 1416 has a plurality of holes 1418 corresponding in number and locations to said plurality of spikes 1404. In other words, the holes 1418 are distributed in a predetermined pattern matching the predetermined pattern of distribution of the spikes 1404 such that each spike 1404 can be received at least in part within a respective one of the holes 1418.

When the electrical box is mounted to the structure and the locator device body 1402 is mounted to the electrical box 1500 and the sheet of construction material 1518 is positioned relative to the structure 1510 with the plurality of spikes 1404 piercing through the sheet of construction material 1518, the template 1416 can be placed against the sheet of construction material 1518 with each of the plurality of spikes 1404 being received at least in part in a corresponding one of the plurality of holes 1418 in the template 1416 so as to define a location for the cutout 1520 in the sheet of construction material 1518 such that the cutout is in registry with the electrical box 1500. The correspondence between the plurality of spikes 1404 and the plurality of holes 1418 ensures that the correct template 1416 is used such that the cutout 1520 is suitable for the electrical box 1500 in terms of size, shape, and orientation. The correspondence between the plurality of spikes 1404 and the plurality of holes 1418 also ensures that the cutout 1520 is in proper registry with the electrical box 1500. An optional handle 1420 can be provided to allow the user to hold the template in position. The handle 1420 must be located relative to the holes 1418 such that there is no risk of injury to the user from the spikes 1404. Alternatively, the template 1416 can be made thicker and the holes 1418 can be blind holes to avoid risk of injury. With this alternative, the handle 1420 can be placed anywhere. Vent cutouts can be made in the base plate 1406 if desired. In the illustrated example of FIGS. 48-53, each of the spikes 1404 has a round cross section.

Once the template 1416 is in position against the sheet of construction material 1518 with each of the plurality of spikes 1404 received at least in part in a respective one of the plurality of holes 1418 in the template 1416, the user or installer can use a pencil to trace the outline of the template 1416, which defines the outline of the cutout 1520 that is to be formed. A manual saw, a handheld power saw, or any other appropriate cutting implement can then be used to complete the cutout 1520. The locator device 1400 is then removed through the completed cutout 1520. Alternatively, the installer can cut directly around the perimeter of the template 1416 with the manual saw, the handheld power saw, or any other appropriate cutting implement to form the cutout 1520.

Figure 54:
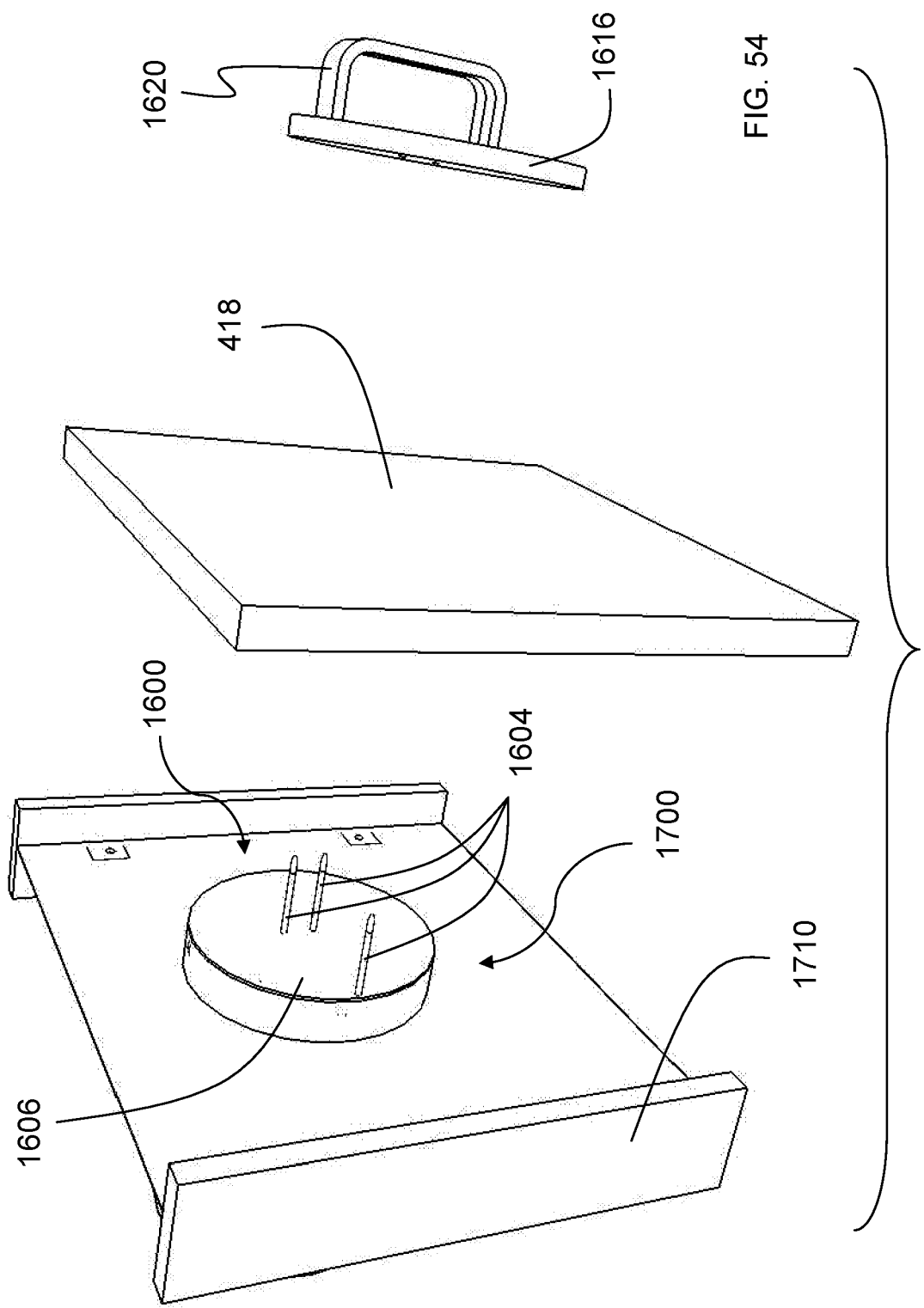
Figure 55:
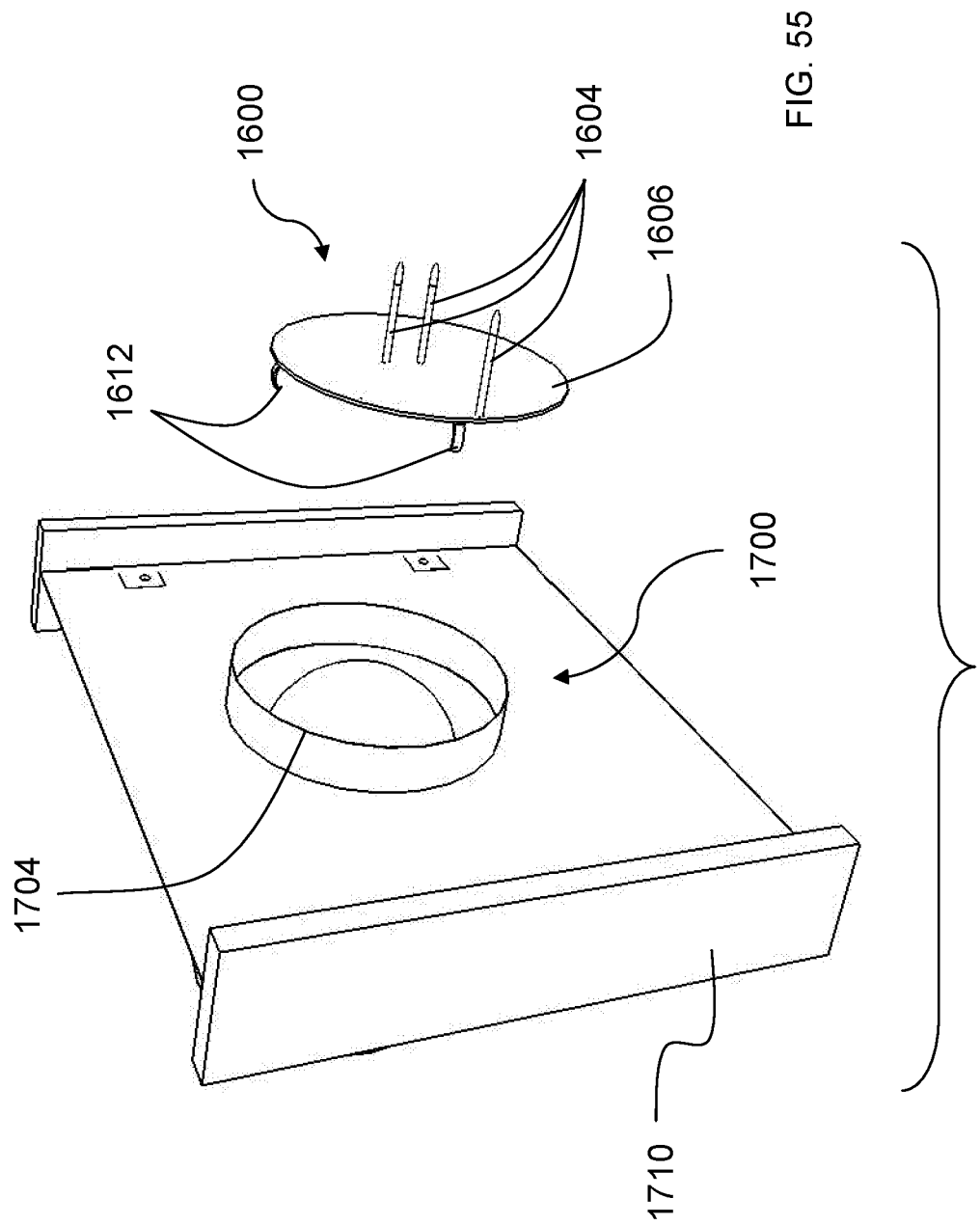
Figure 56:
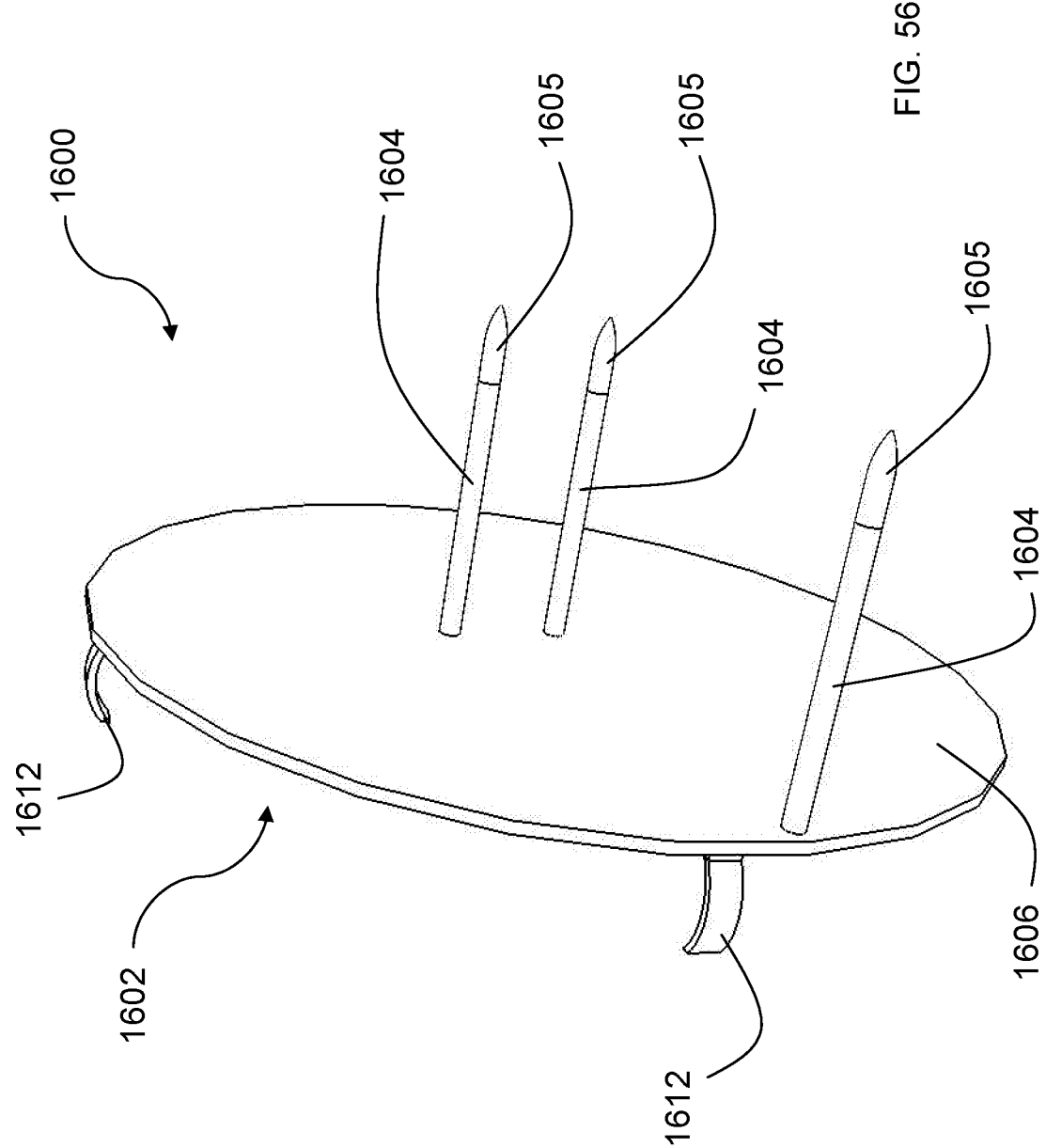
Figure 57:
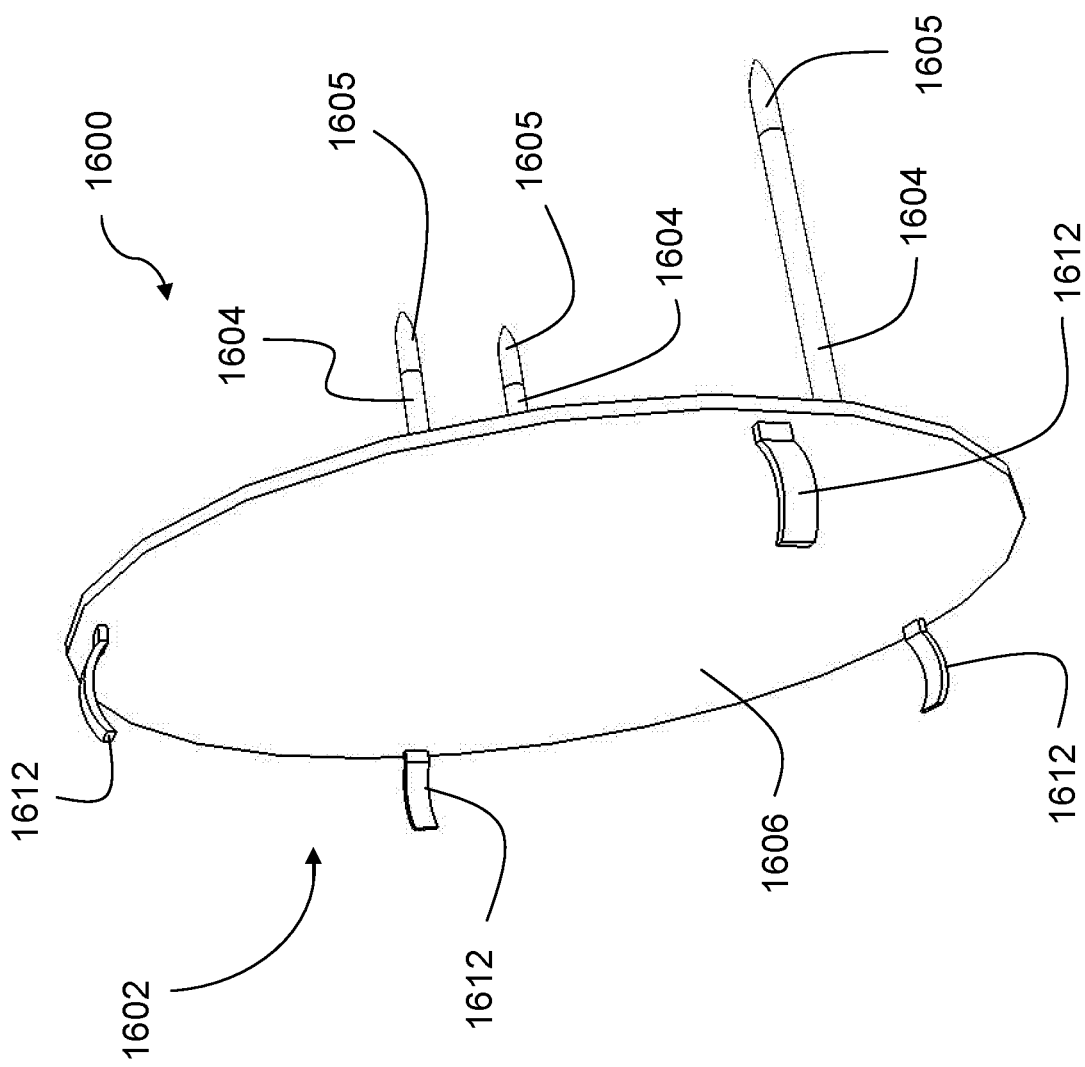
Figure 58:
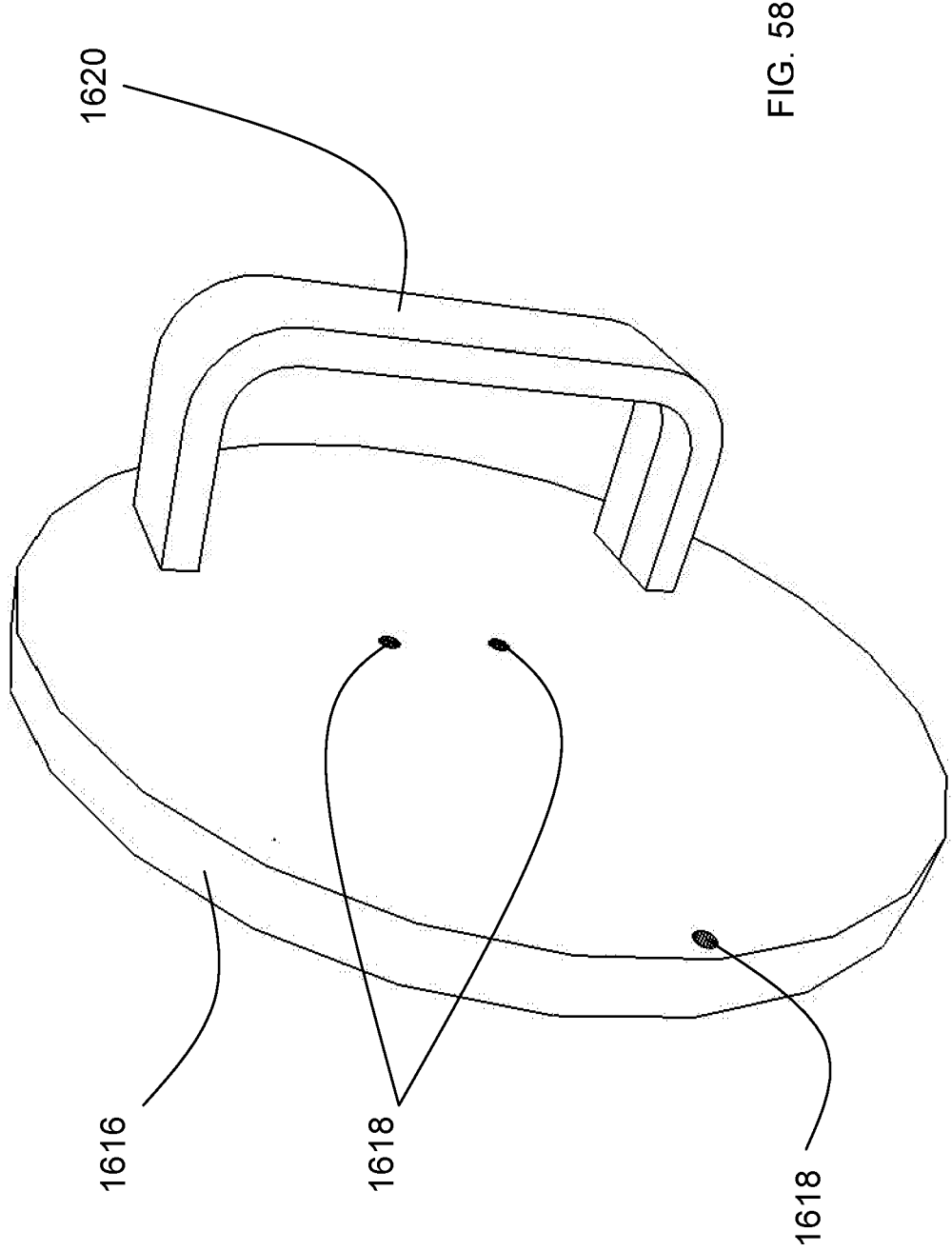

Referring to FIGS. 54-59, a tenth embodiment 1600 of the locator device can be seen. The electrical box locator device 1600 includes a body 1602 and a plurality of spikes 1604. In the illustrated example, the body 1602 includes a base plate 1606. The base plate 1606 is circular and sized to fit over the circular electrical box opening 1704. The base plate 1606 is made of a flat plate material that is sufficiently strong and rigid. Examples of suitable material are the same as previously listed for the other embodiments. The body 1602 also includes a plurality of resilient members 1612 that fit inside the electrical box opening 1704 when the base plate 1606 is placed over the electrical box opening 1704 and the electrical box locator device 1600 is mounted to the electrical box 1700. Each of the plurality of resilient members 1612 projects from the opposite side of the base plate 1606 relative to the spikes 1604. The resilient members 1612 are attached, in cantilever fashion, to the opposite side of the base plate 1606 relative to the spikes 1604. Each of the resilient members 1612 is bowed outward of the inner surface of the electrical box proximate the electrical box opening 1704, when the electrical box locator device 1600 is aligned with the electrical box opening 1704 but before it is mounted to the electrical box 1700, such that the resilient members can frictionally engage the inner surface of the electrical box 1700 proximate the electrical box opening 1704 when the electrical box locator device 1600 is mounted to the electrical box 1700. The spikes 1604 are attached to the outer surface, which is the surface facing away from the electrical box opening 1704, of the base plate 1606 in a predetermined pattern. The longitudinal axis of each of the spikes 1604 is perpendicular to the hexagonal surfaces of the base plate 1606. Each of the spikes 1604 has a sharp, pointed end 1605 that is located distally from the locator device body 1602 for piercing sheet construction material 418. The base plate 1606 extends over the edge of the electrical box opening 1704 to limit how far the locator device 1600 can be pushed into the electrical box opening 1704.

In use, the locator device 1600 is mounted to the front opening 1704 of the electrical box 1700. The resilient members 1612 frictionally engage a portion of the interior of the electrical box proximate the opening 1704 in order to hold the locator device 1600 in position during the installation and cutting of the sheet material 418 to form the cutout 420 (shown in FIG. 4) for the electrical box opening 1704.

The locator device 1600 is used with a template 1616 having a perimeter corresponding in size and shape to the cutout 420 that is to be formed in the sheet of construction material 418. The template 1616 has a plurality of holes 1618 corresponding in number and locations to said plurality of spikes 1604. In other words, the holes 1618 are distributed in a predetermined pattern matching the predetermined pattern of distribution of the spikes 1604 such that each spike 1604 can be received at least in part within a respective one of the holes 1618.

When the electrical box is mounted to the structure and the locator device body 1602 is mounted to the electrical box 1700 and the sheet of construction material 418 is positioned relative to the structure 1710 with the plurality of spikes 1604 piercing through the sheet of construction material 418, the template 1616 can be placed against the sheet of construction material 418 with each of the plurality of spikes 1604 being received at least in part in a corresponding one of the plurality of holes 1618 in the template 1616 so as to define a location for the cutout 420 in the sheet of construction material 418 such that the cutout is in registry with the electrical box 1700. The correspondence between the plurality of spikes 1604 and the plurality of holes 1618 ensures that the correct template 1616 is used such that the cutout 420 is suitable for the electrical box 1700 in terms of size, shape, and orientation. The correspondence between the plurality of spikes 1604 and the plurality of holes 1618 also ensures that the cutout 420 is in proper registry with the electrical box 1700. An optional handle 1620 can be provided to allow the user to hold the template in position. The handle 1620 must be located relative to the holes 1618 such that there is no risk of injury to the user from the spikes 1604. Alternatively, the template 1616 can be made thicker and the holes 1618 can be blind holes to avoid risk of injury. With this alternative, the handle 1620 can be placed anywhere. Vent cutouts can be made in the base plate 1606 if desired. In the illustrated example of FIGS. 54-59, each of the spikes 1604 has a round cross section.

Once the template 1616 is in position against the sheet of construction material 418 with each of the plurality of spikes 1604 received at least in part in a respective one of the plurality of holes 1618 in the template 1616, the user or installer can use a pencil to trace the outline of the template 1616, which defines the outline of the cutout 420 that is to be formed. A manual saw, a handheld power saw, or any other appropriate cutting implement can then be used to complete the cutout 420. The locator device 1600 is then removed through the completed cutout 420. Alternatively, the installer can cut directly around the perimeter of the template 1616 with the manual saw, the handheld power saw, or any other appropriate cutting implement to form the cutout 420.

By a cutout that is suitable for or corresponds in size and shape to the electrical box opening in the present specification and claims, it is meant that the cutout is of the size and shape appropriate for the electrical box opening while being large enough to permit removal of the electrical box locator device from the electrical box opening once the cutout is complete.

It is to be understood that the present invention is not limited to the embodiments described above, but encompasses any and all embodiments within the scope of the appended claims.

The invention claimed is:

1. An electrical box locator device for ensuring proper location of a cutout in a sheet of construction material, for access to openings of electrical boxes mounted to a structure, the electrical box locator device comprising:
   a locator device body adapted for engagement to an electrical box such that said locator device body is located at an opening of the electrical box and in registry with the opening of the electrical box when said locator device body is mounted to the electrical box; and
   at least one of a plurality of spikes attached to the body such that said at least one spike projects outward perpendicularly relative to a plane coincident with the opening of the electrical box when said locator device body is mounted to the electrical box,
   wherein when the electrical box is mounted to the structure and said locator device body is mounted to the electrical box, a sheet of construction material can be positioned relative to the structure with said spike piercing through the sheet of construction material for locating a cutout in the sheet of construction material for the electrical box,
   wherein a separate cutting implement for forming the cutout is separate and distinct from the spike, the locator device body, and the electrical box locator device.

2. The electrical box locator device for ensuring proper location of a cutout in a sheet of construction material according to claim 1, wherein said electrical box locator device further comprises means for keeping said electrical box locator device in place relative to the electrical box when said electrical box locator device includes a base plate that is hexagonal and sized to fit over the electrical box opening.

3. The electrical box locator device for ensuring proper location of a cutout in a sheet of construction material according to claim 2, wherein said electrical box locator device is kept in place by at least one resilient member for frictionally engaging an interior surface of the electrical box.

4. The electrical box locator device for ensuring proper location of a cutout in a sheet of construction material according to claim 1, wherein a portion of said locator device overlaps an edge of the opening of the electrical box so as to prevent said locator device from being pushed too far in the inward direction relative to the opening of the electrical box.

5. The electrical box locator device according to claim 1, wherein the cutout to be formed in the sheet of construction material has a size and shape, and wherein said at least one spike is color coded to provide an indication to the user of the size or shape or both of the cutout to be made in the sheet of construction material.

6. Apparatus for ensuring proper location of a cutout in a sheet of construction material, for access to openings of electrical boxes mounted to a structure, the apparatus comprising:
   an electrical box locator device according to claim 1; and
   a template having a perimeter corresponding in size and shape to the cutout that is to be formed in the sheet of construction material, the template having a plurality of holes corresponding in number and locations to said plurality of spikes,
   wherein when the electrical box is mounted to the structure and said locator device body is mounted to the electrical box and the sheet of construction material is positioned relative to the structure with said plurality of spikes piercing through the sheet of construction material, said template can be placed against the sheet of construction material with each of said plurality of spikes being received at least in part in a corresponding one of said plurality of holes in said template so as to define a location for the cutout in the sheet of construction material for registry with the electrical box, while correspondence between said plurality of spikes and said plurality of holes ensures that the cutout is suitable for the electrical box in terms of size, shape, and orientation, to provide for proper registry of the cutout to be formed with the electrical box and the locator device is removed through the completed cutout.

7. An electrical box locator device for ensuring proper location of a cutout in a sheet of construction material, for access to openings of electrical boxes mounted to a structure, the electrical box locator device comprising:
   a locator device body adapted for engagement to an electrical box such that said locator device body is located at or near an opening of the electrical box and in registry with the opening of the electrical box when said locator device body is mounted to the electrical box; and at least one of a plurality of spikes attached to the body such that said at least one spike projects outward perpendicularly relative to a plane coincident with the opening of the electrical box when said locator device body is mounted to the electrical box, wherein when the electrical box is mounted to the structure and said locator device body is mounted to the electrical box, a sheet of construction material can be positioned relative to the structure with said spike piercing through the sheet of construction material for locating a cutout in the sheet of construction material for the electrical box, wherein a separate cutting implement for forming the cutout is separate and distinct from the spike, the locator device body, and the electrical box locator device;

wherein at least one resilient rod is one of a plurality of resilient rods for functionally engaging the electrical box to thereby keep said electrical box locator device in place relative to the electrical box when said electrical box locator device is mounted to the electrical box.

8. The electrical box locator device for ensuring proper location of a cutout in a sheet of construction material according to claim 7, wherein a portion of said locator device overlaps an edge of the opening of the electrical box so as to prevent said locator device from being pushed too far in the inward direction relative to the opening of the electrical box.

9. The electrical box locator device according to claim 7, wherein the cutout to be formed in the sheet of construction material has a size and shape, and wherein said at least one spike is color coded to provide an indication to the user of the size or shape or both of the cutout to be made in the sheet of construction material.

* * * * *